US012745299B2

(12) United States Patent
Kang et al.

(10) Patent No.: US 12,745,299 B2

(45) Date of Patent: Sep. 22, 2026

(54) METHOD AND DEVICE FOR CONFIGURING CONNECTION OF REMOTE TERMINAL THROUGH RELAY TERMINAL IN WIRELESS COMMUNICATION SYSTEM

(71) Applicant: Samsung Electronics Co., Ltd., Suwon-si (KR)

(72) Inventors: Hyunjeong Kang, Suwon-si (KR); Anil Agiwal, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 507 days.

(21) Appl. No.: 18/261,614

(22) PCT Filed: Jan. 18, 2022

(86) PCT No.: PCT/KR2022/000908

§ 371 (c)(1),
(2) Date: Jul. 14, 2023

(87) PCT Pub. No.: WO2022/158822

PCT Pub. Date: Jul. 28, 2022

(65) Prior Publication Data

US 2024/0205989 A1 Jun. 20, 2024

(30) Foreign Application Priority Data

Jan. 19, 2021 (KR) ........................ 10-2021-0007678
Sep. 13, 2021 (KR) ........................ 10-2021-0122067

(51) Int. Cl.

| | |
|---|---|
| ***H04W 76/14*** | (2018.01) |
| ***H04W 76/27*** | (2018.01) |
| *H04W 88/04* | (2009.01) |

(52) U.S. Cl.
CPC .......... *H04W 76/14* (2018.02); *H04W 76/27* (2018.02); *H04W 88/04* (2013.01)

(58) Field of Classification Search
CPC ..... H04W 72/02; H04W 72/04; H04W 72/12; H04W 72/40; H04W 76/14; H04W 76/27;
(Continued)

(56) References Cited

U.S. PATENT DOCUMENTS

| | | | |
|---|---|---|---|
| 10,966,259 | B2 | 3/2021 | Lee et al. |
| 12,273,871 | B2 | 4/2025 | Wang et al. |

(Continued)

FOREIGN PATENT DOCUMENTS

| | | | |
|---|---|---|---|
| CN | 111901847 | A | 11/2020 |
| EP | 3579642 | A1 | 12/2019 |

(Continued)

OTHER PUBLICATIONS

International Search Report and Written Opinion of the International Searching Authority dated May 2, 2022, in connection with International Application No. PCT/KR2022/000908, 12 pages.

(Continued)

*Primary Examiner* — Thomas R Cairns

(57) ABSTRACT

Provided is a method, performed by a relay user equipment (UE), of relaying communication between a remote UE and a base station, in a wireless communication system. The method includes: transmitting, to the base station, a message about sidelink UE information including first identifier information of the remote UE; receiving, from the base station, a radio resource control (RRC) reconfiguration message including configuration information for relaying data of the remote UE and second identifier information, based on the message about the sidelink UE information; and transmitting the data of the remote UE to the base station, based on the RRC reconfiguration message.

15 Claims, 24 Drawing Sheets

(58) Field of Classification Search

CPC ..... H04W 88/04; H04W 92/18; H04W 8/005; H04W 16/26; H04W 52/02; H04W 76/10; H04W 76/23; H04W 84/047; H04W 84/18; H04B 7/15

See application file for complete search history.

(56) References Cited

U.S. PATENT DOCUMENTS

| | | | | |
|---|---|---|---|---|
| 2007/0076684 | A1 | 4/2007 | Lee et al. | |
| 2018/0249516 | A1* | 8/2018 | Jung | H04W 76/11 |
| 2020/0389900 | A1 | 12/2020 | Lee et al. | |
| 2021/0368417 | A1 | 11/2021 | Luo et al. | |
| 2022/0418015 | A1* | 12/2022 | Paladugu | H04W 76/15 |

FOREIGN PATENT DOCUMENTS

| | | |
|---|---|---|
| KR | 10-2007-0037856 A | 4/2007 |
| KR | 10-2019-0103468 A | 9/2019 |
| WO | 2018031343 A1 | 2/2018 |
| WO | 2018141294 A1 | 8/2018 |
| WO | 2020156020 A1 | 8/2020 |

OTHER PUBLICATIONS

Mediatek Inc. (Email Discussion Rapporteur), "Final Summary and proposals based on the email discussion," R2-2009122 (Part 3/3), 3GPP TSG-RAN WG2 Meeting #112 electronic, Online, Nov. 2-13, 2020, 18 pages.

Supplementary European Search Report dated Jun. 5, 2024, in connection with European Patent Application No. 22742798.6, 11 pages.

Zte, "Discussion on connection establishment and bearer setup," R2-168149, 3GPP-TSG-WG2 Meeting #96, Reno, USA, Nov. 14-18, 2016, 4 pages.

Communication under Rule 71(3) EPC dated Oct. 7, 2025, in connection with European Patent Application No. 1 22742798.6, 121 pages.

Office Action dated Jul. 21, 2026, in connection with Chinese Application No. 202280010575.4, 31 pages.

* cited by examiner

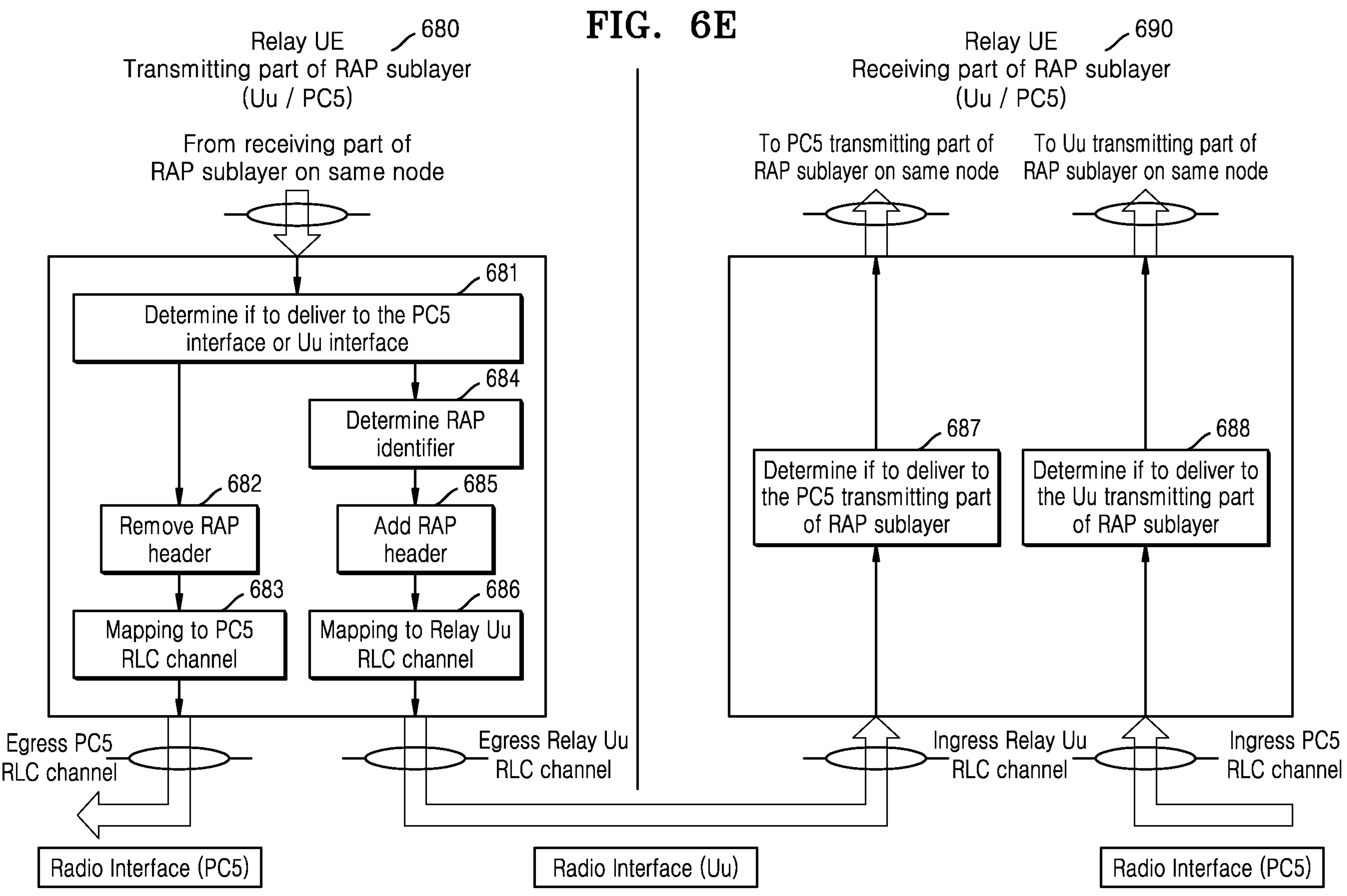
FIG. 6E
Relay UE
Transmitting part of RAP sublayer
(Uu / PC5)
680
From receiving part of
RAP sublayer on same node
681
Determine if to deliver to the PC5
interface or Uu interface
684
Determine RAP
identifier
682
Remove RAP
header
685
Add RAP
header
683
Mapping to PC5
RLC channel
686
Mapping to Relay Uu
RLC channel
Egress PC5
RLC channel
Egress Relay Uu
RLC channel
Radio Interface (PC5)
Radio Interface (Uu)
Relay UE
Receiving part of RAP sublayer
(Uu / PC5)
690
To PC5 transmitting part of
RAP sublayer on same node
To Uu transmitting part of
RAP sublayer on same node
687
Determine if to deliver to
the PC5 transmitting part
of RAP sublayer
688
Determine if to deliver to
the Uu transmitting part
of RAP sublayer
Ingress Relay Uu
RLC channel
Ingress PC5
RLC channel
Radio Interface (PC5)

METHOD AND DEVICE FOR CONFIGURING CONNECTION OF REMOTE TERMINAL THROUGH RELAY TERMINAL IN WIRELESS COMMUNICATION SYSTEM

TECHNICAL FIELD

The present disclosure relates to a wireless communication system. More particularly, the present disclosure relates to operations of a terminal establishing a connection to a base station, based on a sidelink with a relay terminal in a wireless communication system, and a method and apparatus for configuring relay information of a sidelink relay terminal.

BACKGROUND ART

To meet the increase in demand for wireless data traffic after the commercialization of 4$^{th}$ generation (4G) communication systems, considerable efforts have been made to develop improved 5$^{th}$ generation (5G) communication systems or pre-5G communication systems. This is one reason why '5G communication systems' or 'pre-5G communication systems' are called 'beyond 4G network communication systems' or 'post long-term evolution (LTE) systems.'

In order to achieve a high data rate, 5G communication systems are being developed to be implemented in a super-high frequency band (millimeter wave (mmWave)), e.g., a band of 60 GHz. In order to reduce the path loss of radio waves in such a super-high frequency band and to increase a transmission distance of radio waves in 5G communication systems, various technologies have been discussed and are being studied, for example: beamforming, massive multiple-input multiple-output (MIMO), full dimensional MIMO (FD-MIMO), array antennas, analog beam-forming, and large-scale antennas.

To improve system networks, technologies for advanced small cells, cloud radio access networks (RANs), ultra-dense networks, device to device (D2D) communication, wireless backhaul, moving networks, cooperative communication, coordinated multi-points (CoMP), reception-end interference cancellation and the like are also being developed in the 5G communication system.

In addition, hybrid frequency shift keying and quadrature amplitude modulation (FQAM) and sliding window superposition coding (SWSC), which are advanced coding modulation (ACM) methods, and filter bank multi carrier (FBMC), non-orthogonal multiple access (NOMA), and sparse code multiple access (SCMA), which are advanced access techniques, have been developed in the 5G communication systems.

The Internet has evolved from a human-based connection network, where humans create and consume information, to the Internet of things (IoT), where distributed components, such as objects, exchange information with each other to process the information. Internet of Everything (IoE) technology, which is a combination of IoT technology and big data processing technology through connection with a cloud server, is also emerging. In order to implement the IoT, technology elements such as sensing technology, wired/wireless communication and network infrastructure, service interface technology, and security technology are required, and thus technology for inter-object connection, such as sensor network, machine to machine (M2M) communication, or machine-type communication (MTC), has recently been studied.

In an IoT environment, intelligent Internet technology (IT) services that collect and analyze data generated by connected objects and create new value in human life may be provided. IoT may be applied to a variety of areas, such as smart homes, smart buildings, smart cities, smart cars or connected cars, smart grid, health care, smart home appliances and advanced medical services through convergence and combination between existing Information Technologies (IT) and various industrial applications.

Various attempts have been made to apply 5G communication systems to IoT networks. For example, technologies related to sensor networks, M2M communication, MTC, etc., are being implemented by using 5G communication technology including beam-forming, MIMO, array antennas, etc. The application of a cloud radio access network (RAN) as big data processing technology may also be considered as an example of convergence of 5G technology and IoT technology.

Also, device-to-device (D2D) direct communication (sidelink communication) using a 5G communication system is being studied, and it is expected that D2D direct communication may provide various services to a user by being applied to, for example, vehicle-to-everything (V2X) communication or a public safety network.

In particular, there is a request for a method of using a sidelink relay capable of supporting service coverage expansion, an increase in reliability of data transmission, and a decrease in power consumption of a terminal.

DISCLOSURE

Technical Solution

The present disclosure provides a method and apparatus in which a terminal processes radio resource control (RRC) connection establishment with a base station through a sidelink relay in a wireless communication system. The present disclosure provides a method and apparatus in which a sidelink relay processes configuration information for relaying data/signaling between a terminal and a base station, in a wireless communication system.

DESCRIPTION OF DRAWINGS

FIG. 6E is a diagram for describing operations of a sidelink relay transmitter of an RAP sublayer and a sidelink relay receiver of the RAP sublayer, according to another embodiment of the present disclosure.

MODE FOR INVENTION

Figure 1A:
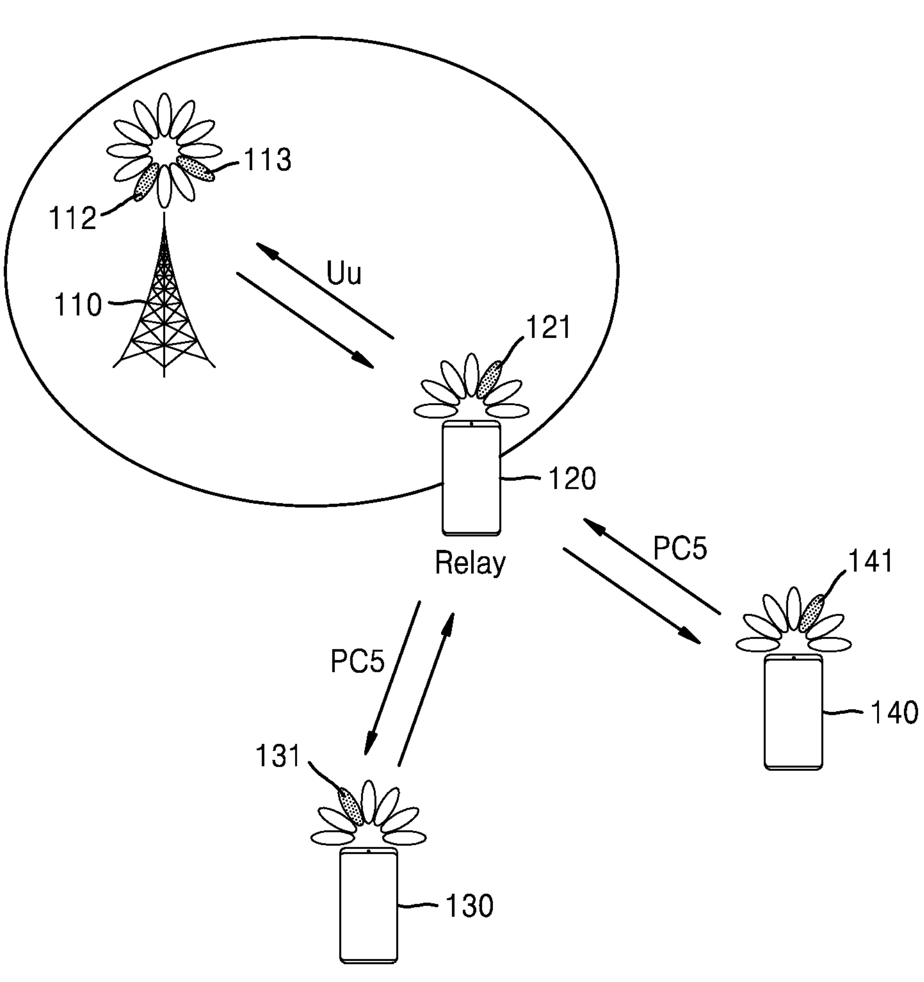
FIG. 1A is a diagram of a wireless communication system according to an embodiment of the present disclosure.

Hereinafter, exemplary embodiments of the present disclosure will be described in detail with reference to the accompanying drawings. Here, it should be noted that like reference numerals denote like elements in the accompanying drawings. Also, detailed descriptions about known functions and configurations that may blur the gist of the present disclosure will be omitted.

While describing embodiments in the present specification, descriptions of technical contents that are well known in the technical field to which the present disclosure belongs and are not directly related to the present disclosure will be omitted. By omitting the unnecessary description, the gist of the present disclosure may be more clearly conveyed without obscuring the subject matter.

For the same reasons, components may be exaggerated, omitted, or schematically illustrated in drawings for clarity. Also, the size of each component does not completely reflect the actual size. In the drawings, like reference numerals denote like elements.

Advantages and features of the present disclosure and methods of accomplishing the same may be understood more readily by reference to the following detailed description of the embodiments and the accompanying drawings. In this regard, the embodiments of the present disclosure may have different forms and should not be construed as being limited to the descriptions set forth herein. Rather, these embodiments are provided so that the present disclosure will be thorough and complete and will fully convey the concept of the present disclosure to one of ordinary skill in the art, and the present disclosure will only be defined by the appended claims. Throughout the specification, like reference numerals denote like elements.

Here, it will be understood that combinations of blocks in flowcharts or process flow diagrams may be performed by computer program instructions. Because these computer program instructions may be loaded into a processor of a general-purpose computer, special purpose computer, or other programmable data processing apparatus, the instructions, which are executed via the processor of the computer or other programmable data processing apparatus generate means for implementing the functions specified in the flowchart block(s). The computer program instructions may be stored in a computer-executable or computer-readable memory capable of directing a computer or another programmable data processing apparatus to implement a function in a particular manner, and thus the instructions stored in the computer-executable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks shown in succession may in fact be executed substantially concurrently or the blocks may sometimes be executed in the reverse order, depending upon the functionality involved.

Here, the term “unit” or “-er/or” in the embodiments means a software component or hardware component such as a field-programmable gate array (FPGA) or an application-specific integrated circuit (ASIC), and performs a specific function. However, the term "unit" or "-er/or" is not limited to software or hardware. The "unit" or "-er/or" may be formed so as to be in an addressable storage medium, or may be formed so as to operate one or more processors. Thus, for example, the term "unit" or "-er/or" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" or "-ers/ors" may be associated with the smaller number of components and "units" or "-ers/ors", or may be divided into additional components and "units" "-ers/ors". Furthermore, the components and "units" or "-ers/ors" may be embodied to reproduce one or more central processing units (CPUs) in a device or security multimedia card. Also, in the embodiments, the "unit" or "-er/or" may include at least one processor.

Also, terms for identifying access nodes, terms denoting network entities, terms denoting messages, terms denoting interfaces between network entities, terms denoting various types of identification information, etc. used herein are exemplified for convenience of description. Thus, the terms used in the present disclosure are not limited and other terms denoting targets having the same technical meanings may be used.

The present disclosure provides a method and apparatus in which a terminal processes radio resource control (RRC) connection establishment with a base station through a sidelink relay in a wireless communication system. The present disclosure provides a method and apparatus in which a sidelink relay processes configuration information for relaying data/signaling between a terminal and a base station, in a wireless communication system.

The technical problems to be achieved by the present disclosure are not limited to the technical problems mentioned above, and other technical problems that are not mentioned will be clearly understood by one of ordinary skill in the art from the following description.

According to an embodiment of the present disclosure, provided is a method performed by a terminal in a wireless communication system. The method may include: determining a connection to a base station through a sidelink relay depending on whether a direct link condition to the base station is satisfied; transmitting radio resource control (RRC) connection establishment message to the sidelink relay by using a resource allocated from a sidelink transmission resource pool so as to transmit the RRC connection establishment message to the base station through the sidelink relay; and receiving, from the sidelink relay, RRC connection establishment complete message transmitted by the base station, by using the resource allocated from the sidelink transmission resource pool.

Embodiments of the present disclosure will be described mainly based on a new radio access network (RAN) (new radio (NR)) on the 5$^{th}$ generation (5G) mobile communication standard specified by the 3$^{rd}$ generation partnership project (3GPP) that is a standardization organization for mobile communication standards, and a packet core (5G system, 5G core network, or next generation (NG) core) that is a core network. However, it will be obvious to one of ordinary skill in the art that the main subject matter of the present disclosure is applicable to other communication systems having a similar technical background, with a slight modification within a range that is not significantly outside the scope of the present disclosure.

In the 5G system, a network data collection and analysis function (NWDAF) that is a network function for providing a function of analyzing and providing data collected in a 5G network may be defined to support network automation. NWDAF may provide results of collecting/storing/analyzing information from the 5G network to an unspecified network function (NF), and the analysis results may be independently used in each NF.

Hereinafter, for convenience of description, some terms and names defined by the 3GPP long term evolution (LTE) standard (standard of 5G, NR, LTE, or similar system) may be used. However, the present disclosure is not limited by such terms and names, and may be equally applied to systems conforming to other standards.

In the description below, the term indicating a signal, the term indicating a channel, the term indicating control information, the term indicating a network entity, the term indicating a component of an apparatus, and the like are exemplified for convenience of descriptions. Thus, the terms used in the present disclosure are not limited and other terms denoting targets having the same technical meanings may be used.

Hereinafter, a base station is an entity that allocates resources to a terminal, and may be at least one of a gNode B (gNB), an eNode B (eNB), a Node B (NB), a base station (BS), a wireless access unit, a BS controller, and a node on a network. Examples of a terminal may include user equipment (UE), a mobile station (MS), a cellular phone, a smartphone, a computer, and a multimedia system capable of performing a communication function. However, these are only examples and the base station and the terminal are not limited by those examples. In the present disclosure, an evolved node B (eNB) will be used interchangeably with a next generation node B (gNB) for convenience of descriptions. In other words, a base station described as an eNB may also indicate a gNB. In the present disclosure, the term 'terminal' may indicate not only mobile phones, narrow band-Internet of things (NB-IoT) devices, and sensors, but also various wireless communication devices.

In particular, the present disclosure may be applied to 3GPP NR (5$^{th}$ generation (5G) mobile communication standard). Also, the present disclosure may be applied to intelligent services (e.g., smart homes, smart buildings, smart cities, smart cars or connected cars, health care, digital education, retail business, and security and safety related services) based on 5G communication technology and Internet of things (IoT) related technology. In the present disclosure, an eNB may be interchangeably used with a gNB for convenience of description. In other words, a base station described as an eNB may also indicate a gNB. Also, the term 'terminal' may indicate not only mobile phones, narrow band-Internet of things (NB-IoT) devices, and sensors, but also other wireless communication devices.

Wireless communication systems have been developed from wireless communication systems providing voice centered services in the early stage toward broadband wireless communication systems providing high-speed, high-quality packet data services, like communication standards of high speed packet access (HSPA), long term evolution (LTE or evolved universal terrestrial radio access (E-UTRA)), LTE-advanced (LTE-A), and LTE-Pro of the 3GPP, high rate packet data (HRPD) and ultra-mobile broadband (UMB) of 3GPP2, IEEE 802.16e or the like.

As a representative example of the broadband wireless communication system, the LTE system has adopted an orthogonal frequency division multiplexing (OFDM) scheme in a downlink (DL) and has adopted a single carrier frequency division multiple access (SC-FDMA) scheme in an uplink (UL). The UL refers to a radio link through which a terminal (a UE or an MS) transmits data or a control signal to a base station (e.g., eNB), and the DL refers to a radio link through which a base station transmits data or a control signal to a terminal. The multiple access scheme as described above normally allocates and operates time-frequency resources including data or control information to be transmitted to each other to prevent the time-frequency resources from overlapping with each other, that is, establish orthogonality, thereby dividing the data or the control information of each user.

As a future communication system after the LTE system, that is, a 5G communication system, has to be able to freely reflect various requirements of a user and a service provider, and thus, services satisfying various requirements at the same time need to be supported. The services considered for the 5G communication system include enhanced mobile broadband (eMBB), massive machine type communication (mMTC), ultra-reliability low latency communication (hereinafter, URLLC), etc.

According to some embodiments, the eMBB aims to provide a higher data rate than a data rate supported by the LTE, LTE-A, or LTE-Pro system. For example, in the 5G communication system, the eMBB should be able to provide a peak data rate of 20 Gbps in a downlink and a peak data rate of 10 Gbps in an uplink from the viewpoint of one base station. In addition, the 5G communication system should provide the increased user perceived data rate of the terminal simultaneously with providing the peak data rate. To satisfy these requirements, the 5G communication systems may require various enhanced transmission/reception technologies including enhanced multiple-input and multiple-output (MIMO). In addition, signals are transmitted using a transmission bandwidth of up to 20 MHz in a 2 GHz band used by the current LTE system, but the 5G communication system uses a bandwidth wider than 20 MHz in a frequency band of 3 to 6 GHz or more than 6 GHz, thereby satisfying a data rate required in the 5G communication system.

At the same time, the mMTC is being considered to support application services such as IoT in the 5G communication system. The mMTC is required for an access support of a large-scale terminal in a cell, coverage enhancement of a terminal, improved battery time, and cost reduction of a terminal in order to efficiently provide the IoT. The IoT needs to be able to support a large number of terminals (e.g., 1,000,000 terminals/km$^2$) in a cell because it is attached to various sensors and various devices to provide communication functions. In addition, the terminals supporting the mMTC are more likely to be positioned in shaded areas not covered by a cell, such as the underground of a building due to nature of services, and thus, the terminal requires a wider coverage than other services provided by the 5G communication system. The terminals that support the mMTC should be configured as inexpensive terminals and require very long battery lifetime, such as 10 to 15 years, because it is difficult to frequently replace batteries of the terminals.

Finally, the URLLC that is a cellular-based wireless communication service used for mission-critical purposes may be used, for example, in remote control for robots or machinery, industrial automation, unmanaged aerial vehicles, remote health care, or emergency alert. Accordingly, communication provided by the URLLC should provide very low latency (ultra-low latency) and very high reliability (ultra-high reliability). For example, a service supporting the URLLC should satisfy air interface latency smaller than 0.5 milliseconds and at the same time, may have a requirement of a packet error rate of $10^{-5}$ or less. Accordingly, for URLLC-supportive services, the 5G communication system may be required to provide a transmit time interval (TTI) shorter than those for other services while securing reliable communication links by allocating a broad resource in a frequency band.

The three services, that is, eMBB, URLLC, and mMTC, considered in the above 5G communication system may be multiplexed in one system and may be transmitted. In this case, the services may use different transmission and reception methods and transmission and reception parameters in order to meet their different requirements. However, the mMTC, URLLC, and eMBB are examples of different service types, and service types to which the present disclosure is applied are not limited thereto.

Also, although embodiments of the present disclosure are described by using the LTE, LTE-A, LTE Pro, or 5G (or NR) system, the embodiments of the present disclosure may be applied to other communication systems having a similar technical background or channel type. Furthermore, embodiments of the present disclosure are applicable to other communication systems through modification at the discretion of one of ordinary skill in the art without greatly departing from the scope of the present disclosure.

Hereinafter, operation principles of the present disclosure will be described with reference to accompanying drawings. Terms used below are defined in consideration of functions in the present disclosure, and may have different meanings according to an intention of a user or operator, customs, or the like. Therefore, the terms used herein have to be defined based on the meaning of the terms together with the description throughout the specification.

In the description below, a physical channel and a signal may be used interchangeably with data or a control signal. For example, a physical downlink shared channel (PDSCH) is a term referring to a physical channel where data is transmitted, but the PDSCH may also be used to refer to data. In other words, in the present disclosure, the expression "a physical channel is transmitted" may be equally interpreted as the expression "data or a signal is transmitted via a physical channel".

In the present disclosure hereinafter, higher layer signaling denotes a method of transmitting a signal from a base station to a terminal by using a downlink data channel of a physical layer or from a terminal to a base station by using an uplink data channel of a physical layer. The higher layer signaling may be understood as radio resource control (RRC) signaling or a media access control (MAC) control element (CE).

Also, in the present disclosure, the expression "greater than" or "less than" is used to determine whether a specific condition is satisfied or fulfilled, but the expression only an example and another expression "equal to or greater than" or "equal to or less than" is not excluded. A condition described to be "equal to or greater than" may be replaced by "greater than", a condition described to be "equal to or less than" may be replaced by "less than", and a condition described to be "equal to or greater than, and less than" may be replaced by "greater than, and equal to or less than".

Also, embodiments of the present disclosure are described by using the terms used in some communication standards (for example, 3rd generation partnership project (3GPP), but the embodiments are only examples for description. The embodiments of the present disclosure may be easily modified and applied to another communication system.

The present disclosure relates to a method and apparatus in which a terminal processes RRC connection establishment with a base station through a sidelink relay in a wireless communication system. The present disclosure relates a method and apparatus in which a sidelink relay obtains configuration information required to relay data/signaling between a terminal and a base station, in a wireless communication system.

In particular, the present disclosure provides a method including determining whether a terminal is to perform RRC connection establishment procedure with a base station through a sidelink relay or perform the RRC connection establishment procedure through a direct link with the base station, and when the RRC connection establishment procedure with the base station is to be performed through the sidelink relay, transmitting, to the sidelink relay, the RRC connection establishment message to be transmitted to the base station by using a resource of a sidelink transmission resource pool or receiving the RRC connection establishment message transmitted by the base station from the sidelink relay by using a resource of a sidelink reception resource pool. The present disclosure provides a method of obtaining, from a base station, mapping information between a sidelink radio link control (RLC) channel of a terminal and a Uu interface RLC channel of the terminal for a sidelink relay to relay data/signaling between the terminal and the base station. According to an embodiment of the present disclosure, upon receiving, from the base station, data/signaling of the terminal through the Uu interface RLC channel of the terminal, the sidelink relay may map the data/signaling to the sidelink RLC channel of the terminal and transmit the data/signaling to the terminal by using the resource of the sidelink transmission resource pool. According to an embodiment of the present disclosure, upon receiving, from the terminal, the data/signaling of the terminal through the sidelink RLC channel of the terminal, the sidelink relay may map the data/signaling to the Uu interface RLC channel of the terminal and transmit the data/signaling to the base station by using an uplink resource. Embodiments of the present disclosure may enable the terminal to transmit or receive the data/signal to or from the base station through the sidelink relay, thereby expanding a service coverage, increasing reliability of data transmission/reception, and reducing battery usage of the terminal.

According to an embodiment of the present disclosure, a method by which a terminal processes RRC connection establishment with a base station, in a wireless communication system, may include: determining whether the terminal is to perform the RRC connection establishment with the base station through a sidelink relay or perform the RRC connection establishment directly with the base station; when the terminal is to perform the RRC connection establishment with the base station through the sidelink relay, transmitting RRC connection establishment message to the sidelink relay by using a resource of a sidelink transmission resource pool; and when the terminal is to perform the RRC connection establishment with the base station through the sidelink relay, receiving the RRC connection establishment message from the sidelink relay by using a resource of a sidelink reception resource pool. According to an embodiment of the present disclosure, a method of configuring information for a sidelink relay to relay data/signaling between a terminal and a base station, in a wireless communication system, may include: obtaining a Uu RLC channel configuration for the sidelink relay to transmit or receive, through a Uu interface, data/signaling including RRC connection establishment from the base station to the terminal; and obtaining a sidelink RLC channel configuration for the sidelink relay to transmit or receive, through a sidelink interface, the data/signaling including the RRC connection establishment from the base station to the terminal.

According to an embodiment of the present disclosure, a method and apparatus for effectively providing a service in a wireless communication system and expanding a service coverage may be provided.

The present disclosure relates to a communication technique and system for converging a 5G or pre-5G communication system for supporting a higher data rate than a beyond 4G communication system, such as LTE, to an IoT technology. The present disclosure may be applied to intelligent services (e.g., smart homes, smart buildings, smart cities, smart cars or connected cars, health care, digital education, retail business, and security and safety related services) based on 5G communication technology and IoT related technology. According to various embodiments of the present disclosure, a method and apparatus in which a terminal processes RRC connection establishment with a base station through a sidelink relay in a wireless communication system may be provided.

The effects obtainable in the present disclosure are not limited to the above-mentioned effects, and other effects not mentioned may be clearly understood by one of ordinary skill in the art from the description below.

FIG. 1A is a diagram of a wireless communication system according to an embodiment of the present disclosure.

FIG. 1A illustrates, as some of nodes using a wireless channel in the wireless communication system, a base station 110, terminals 130 and 140, and a sidelink relay 120 for relaying data transmission and reception between a base station and a terminal. Here, a sidelink relay corresponds to a user equipment (UE)-to-network (U2N) relay. FIG. 1 illustrates only one base station, but the wireless communication system may further include a base station that is the same as or similar to the base station 110.

The base station 110 is a network infrastructure providing a radio access to the terminals 130 and 140 and the sidelink relay 120. The base station 110 has a coverage defined by a certain geographic area, based on a distance at which a signal is transmittable. The base station 110 may be referred to as, in addition to a base station, an access point (AP), an evolved node B (eNB), a 5G node, a next-generation node B (gNB), a wireless point, a transmission/reception point (TRP), or another term having an equivalent technical meaning.

The sidelink relay 120 is a device used by a user or the network infrastructure, and may communicate with the base station 110 through a wireless channel. A link from the base station 110 to the sidelink relay 120 may be referred to as a downlink (DL) and a link from the sidelink relay 120 to the base station 110 may be referred to as an uplink (UL). The base station 110 and toe sidelink relay 120 may be connected to each other through a Uu interface. The UL may denote a radio link where the sidelink relay 120 transmits data or a control signal to the base station 110, and the DL may denote a radio link where the base station 110 transmits data or a control signal to the sidelink relay 120.

The sidelink relay 120 may communicate with the terminal 130 and the terminal 140 through a wireless channel. Here, a link between the sidelink relay 120 and the terminal 130 and a link between the sidelink relay 120 and the terminal 140 are referred to as sidelinks, and the sidelink may be referred to as a PC5 interface.

Each of the terminals 130 and 140 is a device used by a user, and may communicate with the base station 110 through a wireless channel or communicate for a network with the sidelink relay 120 through a wireless channel. In the present disclosure, each of the terminal 130 and the terminal 140 are illustrated only when communication is performed with the sidelink relay 120 through a wireless channel. At least one of the terminal 130 and the terminal 140 may operate without involvement of a user. In other words, at least one of the terminal 130 and the terminal 140 is a device performing machine type communication (MTC), and may not be carried by the user. The terminal 130 and the terminal 140 may each be referred to as, in addition to a terminal, a user equipment (UE), a mobile station, a subscriber station, a remote terminal, a wireless terminal, a user device, or another term having an equivalent technical meaning.

Figure 1B:
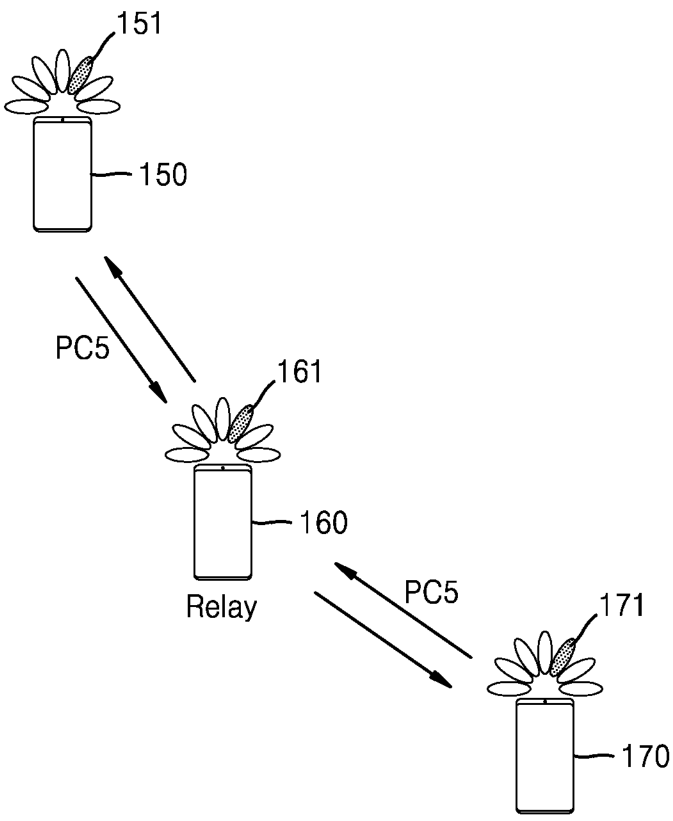
FIG. 1B is a diagram of a wireless communication system according to an embodiment of the present disclosure.

FIG. 1B is a diagram of a wireless communication system according to an embodiment of the present disclosure.

FIG. 1B illustrates the wireless communication system including, as some of nodes using a wireless channel in the wireless communication system, terminals 150 and 170 and a sidelink relay 160 for relaying data transmission and reception between terminals. Here, the sidelink relay 160 corresponds to a UE-to-UE (U2U) relay.

The sidelink relay 160 may communicate with the terminal 150 and the terminal 170 through a wireless channel. Here, a link between the sidelink relay 160 and the terminal 150 and a link between the sidelink relay 160 and the terminal 170 are referred to as sidelinks, and the sidelink may be referred to as a PC5 interface.

Each of the terminal 150 and the terminal 170 is a device used by a user, and may perform direct communication through a wireless channel or may communicate with an opponent terminal through the sidelink relay 160 and the wireless channel. Here, a link between the terminal 150 and the terminal 170, a link between the terminal 150 and the sidelink relay 160, and a link between the terminal 170 and the sidelink relay 160 are referred to as sidelinks, and the sidelink may be referred to as a PC5 interface.

At least one of the terminal 150 and the terminal 170 may operate without involvement of a user. In other words, at least one of the terminal 150 and the terminal 170 is a device performing MTC, and may not be carried by the user. The terminal 150 and the terminal 170 may each be referred to as, in addition to a terminal, a UE, a mobile station, a subscriber station, a remote terminal, a wireless terminal, a user device, or another term having an equivalent technical meaning.

In the following description, a UL or a DL may also be referred to as a Uu interface, and a sidelink may be referred to as PC5.

The base station 110, the sidelink relays 120 and 160, the terminals 130, 140, 150, and 170 may transmit and receive wireless signals in mmWave bands (e.g., 28 GHz, 30 GHz, 38 GHz, and 60 GHz). Here, for enhancement of a channel gain, the base station 110, the sidelink relays 120 and 160, and the terminals 130, 140, 150 and 170 may perform beamforming. Here, the beamforming may include transmission beamforming and reception beamforming. In other words, the base station 110, the sidelink relays 120 and 160, and the terminals 130, 140, 150, and 170 may provide directivity to a transmission signal or a reception signal. In this regard, the base station 110, the sidelink relays 120 and 160, and the terminals 130, 140, 150, and 170 may select serving beams 112, 113, 121, 131, 141, 151, 161, and 171 through a beam search or beam management procedure. After the serving beams 112, 113, 121, 131, 141, 151, 161, and 171 are selected, communication may be performed through a resource in a quasi-co-located (QCL) relationship with a resource through which the serving beams 112, 113, 121, 131, 141, 151, 161, and 171 are transmitted.

It may be evaluated that a first antenna port and a second antenna port are in a QCL relationship when large-scale characteristics of a channel that transmitted a symbol on the first antenna port are able to be inferred from a channel that transmitted a symbol on the second antenna port. For example, the large-scale characteristics may include at least one of delay spread, Doppler spread, Doppler shift, average gain, average delay, and spatial receiver parameter.

The terminals 130, 140, 150, and 170 shown in FIGS. 1A and 1B may support vehicle communication. Regarding the vehicle communication, the standardization work for a vehicle-to-everything (V2X) technology has been completed in 3GPP release 14 and release 15, based on a device-to-device (D2D) structure in an LTE system, and the standardization work for the V2X technology has been completed in 3GPP release 16, based on 5G NR.

In NR V2X, unicast communication between terminals, groupcast (or multicast) communication, and broadcast communication are supported. Also, unlike LTE V2X that aims at transmitting/receiving basic safety information required for driving of a vehicle, NR V2X aims at providing further advanced services, such as platooning, advanced driving, extended sensor, and remote driving. V2X services may be classified into a basic safety service and an advanced service.

The basic safety service may include from a vehicle notification (a cooperative awareness message (CAM) or basic safety message (BSM)) service to detailed services, such as a left turn notification service, a front vehicle collision warning service, an emergency vehicle approach notification service, a forward obstacle warning service, and an intersection signal service, and V2X information may be transmitted/received by using a broadcast, unicast, or groupcast transmission method.

The advanced service has strengthened quality of service (QOS) requirements compared to the basic safety service, and requires a method of transmitting/receiving V2X information by using unicast and groupcast transmission methods in addition to broadcast, such that the V2X information is transmitted/received within a specific vehicle group or the V2X information is transmitted/received between two vehicles. The advanced service may include detailed services, such as a platooning service, an autonomous driving service, a remote driving service, and an extended sensor-based V2X service. Also, NR V2X may provide a public safety service by supporting a device-to-device (D2D) direct communication service in a region without a network infrastructure.

Hereinafter, a sidelink (SL) denotes a transmission/reception path for a signal between terminals or a transmission/reception path for a signal between a terminal and a relay, and the SL and a PC5 interface may be interchangeably used.

Hereinafter, a base station is an entity performing resource allocation of a terminal and a relay, and may be a base station supporting both V2X communication and general cellular communication or a base station supporting only V2X communication. In other words, the base station may denote an NR base station (for example, gNB), an LTE base station (for example, eNB), or a road site unit (RSU).

The terminal may include not only a general UE and a mobile station, but also a vehicle supporting vehicle-to-vehicle (V2V) communication, a vehicle or handset (for example, a smartphone) of a pedestrian supporting vehicle-to-pedestrian (V2P) communication, a vehicle supporting vehicle-to-network (V2N) communication, a vehicle supporting vehicle-to-infrastructure (V2I) communication, an RSU with a terminal function, an RSU with a base station function, and an RSU with a part of a base station function and a part of a terminal function.

Meanwhile, in the present disclosure, a terminal may denote a vehicle supporting V2V communication, a vehicle or handset (or smartphone) of a pedestrian supporting V2P communication, a vehicle supporting V2N communication, or a vehicle supporting V2I communication. The terminal may denote a UE supporting communication between devices of a public safety network.

Also, in the present disclosure, a terminal may denote an RSU with a terminal function, an RSU with a base station function, or an RSU with a part of a base station function and a part of a terminal function.

In the present disclosure, a relay may denote a vehicle supporting V2X communication or a UE supporting communication between devices of a public safety network. Also, in the present disclosure, a relay may denote a device with a terminal function, a device with a base station function, or a device with a part of a terminal function and a part of a base station function.

Figure 2:
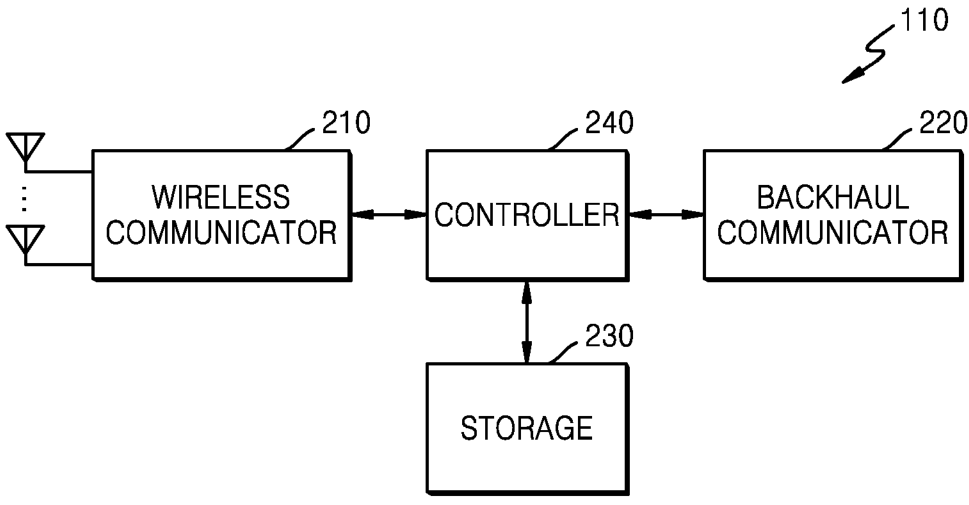
FIG. 2 is a diagram of a configuration of a base station in a wireless communication system, according to an embodiment of the present disclosure.

FIG. 2 is a diagram of a configuration of a base station in a wireless communication system, according to an embodiment of the present disclosure.

The configuration shown in FIG. 2 may be understood as a configuration of the base station 110. Terms such as "unit", ". . . or(er)", and the like described below denote a unit that processes at least one function or operation, which may be implemented in hardware or software, or implemented in a combination of hardware and software.

Referring to FIG. 2, the base station 110 may include a wireless communicator 210, a backhaul communicator 220, a storage 230, and a controller 240. However, the components of the base station 110 are not limited thereto. For example, the base station may include more or fewer components than those described above. In addition, the wireless communicator 210, the backhaul communicator 220, the storage 230, and the controller 240 may be embodied in a form of one chip. Also, the controller 240 may include one or more processors.

The wireless communicator 210 may perform functions for transmitting or receiving a signal through a wireless channel. For example, the wireless communicator 210 may perform conversion between a baseband signal and a bit string, based on physical layer specifications of a system. For example, for data transmission, the wireless communicator 210 may generate complex symbols by encoding and modulating a transmission bit string. For data reception, the wireless communicator 210 may reconstruct a reception bit string by demodulating and decoding a baseband signal.

Also, the wireless communicator 210 up-converts a baseband signal to a radio frequency (RF) band signal and then transmits the RF band signal through an antenna, and down-converts an RF band signal received through the antenna to a baseband signal. In this regard, the wireless communicator 210 may include a transmit filter, a receive filter, an amplifier, a mixer, an oscillator, a digital-to-analog converter (DAC), and an analog-to-digital converter (ADC). Also, the wireless communicator 210 may include a plurality of transmission/reception paths. Furthermore, the wireless communicator 210 may include at least one antenna array including a plurality of antenna elements.

In terms of hardware, the wireless communicator 210 may be configured as a digital unit and an analog unit, and the analog unit may be configured as a plurality of sub-units depending on operating power, an operating frequency, or the like. The digital unit may be implemented as at least one processor (for example, a digital signal processor (DSP).

The wireless communicator 210 transmits and receives a signal as described above. Accordingly, the wireless communicator 210 may be entirely or partially referred to as a transmitter, a receiver, or a transceiver. In the descriptions below, transmission and reception performed through a wireless channel may be used in the meaning that the process described above is performed by the wireless communicator 210.

The backhaul communicator 220 may provide an interface for communicating with other nodes in a network. In other words, the backhaul communicator 220 may convert a bit string transmitted from the base station 110 to another node, for example, another access node, another base station, a higher node, or a core network, into a physical signal, and convert a physical signal received from the other node into a bit string.

The storage 230 may store data for operation of the base station 110, such as basic programs, application programs, and configuration information. The storage 230 may be configured as a volatile memory, a nonvolatile memory, or a combination of a volatile memory and a nonvolatile memory. The storage 230 may provide the stored data upon request by the controller 240.

The controller 240 may control overall operations of the base station 110. For example, the controller 240 may transmit and receive signals through the wireless communicator 210 or through the backhaul communicator 220. The controller 240 records and read data on and from the storage 230. The controller 240 may perform functions of a protocol stack required in the communication standard. According to another embodiment, the protocol stack may be included in the wireless communicator 210. In this regard, the controller 240 may include at least one processor. According to embodiments, the controller 240 may control the base station 110 to perform operations according to embodiments described below.

Figure 3:
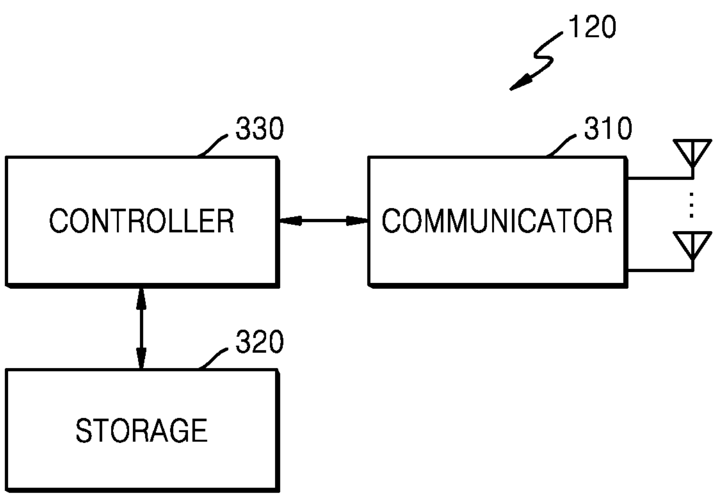
FIG. 3 is a diagram of a configuration of a terminal in a wireless communication system, according to an embodiment of the present disclosure.

FIG. 3 is a diagram of a configuration of a terminal in a wireless communication system, according to an embodiment of the present disclosure.

The terminal including the configuration of FIG. 3 may correspond to the sidelink relay 120 of FIG. 1A or may correspond to one of the terminals 130, 140, 150, and 170 of FIGS. 1A and 1B.

The configuration shown in FIG. 3 may be understood as configurations of the sidelink relay 120 and terminals 130, 140, 150, and 170. Terms such as "unit", ". . . or(er)", and the like described below denote a unit that processes at least one function or operation, which may be implemented in hardware or software, or implemented in a combination of hardware and software.

Referring to FIG. 3, the sidelink relay 120 and the terminal may each include a communicator 310, a storage 320, and a controller 330. However, the components of the terminal are not limited thereto. For example, the terminal may include more or fewer components than those described above. In addition, the communicator 310, the storage 320, and the controller 330 may be embodied in a form of one chip. Also, the controller 330 may include one or more processors.

The communicator 310 performs functions for transmitting or receiving a signal through a wireless channel. For example, the communicator 310 may perform conversion between a baseband signal and a bit string, based on physical layer specifications of a system. For example, for data transmission, the communicator 310 generates complex symbols by encoding and modulating a transmission bit string. Also, for data reception, the communicator 310 may reconstruct a reception bit string by demodulating and decoding a baseband signal. The communicator 310 up-converts a baseband signal to an RF band signal and then transmits the RF band signal through an antenna, and down-converts an RF band signal received through the antenna to a baseband signal. For example, the communicator 310 may include a transmit filter, a receive filter, an amplifier, a mixer, an oscillator, a DAC, and an ADC.

Also, the communicator 310 may include a plurality of transmission and reception paths. Furthermore, the communicator 310 may include at least one antenna array including a plurality of antenna elements. In terms of hardware, the communicator 310 may include a digital circuit and an analog circuit (for example, a radio frequency integrated circuit (RFIC)). Here, the digital circuit and the analog circuit may be implemented in one package. Also, the communicator 310 may include a plurality of RF chains. In addition, the communicator 310 may perform beamforming.

The communicator 310 may transmit and receive signals as described above. Accordingly, the communicator 310 may be entirely or partially referred to as a transmitter, a receiver, or a transceiver. In the descriptions below, transmission and reception performed through the wireless channel may be used in the meaning that the process described above is performed by the communicator 310.

The storage 230 may store data for operations of the terminal, such as basic programs, application programs, and configuration information. The storage 320 may be configured as a volatile memory, a nonvolatile memory, or a combination of a volatile memory and a nonvolatile memory. Also, the storage 320 provides stored data upon request by the controller 330.

The controller 330 may control overall operations of the terminal. For example, the controller 330 may transmit and receive signals through the communicator 310. The controller 330 records and read data on and from the storage 320. The controller 330 may perform functions of a protocol stack required in the communication standard. In this regard, the controller 330 may include at least one processor or microprocessor, or may be a part of a processor. A part of the communicator 310 and the controller 330 may be referred to as a communication processor (CP). According to embodiments, the controller 330 may control the terminal to perform operations according to embodiments described below.

Figure 4:
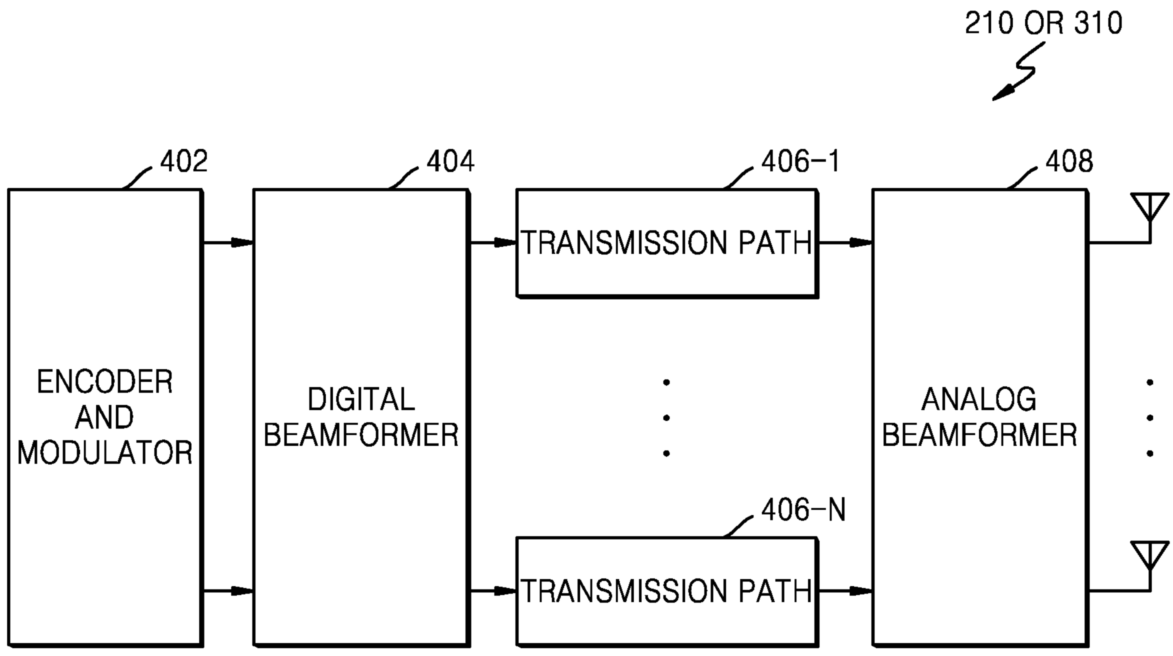
FIG. 4 is a diagram of a configuration of a communicator in a wireless communication system, according to an embodiment of the present disclosure.

FIG. 4 is a diagram of a configuration of a communicator in a wireless communication system, according to an embodiment of the present disclosure.

FIG. 4 illustrates an example of a detailed configuration of the wireless communicator 210 of FIG. 2 or the communicator 310 of FIG. 3. In detail, FIG. 4 illustrates components for performing beamforming, as a part of the wireless communicator 210 of FIG. 2 or the communicator 310 of FIG. 3.

Referring to FIG. 4, the wireless communicator 210 or the communicator 310 may include an encoder and modulator 402, a digital beamformer 404, a plurality of transmission paths 406-1 to 406-N, and an analog beamformer 408.

The encoder and modulator 402 may perform channel encoding. For the channel encoding, at least one of low-density parity check (LDPC) code, convolutional code, and polar code may be used. The encoder and modulator 402 generates modulation symbols by performing constellation mapping.

The digital beamformer 404 may perform beamforming on a digital signal (e.g., the modulated symbols). In this regard, the digital beamformer 404 multiplies the modulation symbols by beamforming weights. Here, the beamforming weight is used to change a magnitude and phase of a signal, and may be referred to as a precoding matrix or a precoder. The digital beamformer 404 may output modulated symbols that are digitally-beamformed by the plurality of transmission paths 406-1 to 406-N. Here, according to a multiple input multiple output (MIMO) transmission technique, the modulation symbols may be multiplexed or same modulation symbols may be provided to the plurality of transmission paths 406-1 to 406-N.

The plurality of transmission paths 406-1 to 406-N may convert digitally-beamformed digital signals to analog signals. In this regard, each of the plurality of transmission paths 406-1 to 406-N may include an inverse fast Fourier transform (IFFT) operator, a cyclic prefix (CP) inserter, a DAC, and an up-converter. The CP inserter is for orthogonal frequency division multiplexing (OFDM) and may be excluded when another physical layer method (for example, a filter bank multi-carrier (FBMC)) is applied. That is, the plurality of transmission paths 406-1 to 406-N may provide independent signal processing processes to a plurality of streams generated through digital beamforming. However, depending on implementation methods, some elements of the plurality of transmission paths 406-1 to 406-N may be commonly used.

The analog beamformer 408 may perform beamforming on the analog signals. In this regard, the digital beamformer 404 may multiply the analog signals by beamforming weights. Here, the beamforming weights are used to change magnitude and phase of a signal. In detail, the analog beamformer 408 may be variously configured, based on connection structures between the plurality of transmission paths 406-1 to 406-N and antennas. For example, each of the plurality of transmission paths 406-1 to 406-N may be connected to one antenna array. As another example, the plurality of transmission paths 406-1 to 406-N may be connected to one antenna array. As another example, the plurality of transmission paths 406-1 to 406-N may be adaptively connected to one antenna array or connected to two or more antenna arrays.

Figure 5:
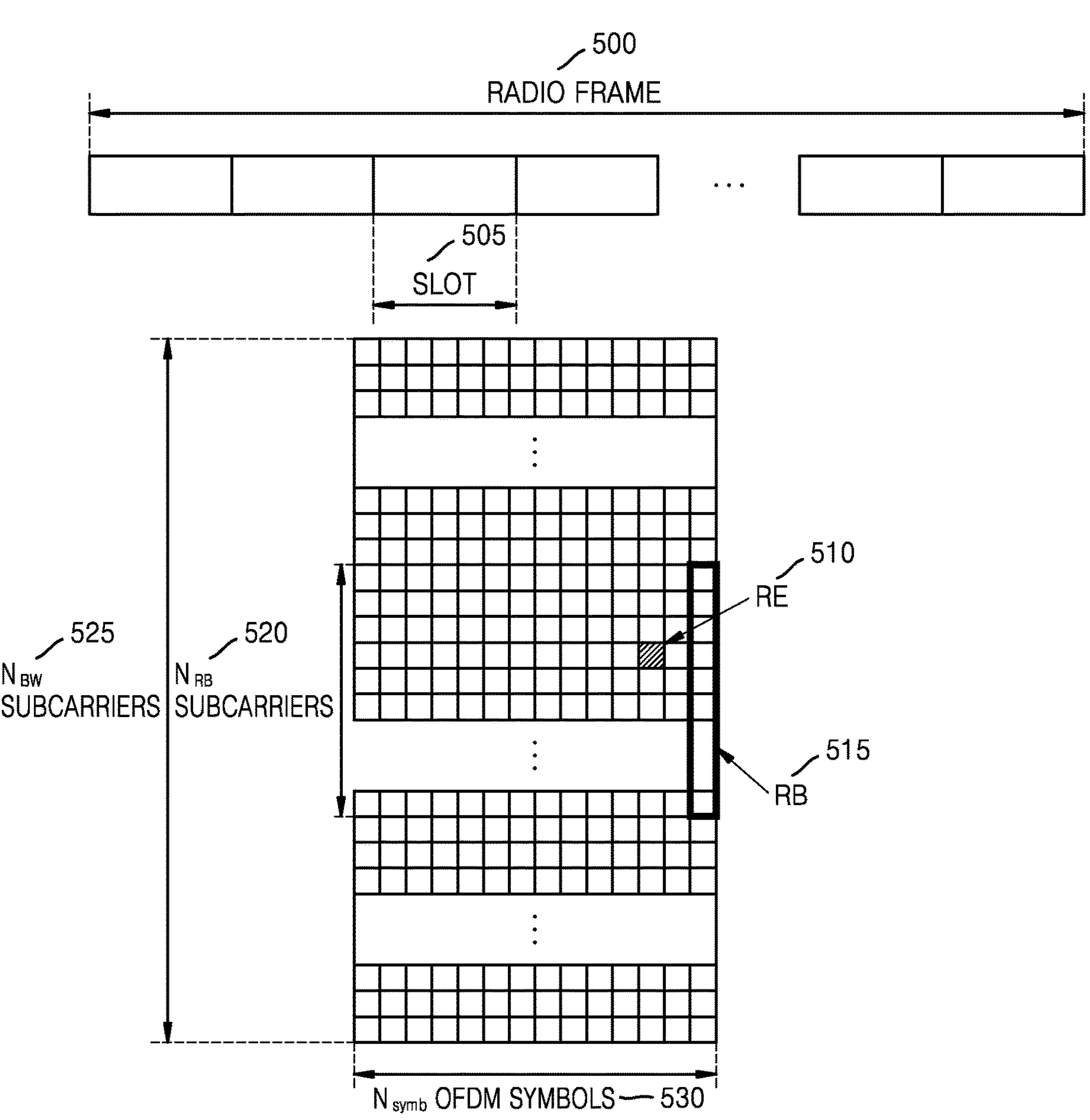
FIG. 5 is a diagram of a structure of a time-frequency resource in a wireless communication system, according to an embodiment of the present disclosure.

FIG. 5 is a diagram of a structure of a time-frequency resource in a wireless communication system, according to an embodiment of the present disclosure.

In FIG. 5, a horizontal axis represents a time domain and a vertical axis represents a frequency domain in a radio resource region. A minimum transmission unit in the time domain is an OFDM symbol or a discrete Fourier transform-spread (DFT-S)-OFDM symbol, and $N_{symb}$ OFDM symbols or DFT-S-OFDM symbols 530 are included in one slot 505. Unlike a slot, a length of a subframe in an NR system may be defined to be 1.0 ms, and a length of a radio frame 500 may be defined to be 10 ms. A minimum transmission unit in the frequency domain is a subcarrier, and a transmission bandwidth of the whole system may include $N_{BW}$ subcarriers 525 in total. Specific numerical values such as $N_{symb}$ and $N_{BW}$ may be variously applied according to a system.

A base unit of a time-frequency resource region is a resource element (RE) 510, and may be indicated by an OFDM symbol index, a DFT-S-OFDM symbol index, or a subcarrier index. A resource block (RB) 515 may be defined by $N_{RB}$ consecutive subcarriers 520 in the frequency domain. Generally, a minimum transmission unit of data is an RB, and in the NR system, $N_{symb}$=14 and $N_{RB}$=12.

The structure of the time-frequency resource of FIG. 5 may be applied to a Uu interface. Also, the structure of the time-frequency resource of FIG. 5 may be similarly applied to a sidelink.

According to an embodiment of the present disclosure, operation procedures of a terminal (also referred to as a remote UE), a sidelink relay, and a base station for processing RRC connection establishment processing procedure of the terminal for supporting data transmission/reception through a direct link between the terminal and the base station, will be described.

Also, according to another embodiment of the present disclosure, operation procedures of a terminal, a sidelink relay (also referred to as a relay or relay UE), and a base station for processing RRC connection establishment procedure of the terminal for supporting a case where data transmission/reception is performed through a connection between the terminal and the base station through the sidelink relay, will be described.

According to various embodiments of the present disclosure, a relay function configuration procedure of a sidelink relay for relaying data and signaling between a terminal and a base station, will be described.

Also, according to various embodiments of the present disclosure, operations of a sidelink relay and a base station for processing mapping information between a Uu RLC channel of a terminal and a sidelink RLC channel of the terminal so as to relay data and signaling between the terminal and the base station, will be described.

The sidelink relay may be authenticated to be used for at least one or a combination of a specific service, a specific terminal, a specific sidelink flow, a specific sidelink bearer, a specific unicast link, a specific source identifier, and a specific target identifier.

A sidelink relay may establish a direct link with a terminal authenticated at a time of installation. For example, the sidelink relay may obtain a direct link establishment request for a sidelink relay purpose from the authenticated terminal while transmitting a relay discovery message, and establish a sidelink direct link with the terminal. As another example, the sidelink relay may obtain a relay discovery solicitation message from the authenticated terminal, obtain the direct link establishment request for the sidelink relay purpose from the terminal by transmitting a discovery message to the terminal, and establish the sidelink direct link with the terminal.

Upon receiving a PC5 direct link establishment request message from the authenticated terminal, the sidelink relay may establish the sidelink direct link with the terminal. The PC5 direct link establishment request used by the sidelink relay and the terminal for a relay connection may include at least one or a combination of methods of including "a connection instruction through a relay" in a general PC5 direct link establishment request message, separately defining "a PC5 direct link establishment message for a relay purpose", and configuring a general PC5 direct link establishment request message transmitted from a relay sidelink radio bearer (SLRB) to be used.

Figure 6A:
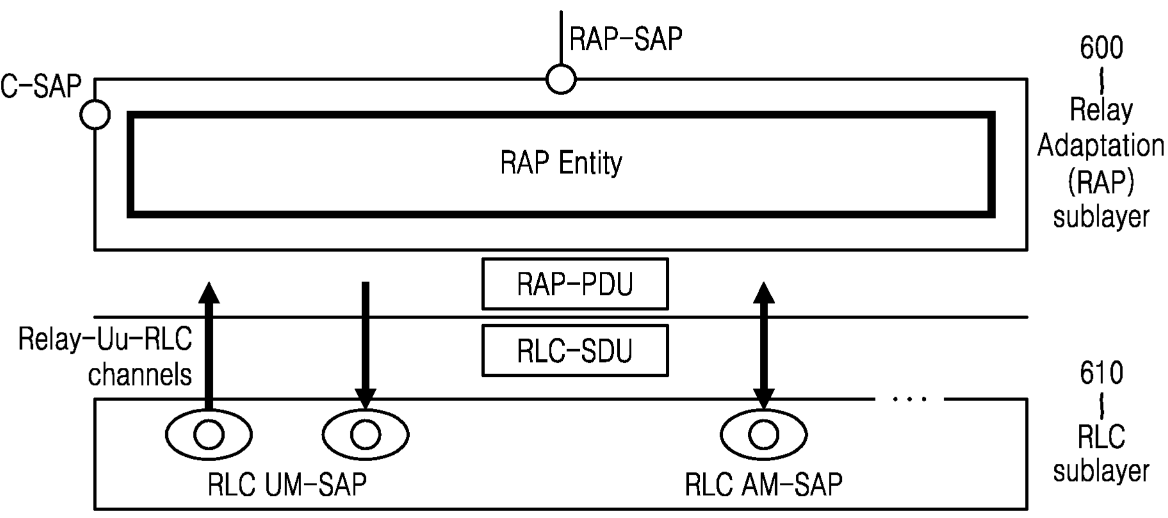
FIG. 6A is a diagram of a relay adaptation (RAP) sublayer processing signaling/data of a terminal, in a base station and a sidelink relay, according to an embodiment of the present disclosure.

FIG. 6A is a diagram of a relay adaptation (RAP) sublayer processing signaling/data of a terminal, in a base station and a sidelink relay, according to an embodiment of the present disclosure.

Referring to FIG. 6A, a Uu interface RLC sublayer 610 of the base station and the sidelink relay includes an RLC entity, and the RLC sublayer 610 may process an RLC channel mapped to the data/signaling of the terminal corresponding to an RLC unacknowledged mode (UM), an RLC acknowledged mode (AM), or an RLC transparent mode (TM) (not shown).

An RAP sublayer 600 may be provided on the Uu interface RLC sublayer 610 of the base station and the sidelink relay. The RAP sublayer 600 may include an RAP entity.

Meanwhile, for a Uu RLC entity, an RLC entity corresponding to a signaling radio bearer (SRB)/data radio bearer (DRB) between the sidelink relay and the base station, and an RLC entity corresponding to an SRB/DRB of the terminal, which are transmitted and received between the terminal and the base station through the sidelink relay may be separately configured.

When DL data/signaling from the base station to the terminal are processed, the RAP entity of the RAP sublayer 600 may determine RAP identification information for a packet data convergence protocol (PDCP) protocol data unit (PDU) transmitted from a higher layer. When UL data/signaling from the terminal to the base station are processed, the RAP entity of the RAP sublayer 600 may perform an operation of determining RAP identification information for RLC PDU transmitted from a lower layer.

Also, the RAP entity of the RAP sublayer 600 may determine a sidelink relay Uu relay RLC channel (egress) of a corresponding packet. When the DL data/signaling from the base station to the terminal are processed, the RAP entity of the RAP sublayer 600 may operate as below.

The RAP entity located in the base station may process DL radio bearer mapping of the terminal, and may map end-to-end radio bearers (SRB and DRB) of the terminal and base station to a Uu relay RLC channel of the sidelink relay. Here, the base station may configure RLC channel mapping considering traffic priorities of the DRB/SRB corresponding to the data/signaling of the terminal, and PC5 quality of service (QOS) identifier (PQI) and 5G QoS identifier (5QI) mapping information. One sidelink relay Uu relay RLC channel may be mapped to one or more radio bearers (SRB and DRB) of one terminal or mapped to one or more radio bearers (SRB and DRB) of a plurality of terminals.

Also, the RAP sublayer 600 may determine identification information for a target terminal of DL packet and identification information corresponding to a target radio bearer of the target terminal. The identification information for the target terminal of the DL packet and the identification information corresponding to the target radio bearer of the target terminal may be included in a corresponding RAP PDU when the RAP PDU is configured from the RAP layer of the base station, and such information may assist in identifying the target terminal and identifying the target radio bearer of the target terminal when the RAP entity located in the sidelink relay receives the RAP PDU.

Here, the RAP entity of the sidelink relay may determine the sidelink RLC channel of the terminal, which is mapped to the sidelink relay Uu relay RLC channel. The RAP entity of the sidelink relay may perform an operation of mapping Uu relay RLC channels of one or more sidelink relays and sidelink RLC channels of one or more terminals, based on an RAP configuration configured for the terminal and a PC5 SLRB RLC configuration configured for the terminal.

When the UL data/signaling from the terminal to the base station are processed, the RAP entity of the RAP sublayer 600 may operate as below.

The RAP entity located in the sidelink relay may process mapping between the PC5 RLC channel from the terminal to the sidelink relay and the sidelink relay Uu relay RLC channel from the sidelink relay to the base station. The RAP entity of the sidelink relay may map the end-to-end radio bearers (SRB and DRB) of the terminal and the base station to the Uu relay RLC channel of the sidelink relay, even in a case of UL.

The RAP entity of the sidelink relay may perform an operation of mapping the sidelink RLC channels of one or more terminals and the Uu relay RLC channels of one or more sidelink relays, based on the RAP configuration configured for the terminal and the PC5 SLRB RLC configuration configured for the terminal. One sidelink relay Uu relay RLC channel may be mapped to one or more radio bearers (SRB and DRB) of one terminal or mapped to one or more radio bearers (SRB and DRB) of the plurality of terminals.

The sidelink relay may determine the PC5 RLC channel of each terminal and the sidelink relay Uu relay RLC channel mapped thereto, and determine identification information of each terminal and UL radio bearer/RLC channel identification information of each terminal. The identification information may be included in a corresponding RAP PDU when the RAP layer of the sidelink relay configures the RAP PDU. Such information may assist in identifying the target terminal and identifying the target radio bearer of the target terminal, when the RAP sublayer entity located in the base station receives the RAP PDU.

The RAP entity of the base station may transmit a packet to a PDCP entity corresponding to the target radio bearer of the target terminal.

Figure 6B:
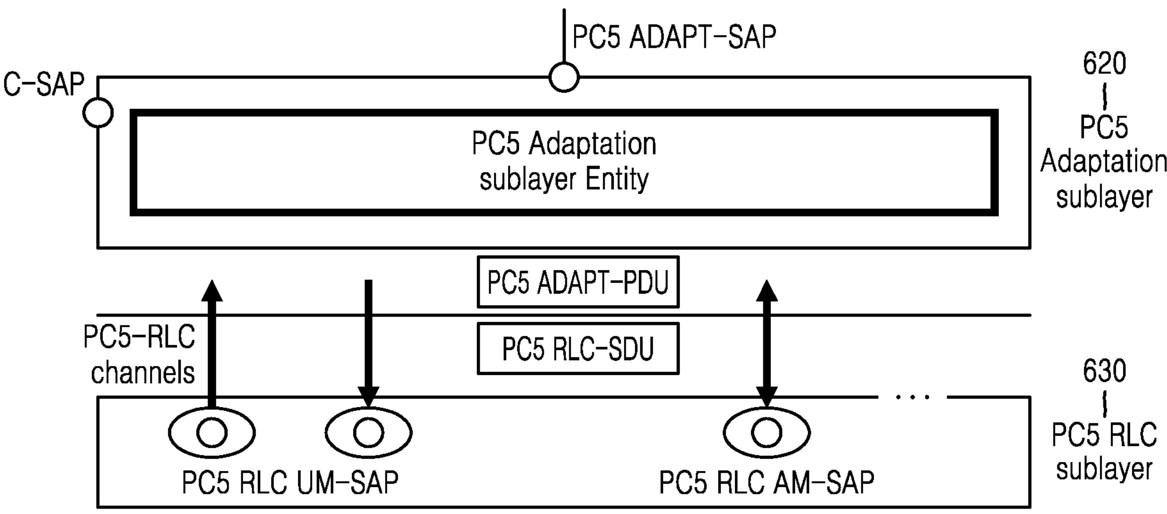
FIG. 6B is a diagram of a sidelink interface RAP sublayer and a sidelink radio link control (RLC) sublayer of a sidelink relay, according to an embodiment of the present disclosure.

FIG. 6B is a diagram of a sidelink interface RAP sublayer and a sidelink RLC sublayer of a sidelink relay, according to an embodiment of the present disclosure.

Referring to FIG. 6B, a sidelink interface RLC sublayer 630 of the sidelink relay includes a PC5 RLC entity, and a PC5 RLC sublayer may process a PC5 RLC channel mapped to data/signaling of a corresponding terminal in a PC5 RLC UM, PC5 RLC AM, or PC5 RLC TM (not shown).

A sidelink RAP sublayer 620 may be located on the RLC sublayer 630 even in the sidelink interface of the sidelink relay. The sidelink RAP sublayer may include a PC5 RAP entity. The sidelink RAP sublayer 620 may be required when another sidelink relay, i.e., a sidelink multi-hop relay, connected to the sidelink relay through the sidelink interface is operated. The PC5 RAP entity may correspond to a PC5 adaptation sublayer entity in FIG. 6B.

Figure 6C:
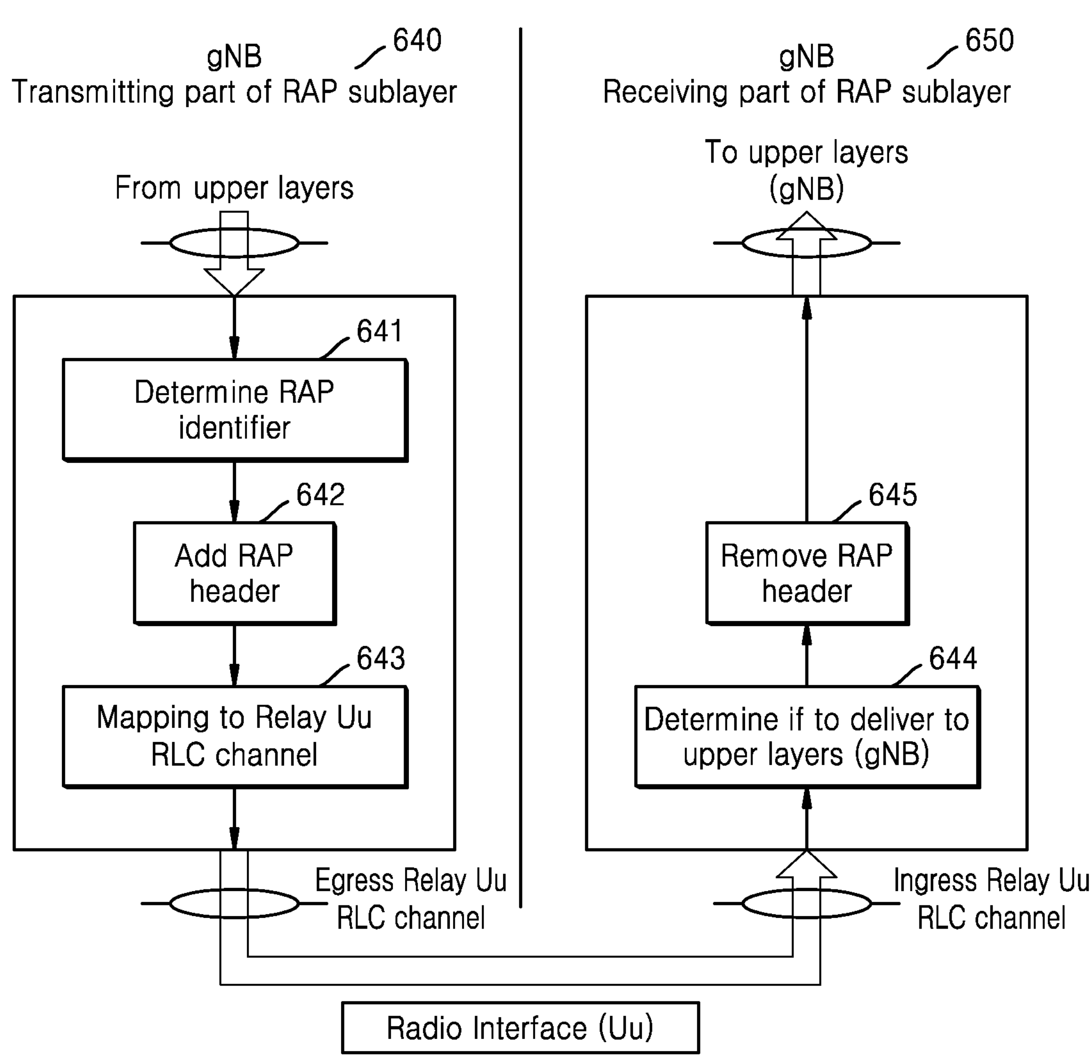
FIG. 6C is a diagram for describing operations of a base station transmitter of an RAP sublayer and a base station receiver of the RAP sublayer, according to an embodiment of the present disclosure.

FIG. 6C is a diagram for describing operations of a base station transmitter of an RAP sublayer and a base station receiver of the RAP sublayer.

Here, the RAP sublayer is located in a Uu interface of a base station.

In operation 641, a base station transmitter 640 of the RAP sublayer may determine RAP identification information for an RAP service data unit (SDU) corresponding to data or signaling of a terminal transmitted from a higher layer (here, a Uu PDCP).

In operation 642, the base station transmitter 640 may add, to the data or signaling of the terminal transmitted from the higher layer, an RAP header including the RAP identification information determined in operation 641.

In operation 643, the base station transmitter 640 may perform an operation of mapping the data or signaling of the terminal, to which the RAP header is added in operation 642, to a Uu relay RLC channel of the sidelink relay for relaying.

When the data or signaling of the terminal, to which the RAP header is added, is mapped to the Uu relay RLC channel of the sidelink relay in operation 643, an RAP PDU configured by the base station transmitter 640 may be transmitted to a Uu RLC sublayer of the base station.

The base station transmitter 640 may buffer a packet transmitted until acknowledgement is received from an RLC AM entity, for a radio bearer of the terminal corresponding to an RLC AM. The base station transmitter 640 may discard the packet when the acknowledgement is received from the RLC AM entity.

In operation 644, when a packet mapped to the Uu relay RLC channel of the sidelink relay is received from the Uu RLC sublayer of the base station, a base station receiver 650 of the RAP sublayer may determine whether to transmit the packet to a higher layer (i.e., a PDCP sublayer) of the base station.

In operation 645, the base station receiver 650 may remove the RAP header from the packet received in operation 644. The base station receiver 650 may transmit the packet from which the RAP header is removed to the higher layer of the base station receiver.

Figure 6D:
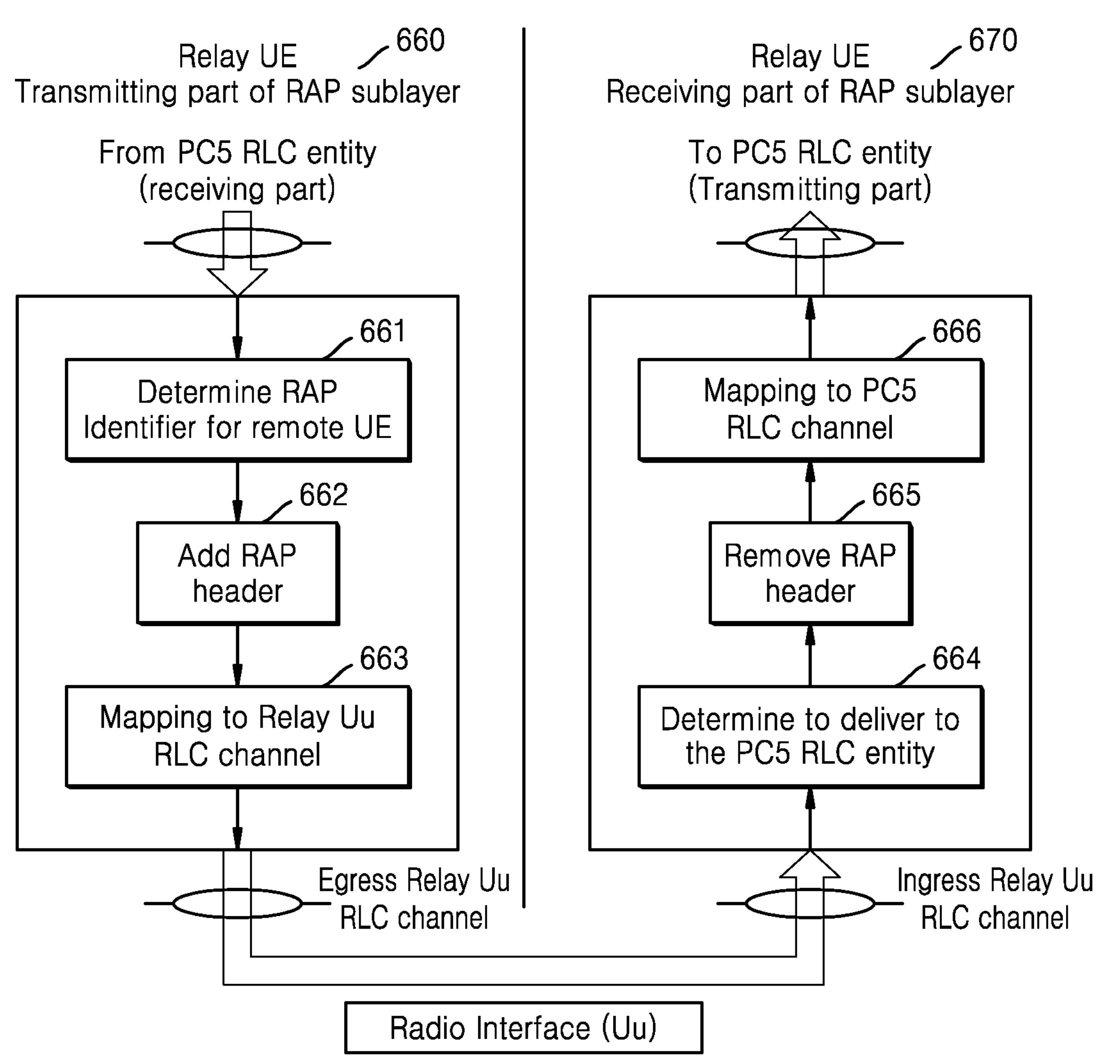
FIG. 6D is a diagram for describing operations of a sidelink relay transmitter of an RAP sublayer and a sidelink relay receiver of the RAP sublayer, according to an embodiment of the present disclosure.

FIG. 6D is a diagram for describing operations of a sidelink relay transmitter of an RAP sublayer and a sidelink relay receiver of the RAP sublayer, according to an embodiment of the present disclosure.

Here, the RAP sublayer is located in a Uu interface of a sidelink relay.

In operation 661, upon receiving, from a sidelink RLC entity receiver, a packet including data/signaling of a terminal transmitted by the terminal from a sidelink interface, a sidelink relay transmitter 660 may determine RAP identification information of the terminal, based on the received packet.

In operation 662, the sidelink relay transmitter 660 may add an RAP header including the RAP identification information of the terminal determined in operation 661, to the received packet.

In operation 663, the sidelink relay transmitter 660 may perform an operation of mapping the packet, to which the RAP header is added in operation 662, to a Uu relay RLC channel of the sidelink relay corresponding to the data or signaling of the terminal.

An RAP PDU configured by the sidelink relay transmitter 660, which is mapped to the Uu relay RLC channel of the sidelink relay, may be transmitted to a Uu RLC sublayer to be transmitted to a base station.

The sidelink relay transmitter 660 may operate to buffer the transmitted packet until acknowledgement is received from an RLC AM entity for a radio bearer of the terminal corresponding to RLC AM, and discard the packet when the acknowledgement is received from the RLC AM entity.

In operation 664, when the packet is received through the Uu relay RLC channel of the sidelink relay, a sidelink relay receiver 670 of the RAP sublayer may determine to transmit the packet to the sidelink RLC entity so as to transmit the received packet to the terminal through the sidelink interface, i.e., relay the data/signaling of the terminal.

In operation 665, the sidelink relay receiver 670 may remove the RAP header from the received packet.

In operation 666, the sidelink relay receiver 670 may perform an operation of mapping the packet from which the RAP header is removed in operation 665 to an RLC channel of a PC5 SLRB configured for a data/signaling purpose of the terminal. The sidelink relay receiver 670 may transmit the packet including the data/signaling of the terminal to a transmitter of the sidelink RLC entity.

FIG. 6E is a diagram for describing operations of a sidelink relay transmitter of an RAP sublayer and a sidelink relay receiver of the RAP sublayer, according to another embodiment of the present disclosure.

Here, a sidelink relay transmitter 680 includes transmitters for both a Uu interface and a PC5 interface, and a sidelink relay receiver 690 includes receivers for both the Uu interface and the PC5 interface.

In operation 681, upon receiving a packet from the receiver 690, the sidelink relay transmitter 680 may determine whether the received packet is a DL packet or an UL packet. For example, the sidelink relay transmitter 680 may determine that the packet is to be transmitted to a sidelink interface when the packet is the DL packet, and determine that the packet is to be transmitted to the Uu interface when the packet is the UL packet.

When it is determined that the packet received from the sidelink relay receiver 690 is the DL packet in operation 681, the sidelink relay transmitter 680 may determine target terminal identification information of the packet and PC5 RLC channel identification information of a target terminal and remove an RAP header from the packet, in operation 682.

In operation 683, the sidelink relay transmitter 680 may map the packet from which the RAP header is removed in operation 682 to a PC5 RLC channel of the target terminal, and transmit the mapped packet to a PC5 RLC sublayer.

When it is determined that the packet received from the sidelink relay receiver 690 is the UL packet in operation 681, the sidelink relay transmitter 680 may determine the target terminal identification information of the packet and sidelink relay Uu relay RLC channel identification information mapped to the PC5 RLC channel of the target terminal, in operation 684. For example, the sidelink relay transmitter 680 may determine RAP identification information associated with the received packet.

In operation 685, the sidelink relay transmitter 680 may configure an RAP header and add the RAP header to the received packet.

In operation 686, the sidelink relay transmitter 680 may map the packet to which the RAP header is added in operation 685 to the sidelink relay Uu relay RLC channel. The sidelink relay transmitter 680 may transmit an RAP PDU to a Uu RLC sublayer such that the RAP PDU is transmitted to the sidelink relay Uu relay RLC channel.

The sidelink relay transmitter 680 may operate to buffer the transmitted packet until acknowledgement is received from an RLC AM entity for a radio bearer of the terminal corresponding to RLC AM, and discard the packet when the acknowledgement is received from the RLC AM entity.

In operation 687, the sidelink relay receiver 690 may determine whether to transmit the packet received from the sidelink relay Uu relay RLC channel (in case of DL) to a PC5 transmitter of the RAP sublayer. For example, when the packet received from the sidelink relay Uu relay RLC channel is associated with DL, the sidelink relay receiver 690 may determine to transmit the received packet to the PC5 transmitter of the RAP sublayer.

The sidelink relay receiver 690 may transmit the packet to the PC5 transmitter of the sidelink RAP sublayer.

In operation 688, the sidelink relay receiver 690 may determine whether to transmit the packet received from the PC5 RLC channel of the sidelink relay (in case of UL) to a Uu transmitter of the RAP sublayer. For example, when the packet received from the PC5 RLC channel of the sidelink relay is associated with UL, the sidelink relay receiver 690 may determine to transmit the received packet to the Uu transmitter of the RAP sublayer.

The sidelink relay receiver 690 may transmit the packet to the Uu transmitter of the sidelink RAP sublayer.

According to various embodiments of the present disclosure, when RAP sublayer entities of a base station and sidelink relay configure an RAP PDU, the RAP PDU may include RAP SDU and an RAP header.

The RAP header may include at least one or a combination of identification information of a target terminal and a sidelink relay Uu relay RLC identification information (for example, a channel identifier) mapped to a radio bearer (SRB or DRB) of the target terminal.

In DL, the RAP sublayer entity of the base station may map a PDCP PDU received from its PDCP sublayer to the RAP SDU, and determine the identification information of the target terminal of the PCP PDU and sidelink relay Uu relay RLC identification information corresponding to the radio bearer of the target terminal. The RAP sublayer entity of the base station may prepare the RAP PDU including the RAP SDU and the RAP header by configuring the RAP header, and transmit the RAP PDU to its RLC sublayer.

In UL, the RAP sublayer entity of the sidelink relay may map a PC5 RLC PDU received from its PC5 RLC sublayer to the RAP SDU, and determine the identification information of the target terminal of the PC5 RLC PDU and sidelink relay Uu relay RLC identification information corresponding to the radio bearer of the target terminal. The RAP sublayer entity of the sidelink relay may prepare the RAP PDU including the RAP SDU and the RAP header by configuring the RAP header, and transmit the RAP PDU to its Uu RLC sublayer.

Next, an operation procedure for configuring sidelink relay Uu relay RLC channel information to a sidelink relay to relay data/signaling of a terminal, and an operation procedure for configuring a sidelink relay Uu relay RLC channel and a PC5 SLRB RLC channel mapped thereto will be described with reference to FIGS. 7A through 7F.

A PC5 SLRB configured by a sidelink relay and a terminal to relay data/signaling transmission/reception with a base station may include PC5 L1 (PHY), PC5 MAC, and PC5 RLC. A PC5 SLRB configured for data/signaling transmission/reception between a sidelink relay and a terminal, instead of relaying the data/signaling transmission/reception between the terminal and a base station, may include PC5 L1 (PHY), PC5 MAC, PC5 RLC, PD5 PDCP, and PC5 SDAP (for data) or PC5 RRC (for signaling).

Figure 7A:
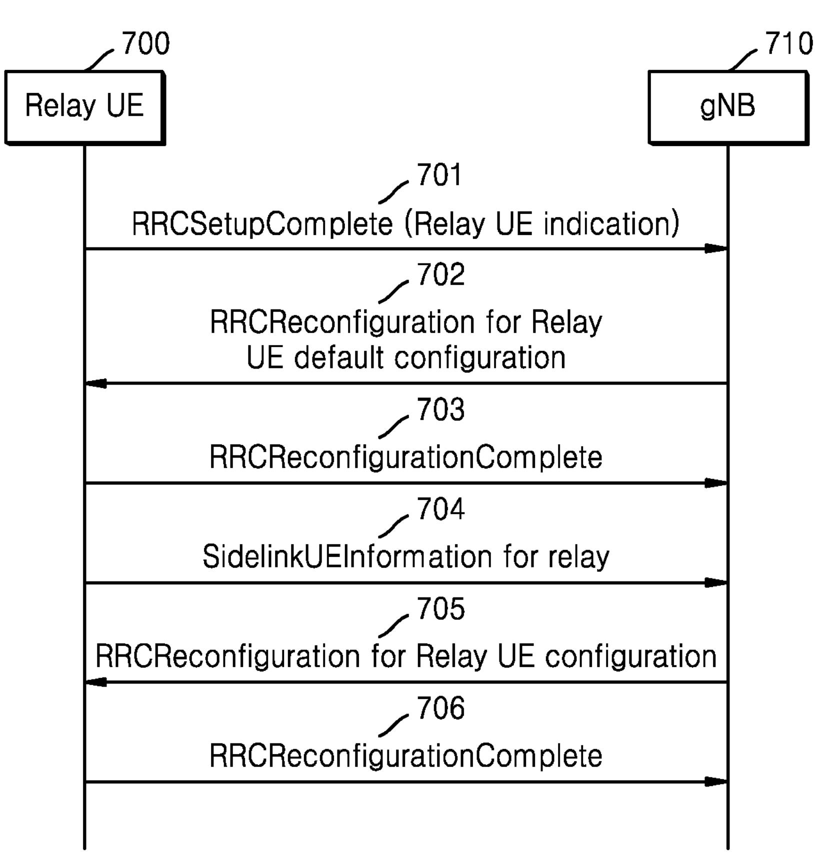
FIG. 7A is a diagram showing a signal flow between a base station and a sidelink relay, for configuring mapping information between a sidelink and a Uu, according to an embodiment of the present disclosure.

FIG. 7A is a diagram showing a signal flow between a gNB and a relay UE, for configuring mapping information between a sidelink and a Uu, according to an embodiment of the present disclosure.

Referring to FIG. 7A, a relay UE 700 may perform an RRC connection establishment procedure with a gNB 710.

In operation 701, when it is authenticated to perform a relay function, the relay UE 700 may transmit relay UE indication information to the gNB through an RRCSetupComplete message. The relay UE 700 and the gNB 710 may configure a security key that may be used between two entities, through security mode command/security mode complete message processing. The relay UE 700 and the gNB 710 may verify capability information of the relay UE 700 through UECapabilityEnquiry/UECapabilityInformation message processing.

In operation 702, the gNB 710 may transmit, to the relay UE 700, an RRCReconfiguration message including a radio bearer configuration of the relay UE 700. Based on relay UE information determined by receiving the RRCSetupComplete message in operation 701, the gNB 710 may configure, to the relay UE 700, default relay configuration information that may be used by the relay UE 700 to transmit data/signaling of a remote UE, through the RRCReconfiguration message, in operation 702. For example, the default relay configuration information may include configuration information for a default sidelink relay Uu relay RLC channel. The default sidelink relay Uu relay RLC channel may be used to relay RRC signaling corresponding to DL-CCCH, UL-CCCH, and UL-CCCH1 of the remote UE. The default sidelink relay Uu relay RLC channel may be configured for each of DL-CCCH, UL-CCCH, and UL-CCCH1 or may be configured for each DL or UL, or one default sidelink relay Uu relay RLC channel may be configured for DL-CCCH, UL-CCCH, and UL-CCCH1.

The relay UE 700 may transmit, to the gNB 710, an RRCReconfigurationComplete message in operation 703, in response to the message in operation 702.

Then, when it is determined that there is a remote UE requesting a relay connection with the gNB 710, the relay UE 700 may transmit, to the gNB 710, a SidelinkUEInformation message in operation 704 to notify relay UE connection establishment, together with information of the remote UE. The SidelinkUEInformation message transmitted by the relay UE 700 to the gNB in operation 704 may be an UL message defined separately for a relay UE or an UL message defined to be widely used (a relay UE and sidelink direct communication) in a sidelink system.

The gNB 710 may determine the information of the remote UE connected to the relay UE 700, based on the message received in operation 704, and when it is determined that the remote UE has transitioned to an RRC_CONNECTED state by using the gNB 710 as a serving gNB, relay configuration information for relaying data/signaling of the remote UE may be configured to the relay UE 700 through the RRCReconfiguration message in operation 705. The relay configuration information in operation 705 includes a sidelink relay Uu relay RLC channel configuration, and may include at least one or a combination of DL-DCCH, UL-DCCH, and DRB of the remote UE, one or more sidelink relay Uu relay RLC channels corresponding thereto, and one or more PC5 SLRB RLC channels corresponding thereto.

The relay UE 700 may transmit, to the gNB 710, the RRCReconfigurationComplete message in operation 706 in response to the message in operation 705.

Figure 7B:
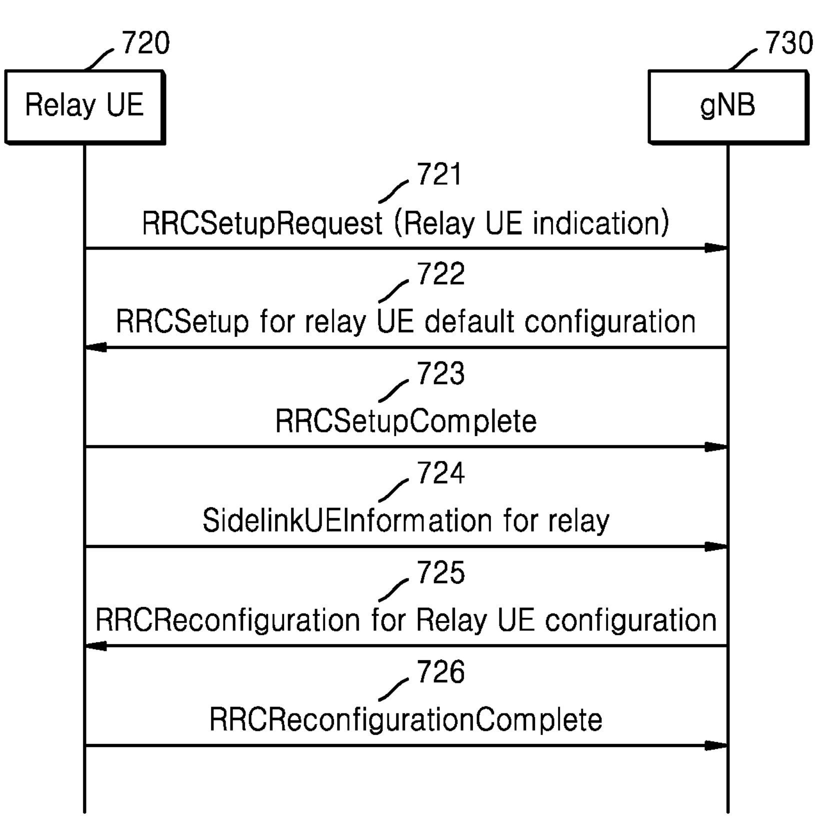
FIG. 7B is a diagram showing a signal flow between a base station and a sidelink relay, for configuring mapping information between a sidelink and a Uu, according to another embodiment of the present disclosure.

FIG. 7B is a diagram showing a signal flow between a gNB and a relay UE, for configuring mapping information between a sidelink and a Uu, according to another embodiment of the present disclosure.

Referring to FIG. 7B, a relay UE 720 may perform an RRC connection establishment procedure with a gNB 730.

When it is authenticated to perform a relay function, the relay UE 720 may transmit relay UE indication information to the gNB 730 in operation 721, through an RRCSetupRequest message.

Based on relay UE information determined by receiving the RRCSetupRequest message, the gNB 730 may transmit, to the relay UE 720 in operation 722, default relay configuration information that may be used by the relay UE 720 to transmit data/signaling of a remote UE, by including the default relay configuration information to an RRCSetup message. For example, the default relay configuration information may include configuration information for a default sidelink relay Uu relay RLC channel. The default sidelink relay Uu relay RLC channel may be used to relay RRC signaling corresponding to DL-CCCH, UL-CCCH, and UL-CCCH1 of the remote UE. The default sidelink relay Uu relay RLC channel may be configured for each of DL-CCCH, UL-CCCH, and UL-CCCH1 or may be configured for each DL or UL, or one default sidelink relay Uu relay RLC channel may be configured for DL-CCCH, UL-CCCH, and UL-CCCH1.

The relay UE 720 may transmit an RRCSetupComplete message to the gNB 730 in operation 723. The relay UE 720 and the gNB 730 may configure a security key that may be used between two entities, through security mode command/security mode complete message processing. The relay UE 720 and the gNB 730 may verify capability information of the relay UE 720 through UECapabilityEnquiry/UECapabilityInformation message processing. The gNB 730 may transmit an RRCReconfiguration message including a radio bearer configuration of the relay UE 720, and the relay UE 720 may transmit an RRCReconfigurationComplete message to the gNB 730 in response thereto. Such RRCReconfiguration/RRCReconfigurationComplete procedures may include configuration information for SRB/DRB that may be used between the relay UE 720 and the gNB 730.

Then, when it is determined that there is a remote UE requesting a relay connection with the gNB 730, the relay UE 720 may transmit, to the gNB 730, a SidelinkUEInformation message in operation 724 to notify relay UE connection establishment, together with information of the remote UE. The SidelinkUEInformation message transmitted by the relay UE 720 to the gNB 730 in operation 724 may be an UL message defined separately for a relay UE or an UL message defined to be widely used (a relay UE and sidelink direct communication) in a sidelink system.

The gNB 730 may determine the information of the remote UE connected to the relay UE 720, based on the message in operation 724, and when it is determined that the remote UE has transitioned to an RRC_CONNECTED state by using the gNB 730 as a serving gNB, relay configuration information for relaying data/signaling of the remote UE may be configured to the relay UE 720 through the RRCReconfiguration message in operation 725. The relay configuration information in operation 725 includes a sidelink relay Uu relay RLC channel configuration, and may include at least one or a combination of DL-DCCH, UL-DCCH, and DRB of the remote UE, one or more sidelink relay Uu relay RLC channels corresponding thereto, and one or more PC5 SLRB RLC channels corresponding thereto.

The relay UE 720 may transmit, to the gNB 730, the RRCReconfigurationComplete message in operation 726 in response to the message in operation 725.

Figure 7C:
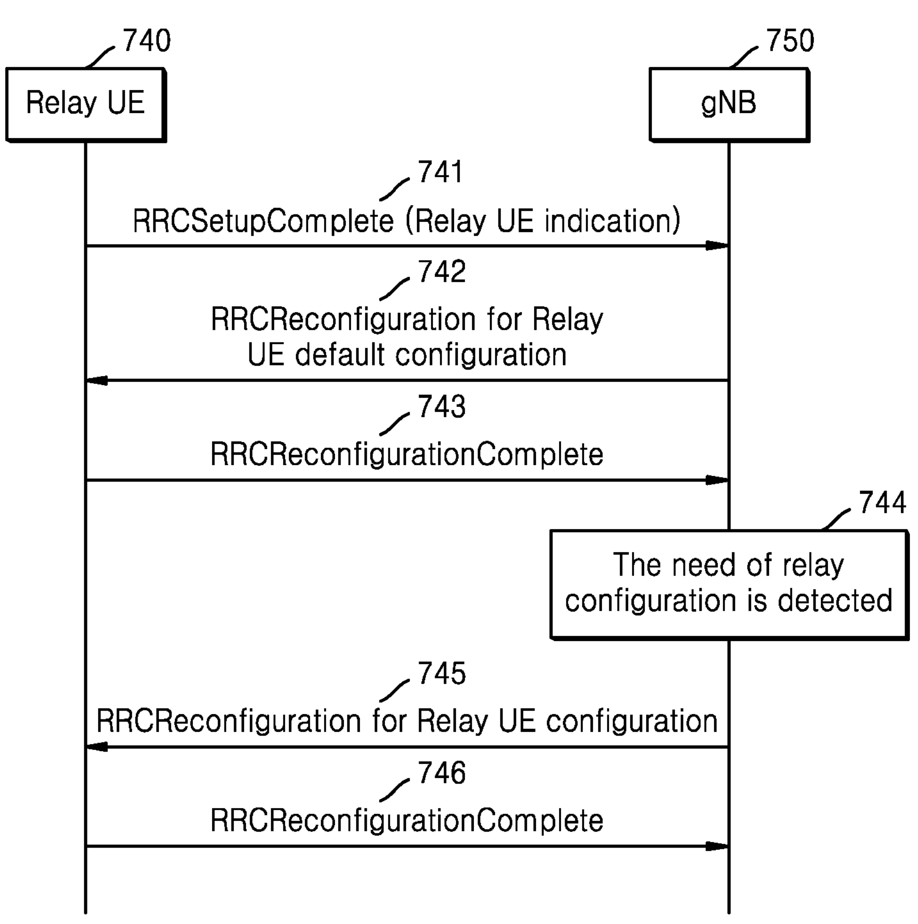
FIG. 7C is a diagram showing a signal flow between a base station and a sidelink relay, for configuring mapping information between a sidelink and a Uu, according to another embodiment of the present disclosure.

FIG. 7C is a diagram showing a signal flow between a gNB and a relay UE, for configuring mapping information between a sidelink and a Uu, according to another embodiment of the present disclosure.

Referring to FIG. 7C, a relay UE 740 may perform an RRC connection establishment procedure with a gNB 750.

When it is authenticated to perform a relay function, the relay UE 740 may transmit relay UE indication information through an RRCSetupComplete message, in operation 741. The relay UE 740 and the gNB 750 may configure a security key that may be used between two entities, through security mode command/security mode complete message processing. The relay UE 740 and the gNB 750 may verify capability information of the relay UE 740 through UECapabilityEnquiry/UECapabilityInformation message processing.

In operation 742, the gNB 750 may transmit an RRCReconfiguration message including a radio bearer configuration of the relay UE 740. Based on relay UE information determined by receiving the RRCSetupComplete message, the gNB 750 may configure, to the relay UE 740, default relay configuration information that may be used by the relay UE 740 to transmit data/signaling of a remote UE, through the RRCReconfiguration message, in operation 742. For example, the default relay configuration information may include configuration information for a default sidelink relay Uu relay RLC channel. The default sidelink relay Uu relay RLC channel may be used to relay RRC signaling corresponding to DL-CCCH, UL-CCCH, and UL-CCCH1 of the remote UE. The default sidelink relay Uu relay RLC channel may be configured for each of DL-CCCH, UL-CCCH, and UL-CCCH1 or may be configured for each DL or UL, or one default sidelink relay Uu relay RLC channel may be configured for DL-CCCH, UL-CCCH, and UL-CCCH1.

In response to the message received in operation 742, the relay UE 740 may transmit an RRCReconfigurationComplete message to the gNB 750 in operation 743.

Then, in operation 744, when it is determined that there is a remote UE to perform an RRC connection establishment procedure with the gNB 750 through the relay UE 740, the gNB 750 may configure relay UE connection establishment for the remote UE. A case where the gNB determines that the relay UE connection establishment needs to be configured for the relay UE 740 and the remote UE in operation 744 may include a case where an RRCSetupRequest message of the remote UE is received through the relay UE 740. The RRCSetupRequest message of the remote UE may be transmitted to the gNB 750 by using a default relay UE configuration configured for the relay UE 740 in operations 742 and 743.

The gNB 750 may configure, to the relay UE 740, relay configuration information for relaying data/signaling of the remote UE, through the RRCReconfiguration message, in operation 745. The relay configuration information in operation 745 includes a sidelink relay Uu relay RLC channel configuration, and may include at least one or a combination of DL-DCCH, UL-DCCH, and DRB of the remote UE, one or more sidelink relay Uu relay RLC channels corresponding thereto, and one or more PC5 SLRB RLC channels corresponding thereto.

The relay UE 740 may transmit, to the gNB 750, the RRCReconfigurationComplete message in operation 746 in response to the message in operation 745.

Figure 7D:
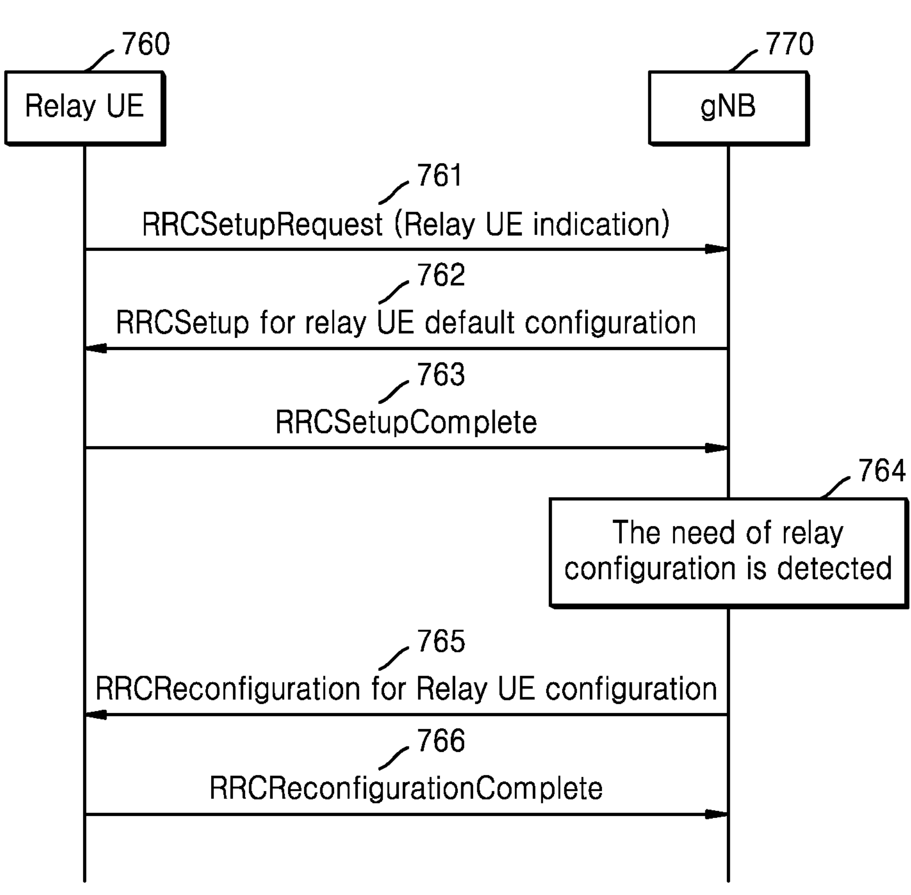
FIG. 7D is a diagram showing a signal flow between a base station and a sidelink relay, for configuring mapping information between a sidelink and a Uu, according to another embodiment of the present disclosure.

FIG. 7D is a diagram showing a signal flow between a gNB and a relay UE, for configuring mapping information between a sidelink and a Uu, according to another embodiment of the present disclosure.

Referring to FIG. 7D, a relay UE 760 may perform an RRC connection establishment procedure with a gNB 770.

When it is authenticated to perform a relay function, the relay UE 760 may transmit relay UE indication information to the gNB 770 in operation 761, through an RRCSetupRequest message.

Based on relay UE information determined by receiving the RRCSetupRequest message, the gNB 770 may transmit, to the relay UE 760 in operation 762, default relay configuration information that may be used by the relay UE 760 to transmit data/signaling of a remote UE, by including the default relay configuration information to an RRCSetup message. For example, the default relay configuration information may include configuration information for a default sidelink relay Uu relay RLC channel. The default sidelink relay Uu relay RLC channel may be used to relay RRC signaling corresponding to DL-CCCH, UL-CCCH, and UL-CCCH1 of the remote UE. The default sidelink relay Uu relay RLC channel may be configured for each of DL-CCCH, UL-CCCH, and UL-CCCH1 or may be configured for each DL or UL, or one default sidelink relay Uu relay RLC channel may be configured for DL-CCCH, UL-CCCH, and UL-CCCH1.

The relay UE 760 may transmit an RRCSetupComplete message to the gNB 770 in operation 763. The relay UE 760 and the gNB 770 may configure a security key that may be used between two entities, through security mode command/security mode complete message processing. The relay UE 760 and the gNB 770 may verify capability information of the relay UE 760 through UECapabilityEnquiry/UECapabilityInformation message processing. The gNB 770 may transmit an RRCReconfiguration message including a radio bearer configuration of the relay UE 760, and the relay UE 760 may transmit an RRCReconfigurationComplete message to the gNB 770 in response thereto. Such RRCReconfiguration/RRCReconfigurationComplete procedures may include configuration information for SRB/DRB that may be used between the relay UE 760 and the gNB 770.

Then, in operation 764, when it is determined that there is a remote UE to perform an RRC connection establishment procedure with the gNB 770 through the relay UE 760, the gNB 770 may configure relay UE connection establishment for the remote UE. A case where the gNB determines that the relay UE connection establishment needs to be configured for the relay UE 760 and the remote UE in operation 764 may include a case where an RRCSetupRequest message of the remote UE is received through the relay UE 760. The RRCSetupRequest message of the remote UE may be transmitted to the gNB 770 by using a default relay UE configuration configured for the relay UE 760 in operations 762 and 763.

The gNB 770 may configure, to the relay UE 760, relay configuration information for relaying data/signaling of the remote UE, through the RRCReconfiguration message, in operation 765. The relay configuration information in operation 765 includes a sidelink relay Uu relay RLC channel configuration, and may include at least one or a combination of DL-DCCH, UL-DCCH, and DRB of the remote UE, one or more sidelink relay Uu relay RLC channels corresponding thereto, and one or more PC5 SLRB RLC channels corresponding thereto.

The relay UE 760 may transmit, to the gNB 770, the RRCReconfigurationComplete message in operation 766 in response to the message in operation 765.

FIGS. 7A through 7D illustrate embodiments in which a sidelink relay is allocated with, from a base station, default relay configuration information for data (DRB) or signaling (SRB) between the base station and the remote UE.

Next, embodiments in which a sidelink relay is configured with relay connection establishment information from a base station in at least one or a combination of a case where default relay configuration information for the sidelink relay to relay data (DRB) or signaling (SRB) between the base station and a remote UE is pre-set, a case where a default DRB is configured, and a case where a default SRB is configured, will be described with reference to FIGS. 7E and 7F.

Figure 7E:
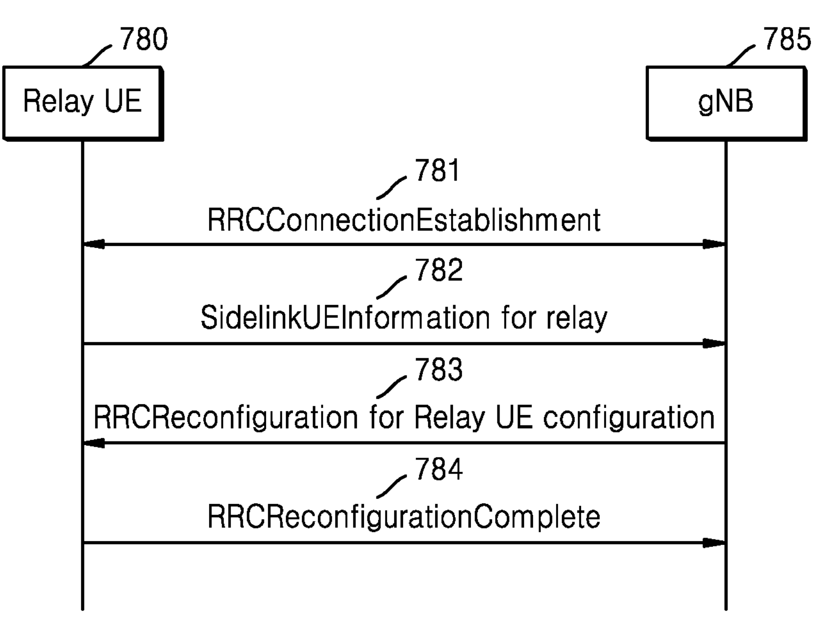
FIG. 7E is a diagram showing a signal flow between a base station and a sidelink relay, for configuring mapping information between a sidelink and a Uu, according to another embodiment of the present disclosure.

FIG. 7E is a diagram showing a signal flow between a gNB and a relay UE, for configuring mapping information between a sidelink and a Uu, according to another embodiment of the present disclosure.

Referring to FIG. 7E, a relay UE 780 may perform an RRC connection establishment procedure with a gNB 785, in operation 781. According to an embodiment, when it is authenticated to perform a relay function, the relay UE 780 may transmit relay UE indication information to the gNB 785 during the RRC connection establishment procedure with the gNB 785. According to an embodiment, when it is authenticated to perform the relay function, the relay UE 780 may transmit the relay UE indication information to the gNB 785 through a SidelinkUEInformation message. When the SidelinkUEInformation message is used, the relay UE 780 may transmit the SidelinkUEInformation message as a separate message from operation 782 or transmit the SidelinkUEInformation message as a same message as operation 782.

When it is determined that there is a remote UE requesting a relay connection with the gNB 785 is present after the Relay connection establishment information with the gNB 785 is completed, the relay UE 780 may transmit, to the gNB 785, the SidelinkUEInformation message in operation 782 to notify relay UE connection establishment together with information of the remote UE. The SidelinkUEInformation message transmitted by the relay UE to the gNB in operation 780 may be an UL message defined separately for a relay UE or an UL message defined to be widely used (a relay UE and sidelink direct communication) in a sidelink system.

The gNB 785 may determine the information of the remote UE connected to the relay UE 780, based on the message in operation 782, and when it is determined that the remote UE has transitioned to an RRC_CONNECTED state by using the gNB 785 as a serving gNB, relay configuration information for relaying data/signaling of the remote UE may be configured to the relay UE 780 through an RRCReconfiguration message in operation 783. The relay configuration information in operation 783 includes a sidelink relay Uu relay RLC channel configuration, and may include at least one or a combination of DL-DCCH, UL-DCCH, SRB, and DRB of the remote UE, one or more sidelink relay Uu relay RLC channels corresponding thereto, and one or more PC5 SLRB RLC channels corresponding thereto.

The relay UE 780 may transmit, to the gNB 785, an RRCReconfigurationComplete message in operation 784 in response to the message in operation 783.

In the embodiment of FIG. 7E, when signaling/data of the remote UE needs to be transmitted to the gNB 785 before the remote UE and the relay UE 780 receive the configuration information of operation 783 from the gNB 785, pre-set default relay UE configuration information may be used.

Figure 7F:
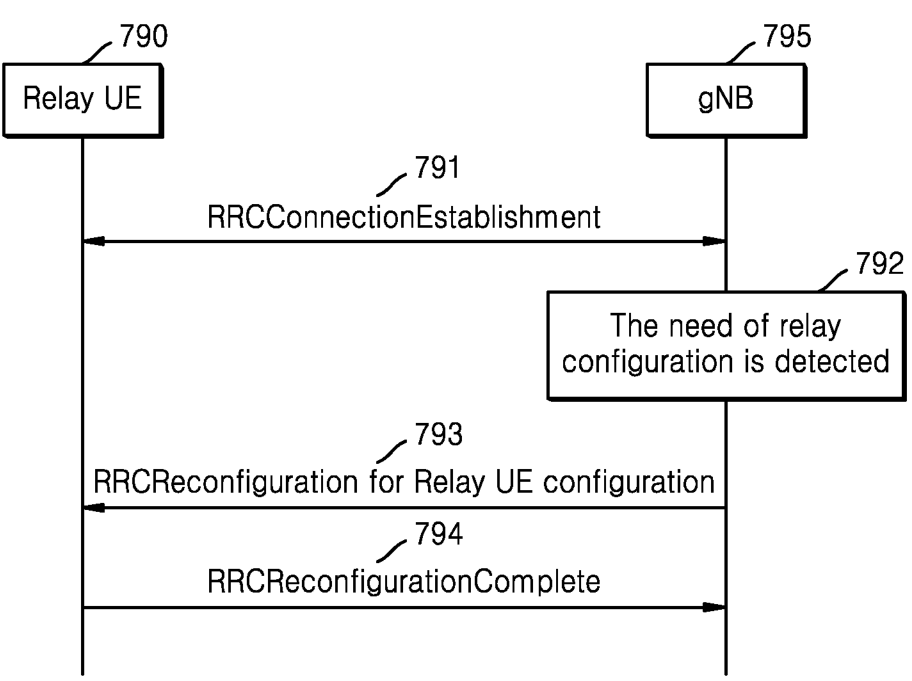
FIG. 7F is a diagram showing a signal flow between a base station and a sidelink relay, for configuring mapping information between a sidelink and a Uu, according to another embodiment of the present disclosure.

FIG. 7F is a diagram showing a signal flow between a gNB and a relay UE, for configuring mapping information between a sidelink and a Uu, according to another embodiment of the present disclosure.

Referring to FIG. 7F, a relay UE 790 may perform an RRC connection establishment procedure with a gNB 795, in operation 791. According to an embodiment, when it is authenticated to perform a relay function, the relay UE 790 may transmit relay UE indication information to the gNB 795 during the RRC connection establishment procedure with the gNB 795. According to an embodiment, when it is authenticated to perform the relay function, the relay UE 790 may transmit the relay UE indication information to the gNB 795 through a SidelinkUEInformation message.

When it is determined that there is a remote UE to perform the RRC connection establishment procedure with the gNB 795 through the relay UE 790 in operation 792, after the RRC connection establishment procedure with the relay UE 790 is performed, the gNB 795 may configure relay UE connection establishment for the remote UE. A case where the gNB 795 determines that the relay UE connection establishment needs to be configured for the relay UE 790 and the remote UE in operation 792 may include a case where an RRCSetupRequest message of the remote UE is received through the relay UE 790. According to an embodiment, the RRCSetupRequest message of the remote UE may be transmitted to the gNB 795 by using a default relay UE configuration pre-configured for the relay UE 790.

The gNB 795 may configure, to the relay UE 790, relay configuration information for relaying data/signaling of the remote UE, through an RRCReconfiguration message, in operation 793. The relay configuration information in operation 793 includes a sidelink relay Uu relay RLC channel configuration, and may include at least one or a combination of DL-DCCH, UL-DCCH, SRB, and DRB of the remote UE, one or more sidelink relay Uu relay RLC channels corresponding thereto, and one or more PC5 SLRB RLC channels corresponding thereto. The relay UE 790 may transmit, to the gNB 795, an RRCReconfigurationComplete message in operation 794 in response to the message in operation 793.

A SidelinkUEInformation message transmitted by a relay UE to a gNB in FIGS. 7A through 7F may be used for at least one or a combination of purposes of Table 1 below.

TABLE 1

| |
|---|
| • SL reception (RX) interest, SL transmission (TX) resource request, SL discovery RX interest, SL discovery TX interest, report of remote UEconnected to relay UE, report of remote UE identification (unicast link ID for remote UE, layer-2 ID for remote UE), relay configuration request |

A time point when a relay UE reports information of a remote UE to a gNB or transmits a SidelinkUEInformation message to request a relay configuration may be determined by the relay UE. For example, after performing PC5 direct link establishment with the remote UE after a sidelink discovery procedure with the remote UE, the relay UE may transmit, to the gNB, the SidelinkUEInformation message to request the information on the remote UE and relay UE configuration information. For example, when it is determined that an RRCSetupRequest message needs to be transmitted for the remote UE to perform an RRC connection establishment procedure with the gNB, the relay UE may transmit, to the gNB, the SidelinkUEInformation message to request the information on the remote UE and the relay UE configuration information.

An RRCReconfiguration message transmitted by the gNB to the relay UE to allocate the relay UE configuration information in FIGS. 7A through 7F may include at least one or a combination of following pieces of information. An RRCReconfiguration message including the relay UE configuration information may be configured separately from an RRCReconfiguration message configured by the gNB to configure SRB/DRB to the remote UE connected to the relay UE.

For example, RadioBearerConfig IE configuration information of Table 2 below, which may be included in the RRCReconfiguration message, may be used to add, modify, or release a configuration of DRB/SRB corresponding to data/signaling of the remote UE when relaying of the relay UE is used. The RadioBearerConfig IE configuration information may include configuration information of an SDAP entity and PDCP entity of Uu DRB/SRB corresponding to the data/signaling of the remote UE. RadioBearerConfig IE including the configuration information of Uu DRB/SRB corresponding to the data/signaling of the remote UE may be transmitted by using PC5 SLRB with the relay UE and the remote UE. According to another embodiment, the RadioBearerConfig IE configuration information of Table 2 may be used by the relay UE to configure its SDAP entity and PDCP entity by adding, modifying, and releasing the configuration of Uu SRB/DRB of the relay UE.

TABLE 2

```
RadioBearerConfig ::=      SEQUENCE {
   srb-ToAddModList   SRB-ToAddModList   OPTIONAL, -- Cond HO-Conn
   srb3-ToRelease   ENUMERATED{true}   OPTIONAL, -- Need N
   drb-ToAddModList   DRB-ToAddModList   OPTIONAL, -- Cond HO-toNR
   drb-ToReleaseList   DRB-ToReleaseList   OPTIONAL, -- Need N.
   securityConfig   SecurityConfig   OPTIONAL, -- Need M
   ...
}
SRB-ToAddModList ::=   SEQUENCE (SIZE (1..2)) OF SRB-ToAddMod.
SRB-ToAddMod ::=   SEQUENCE {
   srb-Identity   SRB-Identity,
   reestablishPDCP   ENUMERATED{true}   OPTIONAL, -- Need N
   discardOnPDCP   ENUMERATED{true}   OPTIONAL, -- Need N
   pdcp-Config   PDCP-Config   OPTIONAL, -- Cond PDCP
   ...
}
DRB-ToAddModList ::=   SEQUENCE (SIZE (1..maxDRB)) OF DRB-ToAddMod
DRB-ToAddMod ::=   SEQUENCE {
   cnAssociation   CHOICE {
      eps-Bearer Identity                         INTEGER (0..15),
      sdap-Config                                 SDAP-Config
   } OPTIONAL, -- Cond DRBSetup
   drb-Identity   DRB-Identity,
   reestablishPDCP   ENUMERATED{true}   OPTIONAL, -- Need N
   recoverPDCP   ENUMERATED{true}   OPTIONAL, -- Need N
   pdcp-Config   PDCP-Config   OPTIONAL, -- Cond PDCP
   ...,
   [[
   daps-Config-r16   ENUMERATED{true}   OPTIONAL -- Need N
   ]]
}
DRB-ToReleaseList ::=   SEQUENCE (SIZE (1..maxDRB)) OF DRB-Identity
SecurityConfig ::=   SEQUENCE {
   securityAlgorithmConfig   SecurityAlgorithmConfig OPTIONAL, -- Cond
RBTermChange1
   keyToUse   ENUMERATED{master, secondary} OPTIONAL, -- Cond
RBTermChange
   ...
}
```

Unlike a case where only Uu SDAP entity, Uu PDCP entity, and Uu RRC entity configuration information are configured when the remote UE performs data/signaling transmission/reception with the gNB through the relay UE, Uu SDAP entity, Uu PDCP entity, Uu RLC entity, Uu MAC entity, Uu L1 (PHY) entity, and Uu RRC entity configuration information, which are required during data/signaling transmission/reception with the gNB, need to be configured for the relay UE. RLC-BearerConfig IE configuration information of Table 3 below may include configuration information corresponding to a Uu RLC entity and a Uu PDCP entity of the relay UE and corresponding to a logical channel of a Uu MAC entity.

TABLE 3

```
RLC-BearerConfig ::=   SEQUENCE {
   logicalChannelIdentity   LogicalChannelIdentity,
   servedRadioBearer   CHOICE {
      srb-Identity   SRB-Identity,
      drb-Identity   DRB-Identity
   } OPTIONAL, -- Cond LCH-SetupOnly
   reestablishRLC   ENUMERATED {true} OPTIONAL, -- Need N
   rlc-Config   RLC-Config   OPTIONAL, -- Cond LCH-Setup
   mac-LogicalChannelConfig LogicalChannelConfig OPTIONAL, -- Cond
LCH-Setup
   ...,
}
RLC-Config ::=   CHOICE {
   am      SEQUENCE {
      ul-AM-RLC   UL-AM-RLC,
      dl-AM-RLC   DL-AM-RLC
   },
   um-Bi-Directional   SEQUENCE {
      ul-UM-RLC   UL-UM-RLC,
      dl-UM-RLC   DL-UM-RLC
   },
   um-Uni-Directional-UL   SEQUENCE {
      ul-UM-RLC   UL-UM-RLC
   },
   um-Uni-Directional-DL   SEQUENCE {
      dl-UM-RLC   DL-UM-RLC
```

TABLE 3-continued

```
  },
  ...
}
UL-AM-RLC ::=  SEQUENCE {
  sn-FieldLength  SN-FieldLengthAM  OPTIONAL, -- Cond Reestab
  t-PollRetransmit  T-PollRetransmit,
  pollPDU     PollPDU,
  pollByte     PollByte,
  maxRetxThreshold  ENUMERATED { t1, t2, t3, t4, t6, t8, t16, t32 }
DL-AM-RLC ::=  SEQUENCE {
  sn-FieldLength  SN-FieldLengthAM OPTIONAL, -- Cond Reestab
  t-Reassembly  T-Reassembly,
  t-StatusProhibit  T-StatusProhibit
}
UL-UM-RLC ::=  SEQUENCE {
  sn-FieldLength  SN-FieldLengthUM OPTIONAL -- Cond Reestab
DL-UM-RLC ::=  SEQUENCE {
  sn-FieldLength  SN-FieldLengthUM OPTIONAL, -- Cond Reestab
  t-Reassembly  T-Reassembly
}
T-PollRetransmit ::=  ENUMERATED { }
PollPDU ::=  ENUMERATED { }
T-Reassembly ::=  ENUMERATED { }
T-StatusProhibit ::=  ENUMERATED { }
SN-FieldLengthUM ::=  ENUMERATED {size6, size12}
SN-FieldLengthAM ::=  ENUMERATED {size12, size18}
LogicalChannelConfig ::=  SEQUENCE {
  ul-SpecificParameters  SEQUENCE {
    priority     INTEGER (1..16),
    prioritisedBitRate  ENUMERATED { },
    bucketSizeDuration  ENUMERATED { }, ...
    logicalChannelGroup  INTEGER (0..maxLCG-ID) OPTIONAL, -- Need R
    schedulingRequestID  SchedulingRequestId OPTIONAL, -- Need R
    logicalChannelSR-Mask        BOOLEAN,
    logicalChannelSR-DelayTimerApplied  BOOLEAN,
    ...,
    bitRateQueryProhibitTimer  ENUMERATED {s0, sodot4, s0dot8, s1dot6,
s3, s6, s12, s30} OPTIONAL, -- Need R
    [[
    allowedCG-List-r16  SEQUENCE (SIZE (0..
maxNrofConfiguredGrantConfigMAC-r16-1)) OF ConfiguredGrantConfigIndexMAC-
r16 OPTIONAL, -- Need S
    allowedPHY-PriorityIndex-r16  ENUMERATED {p0, p1} OPTIONAL --
Need S
    ]]
  } OPTIONAL, -- Cond UL
  ...,
  [[
  channelAccessPriority-r16  INTEGER (1..4) OPTIONAL, -- Need R
  bitRateMultiplier-r16  ENUMERATED {x40, x70, x100, x200} OPTIONAL
-- Need R
  ]]
}
```

MAC-CellGroupConfig IE configuration information of Table 4 below may include Uu MAC parameter configuration information for Uu cell group configured to the relay UE.

TABLE 4

```
MAC-CellGroupConfig ::= SEQUENCE {
  drx-Config SetupRelease { DRX-Config } OPTIONAL; -- Need M
  schedulingRequestConfig SchedulingRequestConfig OPTIONAL, -- Need
M
  bsr-Config BSR-Config OPTIONAL, -- Need M
  tag-Config TAG-Config       OPTIONAL, -- Need M
  phr-Config SetupRelease { PHR-Config } OPTIONAL, -- Need M
  skipUplinkTxDynamic BOOLEAN,
  ...,
  [[
  csi-Mask BOOLEAN OPTIONAL, -- Need M
  dataInactivityTimer SetupRelease { DataInactivityTimer } OPTIONAL
-- Cond MCG-Only
  ]],
  [[
  usePreBSR-r16 ENUMERATED {true} OPTIONAL, -- Need R
```

TABLE 4-continued

```
  schedulingRequestID-LBT-SCell-r16    SchedulingRequestId OPTIONAL, -
- Need R
  lch-BasedPrioritization-r16 ENUMERATED {enabled} OPTIONAL, -- Need
R
  schedulingRequestID-BFR-SCell-r16 SchedulingRequestId OPTIONAL, --
Need R
  drx-ConfigSecondaryGroup-r16 SetupRelease { DRX-
ConfigSecondaryGroup }                OPTIONAL -- Need M
  ]]
}
```

The relay UE configuration information may include RAP sublayer configuration information, and the RAP sublayer configuration information may be configured through CellGroupConfig IE of the RRCReconfiguration message or may be configured through separate RAP-Config IE. The relay UE configuration information may include one or a plurality of pieces of PC5 SLRB configuration information between the relay UE and one or more remote UEs. Such information may be configured through SL-ConfigDedicatedNR IE. The relay UE configuration information is as Table 5 below.

TABLE 5

- CellGroupConfig w/RAP-Config - for sidelink relay configuration
- RAP-Config - for sidelink relay configuration
- SL-ConfigDedicatedNR - for sidelink relay configuration
  - Mapping between Relay-Uu-RLC-Channel (sidelink relay Uu relay RLC channel) and PC5 RLC channel (RLC channel of PC5 SLRB) for remote UE
  - PC5 RLC entity configuration, PC5 MAC entity, PC5 L1(PHY) configuration for sidelink between relay UE and remote UE Configuration information of RAP-Config configured in CellGroupConfig IE is as Table 6 below.

TABLE 6

```
CellGroupConfig ::= SEQUENCE {
  rlc-BearerToAddModList SEQUENCE (SIZE(1..maxLC-ID)) OF RLC-
BearerConfig              OPTIONAL, -- Need N
  rlc-BearerToReleaseList SEQUENCE (SIZE(1..maxLC-ID)) OF
LogicalChannelIdentity       OPTIONAL, -- Need N
  mac-CellGroupConfig MAC-CellGroupConfig OPTIONAL, -- Need M
  physicalCellGroupConfig PhysicalCellGroupConfig OPTIONAL, --
Need M
  spCellConfig    SpCellConfig    OPTIONAL, -- Need M
```

TABLE 6-continued

```
  rap-Config    RAP-Config    OPTIONAL,
...,
}
```

Configuration information of RAP-Config configured in separate RAP-Config IE is as Table 7 below.

TABLE 7

```
RRCReconfiguration-IEs ::= SEQUENCE {
  rap-Config SetupRelease { RAP-Config }
}
```

A specific embodiment of RAP-Config configured in the CellGroupConfig IE or separate RAP-Config is as Table 8 below.

TABLE 8

```
RAP-Config ::= SEQUENCE {
  remoteUEIdentifier    BIT STRING (remote UE Identifier),
  default-Relay-Uu-RLC-Channel    Relay-Uu-RLC-ChannelID OPTIONAL, --
Need M
  Relay-Uu-RLC-ChannelToAddModList SEQUENCE (SIZE(1..max-Relay-Uu-RLC-
ChannelID)) OF Relay-Uu-RLC-ChannelConfig OPTIONAL,    -- Need N
  Relay-Uu-RLC-ChannelToReleaseList SEQUENCE (SIZE(1..max-Relay-Uu-RLC-
ChannelID)) OF Relay-Uu-RLC-ChannelID OPTIONAL    -- Need N
}
Relay-Uu-RLC-ChannelID ::= BIT STRING (SIZE (16))
Relay-Uu-RLC-ChannelConfig ::=    SEQUENCE {
  relay-Uu-LogicalChannelIdentity    Relay-LogicalChannelIdentity
OPTIONAL,    -- Cond LCH-SetupOnly
  relay-Uu-RLC-ChannelID    Relay-Uu-RLC-ChannelID,
  reestablishRLC ENUMERATED {true}        OPTIONAL,    -- Need N
```

TABLE 8-continued

```
  rlc-Config      RLC-Config   OPTIONAL,   -- Cond LCH-Setup
  mac-LogicalChannelConfig   LogicalChannelConfig OPTIONAL,   -- Cond
LCH-Setup
  ...
Relay-LogicalChannelIdentity ::= CHOICE {
  relay-LogicalChannelIdentity      LogicalChannelIdentity,
  relay-LogicalChannelIdentityExt   Relay-LogicalChannelIdentity-Ext.
//similarly to BH-LogicalChannelIdentity-Ext
}
```

Identification information remoteUEIdentifier of the remote UE that may be included in the RAP-Config configuration information may include at least one or a combination of configurations shown in Table 9 below. The identification information of the remote UE configured in the RAP-Config configuration information may be used as remote UE identification information included in an RAP header configured by RAP entities of the relay UE and the gNB. As another embodiment, the identification information of the remote UE configured in the RAP-Config configuration information may be used as identification information indicating the corresponding remote UE when relay configuration information for the remote UE is exchanged between the gNB and the relay UE.

TABLE 9

- RNTI-value of remote UE (may be obtained from gNB during RRC direct link establishment of remote UE with gNB or from gNB during RRC connection establishment of remote UE with gNB through relay UE)
  - RNTI-value is configured when remote UE is in RRC_CONNECTED.
  - If remote UE needs to know its RNTI-value, then the RNTI-value is included in RRCSetup (transmitted by gNB to remote UE through relay UE).
  - RNTI-value allocated to remote UE may be transmitted to relay UE as RAP-Config configuration information when gNB determines relay UE of remote UE.
  - RNTI-value may be used by relay UE and gNB as one of pieces of identification information indicating sidelink relay Uu relay RLC channel mapping corresponding to remote UE.
- Layer-2 ID (L2 ID) of remote UE
  - (One embodiment) Remote UE's L2 ID can be assigned by serving gNB through remote UE's RRC connection establishment procedures. gNB may allocate L2 ID while remote UE performs RRC connection establishment procedure with gNB through relay UE, and L2 ID is allocated when it is determined that remote UE has transitioned to RRC_CONNECTED state.
  - (Another embodiment) Remote UE's L2 ID (E.g. destination layer-2 ID of remote UE) is reported by relay UE through relay UE SidelinkUEInformation. Destination layer-2 ID of each remote UE is defined in sidelink communication, and relay UE may report, to gNB, destination layer-2 ID of remote UE connected to relay UE. Destination layer-2 ID of each remote UE may be updated, and updated destination layer-2 ID may be obtained through PC5-S signaling message exchange procedure with relay UE. Relay UE may report updated destination layer-2 ID to gNB of corresponding remote UE.
- unicast link ID of PC5 RRC connection between remote UE and relay UE
  - When PC5 direct link (unicast) between remote UE and relay UE is established, unicast link ID may be defined. Relay UE may report, to gNB, unicast link ID of remote UE connected to relay UE. Unicast link ID is reported by relay UE through relay UE SidelinkUEInformation.
- Logical index of remote UE
  - Relay UE may report list of remote UEs connected to relay UE by transmitting, to gNB, SidelinkUEInformation message of relay UE. Logical index may be mapped in the order of remote UEs configured in list of remote UEs connected to relay UE. Logical index may be used as information indicating remote UE connected to relay UE. When list of remote UEs connected to relay UE is changed (when relay UE no longer operates as relay UE of corresponding remote UE or when new remote UE is connected to relay UE), relay UE may report updated list of remote UEs to gNB and accordingly, logical index of remote UE may be remapped.
- 5G S-TIMSI of remote UE (used by remote UE to perform RRC setup procedure)
- Full I-RNTI of remote UE (may be used by remote UE to perform resume procedure while in RRC_Inactive state)
- Short I-RNTI of remote UE (may be used by remote UE to perform resume procedure while in RRC_Inactive state)

For example, Uu SRB/DRB configuration information of the remote UE may include a configuration of Table 10 below when data/signaling is transmitted/received with the gNB through the relay UE.

TABLE 10

- RadioBearerConfig - for remote UE configuration and not for relay configuration
  - This IE is used to add, modify, release SRB and/or DRB for remote UE. This IE carries the parameters for PDCP and SDAP entities for the SRB/DRB for remote UE. This information is transferred to remote UE through relay UE over PC5.

For example, when relay transmission of the relay UE is used, one or more pieces of PC5 SLRB configuration information configured between the remote UE and the relay UE may be transmitted to the relay UE and remote UE through SL-ConfigDedicatedNR IE of the RRCReconfiguration message transmitted by the gNB. An embodiment of configuration information included in SL-ConfigDedicatedNR IE may be as Table 11 below.

TABLE 11

```
SL-ConfigDedicatedNR ::=        SEQUENCE {
  SI-PHY-MAC-RLC-Config   SL-PHY-MAC-RLC-Config OPTIONAL,   --
Need M
...
}
SL-PHY-MAC-RLC-Config ::= SEQUENCE {
...
  sl-RLC-BearerToReleaseList SEQUENCE (SIZE (1..maxSL-LCID)) OF SL-RLC-
BearerConfigIndex   OPTIONAL,   -- Need N
  sl-RLC-BearerToAddModList SEQUENCE (SIZE (1..maxSL-LCID)) OF SL-RLC-
BearerConfig   OPTIONAL,   -- Need N
}
SL-RLC-BearerConfig ::=   SEQUENCE {
  sl-RLC-BearerConfigIndex   SL-RLC-BearerConfigIndex,
  sl-Uu-RLC-Channel Relay-Uu-RLC-ChannelID OPTIONAL, -- Cond LCH-
SetupOnly (This parameter corresponds to sidelink relay Uu relay RLC channel
information used to transmit DRB/SRB corresponding to data/signaling of remote UE
between gNB and relay UE)
  sl-RLC-Config   SL-RLC-Config   OPTIONAL,   -- Cond LCH-Setup
  sl-MAC-LogicalChannelConfig   SL-LogicalChannelConfig   OPTIONAL, --
Cond LCH-Setup
  ...
} SL-RLC-Config ::=   CHOICE {
  sl-AM-RLC   SEQUENCE {
    sl-SN-FieldLengthAM   SN-FieldLengthAM OPTIONAL,   -- Cond
SLRBSetup
    sl-T-PollRetransmit   T-PollRetransmit,
    sl-PollPDU        PollPDU,
    sl-PollByte         PollByte,
    sl-MaxRetxThreshold ENUMERATED { t1, t2, t3, t4, t6, t8, t16, t32 },
  ...
  },
  sl-UM-RLC   SEQUENCE {
    sl-SN-FieldLengthUM      SN-FieldLengthUM      OPTIONAL, -- Cond
SLRBSetup
  ...
  },
  ...
}
SL-RLC-BearerConfigIndex ::=   INTEGER (1..maxSL-LCID)
Relay-Uu-RLC-ChannelID ::= BIT STRING (SIZE (16))
```

SL-RLC-Config information of a PC5 SLRB configuration in Table 11, which corresponds to one or more pieces of PC5 SLRB configuration information configured between the relay UE and the remote UE, may be configured as Table 11-1 below, as SL-RLC-Config of a PC5 SLRB configuration corresponding to DL data/signaling of the remote UE and SL-RLC-Config of a PC5 SLRB configuration corresponding to UL data/signaling of the remote UE. In a case of general NR SL communication (e.g., when direct communication between two remote UEs is performed instead of relay between a relay UE and a remote UE), a transmission (TX) parameter, i.e., a TX only parameter or a parameter that require synchronization (alignment) between a TX UE and a reception (RX) UE, may be configured by a network (RRC dedicated, SIB, pre-configuration) and an RX parameter may be independently configured by the remote UE, for PC5 SLRB configuration.

A TX parameter and an RX parameter may be configured by the network (RRC dedicated) for the PC5 SLRB configuration for transmitting/receiving UL data/signaling or DL data/signaling through the relay UE. The PC5 SLRB configuration for transmitting/receiving UL data/signaling or DL data/signaling through the relay UE may include at least one or a combination of a sidelink RLC configuration parameter, a sidelink MAC configuration parameter, and a sidelink PHY configuration parameter.

For example, an SL-RLC-Config parameter used in the NR SL communication may include a parameter used in a sidelink AM RLC mode or a parameter used in a sidelink UM RLC mode. The SL-RLC-Config parameter corresponding to the PC5 SLRB configuration information for transmitting/receiving UL data/signaling or DL data/signaling through the relay UE may include a parameter used in the sidelink AM RLC mode corresponding to UL, a parameter used in the sidelink UM RLC mode corresponding to UL, a parameter used in the sidelink AM RLC mode corresponding to DL, and a parameter used in the sidelink UM RLC mode corresponding to DL. The network may configure the relay UE and the remote UE with the parameter used in the sidelink AM RLC mode corresponding to UL, the parameter used in the sidelink UM RLC mode corresponding to UL, the parameter used in the sidelink AM RLC mode corresponding to DL, and the parameter used in the sidelink UM RLC mode corresponding to DL.

TABLE 11-1

SL-RLC-Config information element

```
SL-RLC-Config ::=   CHOICE {
     sl-UL-AM-RLC       SEQUENCE { //sidelink AM RLC mode corresponding
to uplink
          sl-SN-FieldLengthAM SN-FieldLengthAM       OPTIONAL,   -- Cond
SLRBSetup
          sl-T-PollRetransmit T-PollRetransmit,
          sl-PollPDU PollPDU,
          sl-PollByte PollByte,
          sl-MaxRetxThreshold   ENUMERATED { t1, t2, t3, t4, t6, t8, t16, t32 },
  },
     sl-UL-UM-RLC       SEQUENCE {//sidelink UM RLC mode corresponding to
uplink
          sl-SN-FieldLengthUM   SN-FieldLengthUM   OPTIONAL,   --
Cond SLRBSetup
     },
     ...
  sl-DL-AM-RLC ::= SEQUENCE { //sidelink AM RLC mode corresponding to
downlink
        sl-SN-FieldLengthAM   SN-FieldLengthAM          OPTIONAL,   --
Cond SLRBSetup
        sl-T-Reassembly       T-Reassembly,
        sl-T-StatusProhibit   T-StatusProhibit
  }
  sl-DL-UM-RLC ::= SEQUENCE { //sidelink UM RLC mode corresponding to
downlink
        sl-SN-FieldLengthUL   SN-FieldLengthUM            OPTIONAL, --
Cond SLRBSetup
        sl-T-Reassembly   T-Reassembly
  }
}
```

corresponding to bucketSizeDuration in ul-SpecificParameters of the UL data/signaling of the remote UE transmitted/received through the relay UE or to a bucketSizeDuration parameter of the DL data/signaling of the remote UE (this parameter is a value managed by the gNB for general DL data/signaling and may not be notified to the remote UE).

SL-LogicalChannelConfig information of PC5 SLRB configuration information in Table 11, corresponding to the one or more pieces of PC5 SLRB configuration information configured between the relay UE and the remote UE, may be configured to the relay UE and the remote UE by the network as in Table 11-2, as SL-LogicalChannelConfig of the PC5 SLRB configuration corresponding to the UL data/signaling or DL data/signaling of the remote UE relayed between the gNB and the remote UE through the relay UE.

For example, the network may configure the relay UE and the remote UE with a sl-Priority parameter corresponding to priority in ul-SpecificParameters of the UL data/signaling of the remote UE transmitted/received through the relay UE or to a priority parameter of the DL data/signaling of the remote UE (this priority parameter is a value managed by the gNB for general DL data/signaling and may not be notified to the remote UE).

For example, the network may configure the relay UE and the remote UE with a sl-PrioritisedBitRate parameter corresponding to prioritisedBitRate in ul-SpecificParameters of the UL data/signaling of the remote UE transmitted/received through the relay UE or to a prioritisedBitRate parameter of the DL data/signaling of the remote UE (this parameter is a value managed by the gNB for general DL data/signaling and may not be notified to the remote UE).

For example, the network may configure the relay UE and the remote UE with a sl-BucketSizeDuration parameter Here, the UL corresponds to a direction in which the data/signaling of the remote UE is transmitted from the relay UE to the gNB, the DL corresponds to a direction in which the data/signaling of the remote UE is transmitted from the gNB to the relay UE, a sidelink corresponding to the UL corresponds to a direction in which the data/signaling of the remote UE is transmitted from the remote UE to the relay UE, and a sidelink corresponding to the DL corresponds to a direction in which the data/signaling of the remote UE is transmitted from the relay UE to the remote UE. At least one or a combination of priority, prioritisedBitRate, and bucketSizeDuration may be configured for each of the UL, the DL, the sidelink corresponding to the UL, and the sidelink corresponding to the DL.

According to an embodiment, at least one or a combination of priority, prioritisedBitRate, and bucketSizeDuration may be configured in a same value for the UL and the sidelink corresponding to the UL, and in a same value for the DL and the sidelink corresponding to the DL.

According to another embodiment, at least one or a combination of priority, prioritisedBitRate, and bucketSizeDuration may be configured in a value satisfying an end-to-end QoS requirement value for each of the UL and the sidelink corresponding to the UL, and in a value satisfying an end-to-end QoS requirement value for each of the DL and the sidelink corresponding to the DL.

TABLE 11-2

| SL-LogicalChannelConfig information element |
|---|
| SL-LogicalChannelConfig ::= SEQUENCE {<br>sl-Priority INTEGER (1..8), //corresponds to traffic priority of data/signaling of remote UE.<br>sl-PrioritisedBitRate ENUMERATED {kBps0, KBps8, kBps16, KBps32, kBps64, KBps128, KBps256, kBps512, kBps1024, KBps2048, KBps4096, KBps8192, kBps16384, KBps32768, KBps65536, infinity},<br>sl-BucketSizeDuration ENUMERATED {ms5, ms10, ms20, ms50, ms100, ms150, ms300, ms500, ms1000, spare7, spare6, spare5, spare4, spare3, spare2, spare1},<br>sl-ConfiguredGrantType1Allowed ENUMERATED {true} OPTIONAL, -- Need R<br>sl-HARQ-FeedbackEnabled ENUMERATED {enabled, disabled } OPTIONAL, -- Need R<br>sl-AllowedCG-List SEQUENCE (SIZE (0.. maxNrofCG-SL-1)) OF SL-ConfigIndexCG OPTIONAL, -- Need R<br>sl-AllowedSCS-List SEQUENCE (SIZE (1..maxSCSs)) OF SubcarrierSpacing OPTIONAL, -- Need R<br>sl-MaxPUSCH-Duration ENUMERATED {ms0p02, ms0p04, ms0p0625, ms0p125, ms0p25, ms0p5, spare2, spare1} OPTIONAL, -- Need R<br>sl-LogicalChannelGroup INTEGER (0..maxLCG-ID) OPTIONAL, -- Need R<br>sl-SchedulingRequestId SchedulingRequestId OPTIONAL, -- Need R<br>sl-LogicalChannelSR-DelayTimerApplied BOOLEAN OPTIONAL, -- Need R<br>...<br>} |

According to an embodiment, one or more pieces of PC5 SLRB configuration information configured between the relay UE and the remote UE by the network may include an SL-RadioBearerConfig parameter. The SL-RadioBearerConfig may include information of Table 11-3 below.

SL-RadioBearerConfig configuration information included in the PC5 SLRB configuration information for general NR sidelink communication may include configuration information of sidelink SDAP entity and bearer, and configuration information of sidelink PDCP entity and bearer, but SL-RadioBearerConfig information of the PC5 SLRB configuration information used to transmit the UL data/signaling or DL data/signaling of the remote UE between the gNB and the remote UE through relay of the relay UE may not need to include the configuration information of the sidelink SDAP entity and bearer and the configuration information of the sidelink PDCP entity and bearer.

The SL-RadioBearerConfig of the PC5 SLRB configuration information configured between the relay UE and the remote UE may be configured for each of the sidelink corresponding to the UL and the sidelink corresponding to the DL. According to an embodiment, the network may configure SL-QoS-Profile information for each of the sidelink corresponding to the UL and the sidelink corresponding to the DL, in the SL-RadioBearerConfig information of the PC5 SLRB configuration information configured between the relay UE and the remote UE.

According to another embodiment, the network may configure SL-QoS-Profile information of a sidelink radio bearer in the PC5 SLRB configuration information configured between the relay UE and the remote UE, and may configure the SL-QoS-Profile for each of the sidelink corresponding to the UL and the sidelink corresponding to the DL.

When the network configures SL-RadioBearerConfig and/or SL-QoS-Profile of the PC5 SLRB configuration information between the relay UE and the remote UE, the relay UE and the remote UE may determine QoS parameters corresponding to the DL data/signaling of the remote UE or the UL data/signaling of the remote UE to be transmitted through sidelink, based on the SL-RadioBearerConfig and/or SL-QoS-Profile configuration of the PC5 SLRB configuration information for the sidelink corresponding to the DL and the SL-RadioBearerConfig and/or SL-QoS-Profile configuration of the PC5 SLRB configuration information for the sidelink corresponding to the UL.

The relay UE and the remote UE may allocate (select) a sidelink transmission resource, based on the QoS parameters or configure a sidelink transmission parameter value or reception parameter value. For example, a TX UE may determine a resource reservation interval value used for a transmission sidelink resource, based on an sl-PacketDelayBudget parameter, select a resource to be used for actual sidelink packet transmission, considering the sl-PacketDelayBudget parameter among candidate time/frequency resources selected in a physical layer for sidelink transmission, or determine whether a resource selected to be used for the actual sidelink packet transmission is still valid, considering the sl-PacketDelayBudget parameter. For example, the TX UE may set a transmission range (reception range) of a sidelink packet, based on an sl-Range parameter or an sl-TransRange parameter. In other words, the sl-Range parameter or sl-TransRange parameter may be used by the TX UE to set a communication range value in SCI, when the TX UE configures NACK-based HARQ retransmission.

TABLE 11-3

| SL-RadioBearerConfig information element |
|---|
| SL-RadioBearerConfig ::= SEQUENCE {<br>sl-TransRange ENUMERATED {m20, m50, m80, m100, m120, m150, m180, m200, m220, m250, m270, m300, m350, m370, m400, m420, m450, m480, m500, m550, m600, m700, m1000, spare9, spare8, spare7, spare6, spare5, spare4, |

TABLE 11-3-continued

```
SL-RadioBearerConfig information element

spare3, spare2, spare1}         OPTIONAL,   -- Need R
    ...
}
SL-QoS-Profile ::=          SEQUENCE {
    sl-PQI                      SL-PQI OPTIONAL,   -- Need R
    sl-GFBR INTEGER (0..4000000000) OPTIONAL,   -- Need R
    sl-MEBR INTEGER (0..4000000000) OPTIONAL,   -- Need R
    sl-Range INTEGER (1..1000) OPTIONAL,   -- Need R
    ...
}
SL-PQI ::=                  CHOICE {
    sl-StandardizedPQI INTEGER (0..255),
    sl-Non-StandardizedPQI SEQUENCE {
      sl-ResourceType ENUMERATED {gbr, non-GBR, delayCriticalGBR,
spare1}   OPTIONAL,   -- Need R
      sl-PriorityLevel INTEGER (1..8) OPTIONAL,   -- Need R
      sl-PacketDelayBudget INTEGER (0..1023) OPTIONAL,   -- Need R
      sl-PacketErrorRate INTEGER (0..9) OPTIONAL,   -- Need R
      sl-AveragingWindow INTEGER (0..4095) OPTIONAL,   -- Need R
      sl-MaxDataBurst Volume INTEGER (0..4095) OPTIONAL,   -- Need R
    ...
  }
}
```

Meanwhile, in a general sidelink communication system (device-to-device (D2D) direct communication system), the PC5 SLRB configuration configured for the use of sidelink data/signaling is obtained by the TX UE from the gNB and required SLRB configuration information is generally exchanged between two entities that perform a direct communication through sidelink RRC reconfiguration procedure between the two entities. According to an embodiment of the present disclosure, regarding the PC5 SLRB configuration configured between the remote UE and the relay UE through the relay UE, the TX UE or TX relay UE may each obtain the PC5 SLRB configuration from the gNB. The obtained PC5 SLRB configuration for a purpose of the relay UE may be exchanged between the relay UE and the remote UE through the sidelink RRC reconfiguration procedure.

According to another embodiment of the present disclosure, regarding the PC5 SLRB configuration configured between the remote UE and the relay UE through the relay UE, the gNB may transmit the PC5 SLRB configuration to the relay UE for the remote UE (without a request from the TX UE or TX relay UE). Here, the gNB may determine an RRC connection establishment request of the remote UE, determine that the remote UE has transitioned to an RRC_CONNECTED state, and transmit, to the relay UE, the Uu DRB/SRB configuration and PC5 SLRB configuration corresponding to the data/signaling of the remote UE. The PC5 SLRB configuration obtained from the gNB may be exchanged between the relay UE and the remote UE through the sidelink RRC reconfiguration procedure. A time point when a procedure of configuring the PC5 SLRB configuration for the purpose of relay UE may be the same as a time point when the remote UE and the relay UE perform a PC5 direct link establishment procedure and perform the sidelink RRC reconfiguration procedure for PC5 RRC configuration, but a sidelink RRC reconfiguration procedure for a purpose of relay transmission may be performed separately from the PC5 direct link establishment procedure.

Figure 8:
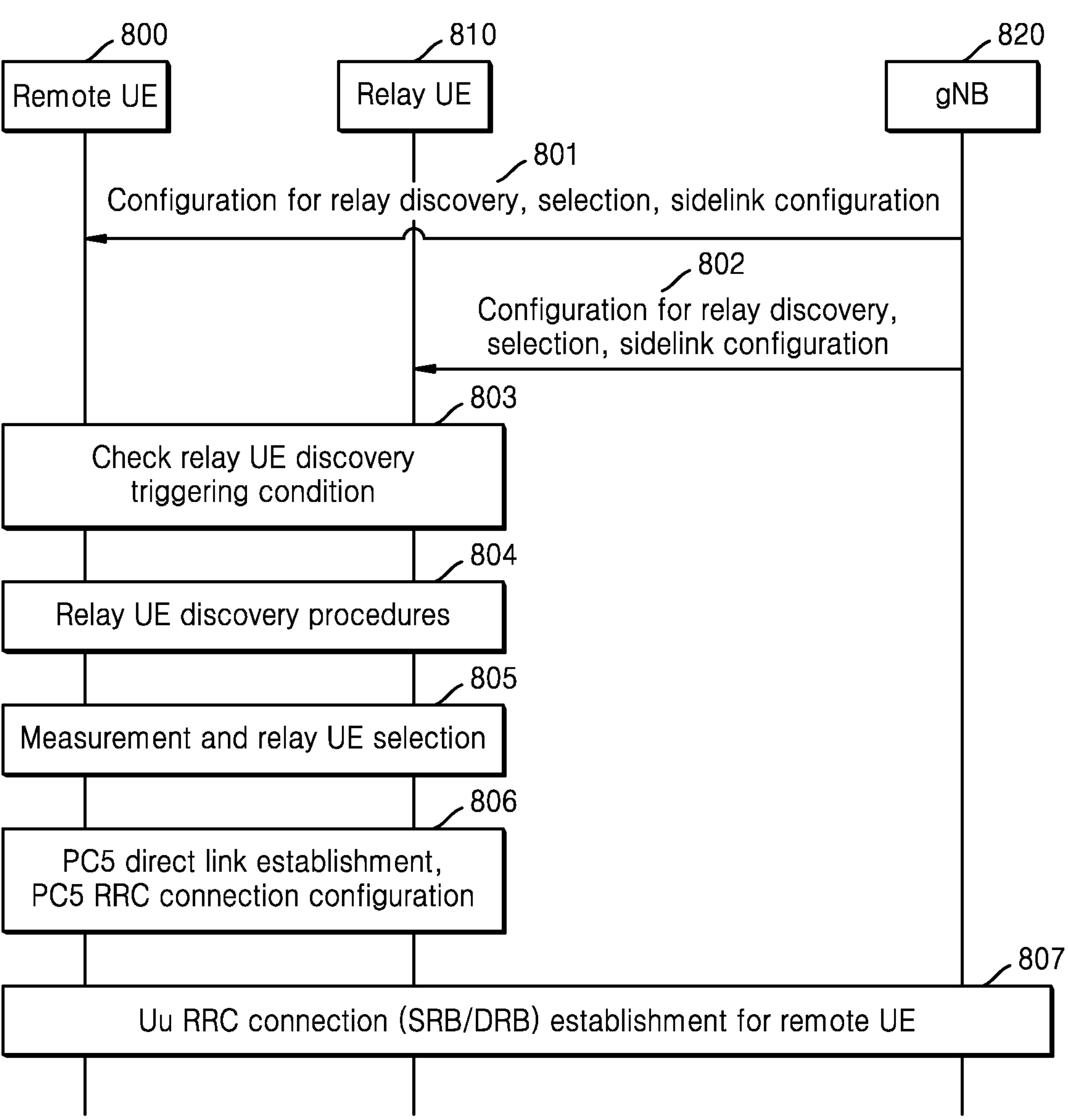
FIG. 8 is a diagram showing a signal flow between a terminal, a sidelink relay, and a base station, for processing radio resource control (RRC) connection establishment between the terminal and the base station, according to an embodiment of the present disclosure.

FIG. 8 is a diagram showing a signal flow between a remote UE, a relay UE, and a gNB, for processing RRC connection establishment between the remote UE and the gNB, according to an embodiment of the present disclosure.

Referring to FIG. 8, in operations 801 and 802, a remote UE 800 and a relay UE 810 may obtain, from a gNB 820, configuration information required to perform relay UE discovery, relay UE selection, and sidelink data/signaling transmission/reception. The remote UE 800 and the relay UE 810 may be located in a gNB coverage and when it is determined that the remote UE 800 and the relay UE 810 is out-of-coverage, the gNB 820 may transmit, to the remote UE 800 and the relay UE 810, the pre-configured configuration information required to perform the relay UE discovery, the relay UE selection, and the sidelink data/signaling transmission/reception, in operations 801 and 802.

The remote UE 800 and the relay UE 810 may each determine whether a condition for triggering a relay UE discovery procedure is satisfied in operation 803, by referring to the configuration information of operations 801 and 802.

The remote UE 800 and relay UE 810 may each perform the relay UE discovery procedure in operation 804 by referring to the configuration information obtained in operations 801 and 802.

The remote UE 800 and the relay UE 810 may each perform a measurement procedure for selecting a relay UE and may select a relay UE or be selected as a relay UE, based on a configuration condition, in operation 805, by referring to the configuration information of operations 801 and 802.

In operation 806, the remote UE 800 and the relay UE 810 may establish a sidelink direct link so as to perform data/signaling transmission/reception with the gNB 820 through the relay UE. A sidelink direct link establishment procedure follows PC5-S signaling message transmission/reception procedures of V2X layers of the remote UE 800 and relay UE 810. Also, the remote UE 800 and the relay UE 810 may perform a PC5 RRC procedure. The PC5 RRC procedure may include a UE capability enquiry sidelink/UE capability information sidelink message procedure for exchanging sidelink capability information, and a RRCReconfiguration-Sidelink/RRCReconfigurationCompleteSidelink message procedure for configuring a PC5 RRC configuration. A procedure for configuring a PC5 RRC configuration may also be performed for a PC5 SLRB configuration to be applied when the remote UE 800 and the relay UE 810 transmit/receive the data/signaling of the remote UE 800 and gNB 820 from a sidelink interface.

The remote UE 800 may perform an RRC connection establishment procedure for the gNB 820 through the relay UE 810, in operation 807. Through operation 807, the gNB 820 may configure Uu DRB/SRB for a purpose of the data/signaling of the remote UE 800. Through operation 807, the gNB 820 may configure the remote UE 800 and the relay UE 810 with PC5 SLRB mapped to the Uu DRB/SRB of the remote UE 800. The remote UE 800 and the relay UE 810 may use the configured PC5 SLRB to transmit/receive data/signaling from the remote UE 800 to the gNB 820 and transmit/receive data/signaling from the gNB 820 to the remote UE 800. The relay UE 810 may relay the data/signaling between the remote UE 800 and the gNB 820 by performing an operation of mapping the data/signaling of the remote UE 800 corresponding to the PC5 SLRB to the Uu DRB/SRB, and an operation of mapping the data/signaling of the remote UE 800 corresponding to the Uu DRB/SRB to the PC5 SLRB. Meanwhile, operation 807 starts from when the remote UE 800 transmits an RRCSetupRequest message for starting the RRC connection establishment procedure with the gNB 820. Detailed procedures of operation 807 will be described below with reference to FIG. 10B.

Figure 9:
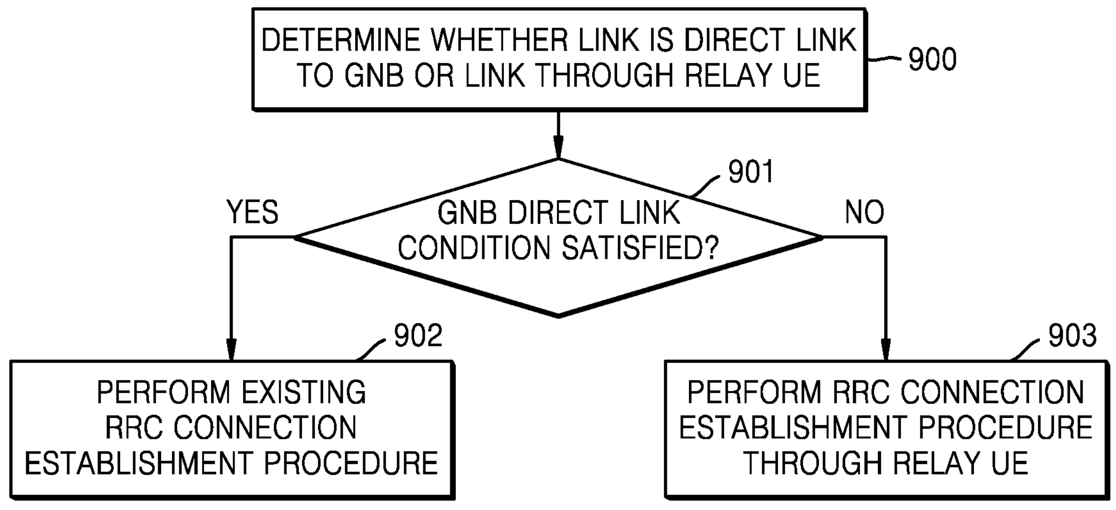
FIG. 9 is a diagram of operations by which a terminal processes RRC connection establishment with a base station, according to an embodiment of the present disclosure.

FIG. 9 is a diagram of operations by which a remote UE processes RRC connection establishment with a gNB, according to an embodiment of the present disclosure.

Referring to FIG. 9, in operation 900, the remote UE may determine whether an RRC connection establishment procedure is performed through a direct link with the gNB or the RRC connection establishment procedure is performed with the gNB through a relay UE. For example, a criterion for determining that the remote UE performs the RRC connection establishment procedure through the direct link with the gNB is as Table 12 below.

TABLE 12

| |
|---|
| A remote UE determines to perform a direct link procedure with a gNB in at least one or a combination of a case where a connectable cell is found through a cell selectionor cell reselection procedure and a case where there is a relay connectable to the gNB but a connection establishment condition with the relay is not satisfied (for example, a signal measurement value (SL RSRP) transmitted by the relay is less than a threshold value). |

For example, a criterion for determining that the remote UE performs the RRC connection establishment procedure with the gNB through the relay UE is as Table 13 below.

TABLE 13

| |
|---|
| A remote UE determines to perform a connection procedure to a gNB through a relay in at least one or a combination of a case where it is determined that there is no connectable cell through a cell selection or cell reselection procedure and a case where a gNB direct link condition is not satisfied but a connection establishment condition with the relay is satisfied. |

When it is determined that a condition for performing the RRC connection establishment procedure through the direct link to the gNB is satisfied in operation 901 ("Yes" in operation 901), the remote UE may perform an RRC connection procedure with the gNB in operation 902. The RRC connection establishment procedure performed by the remote UE in operation 902 is the same as an RRC connection procedure defined in the existing Uu interface, and an embodiment of the RRC connection establishment procedure will be described in FIG. 10A.

When it is determined that the condition for performing the RRC connection establishment procedure through the direct link to the gNB is not satisfied ("No" in operation 901), the remote UE may perform the RRC connection establishment procedure with the gNB through the relay UE in operation 903. An embodiment of operations of the remote UE in operation 903 will be described in FIG. 10B.

Figure 10A:
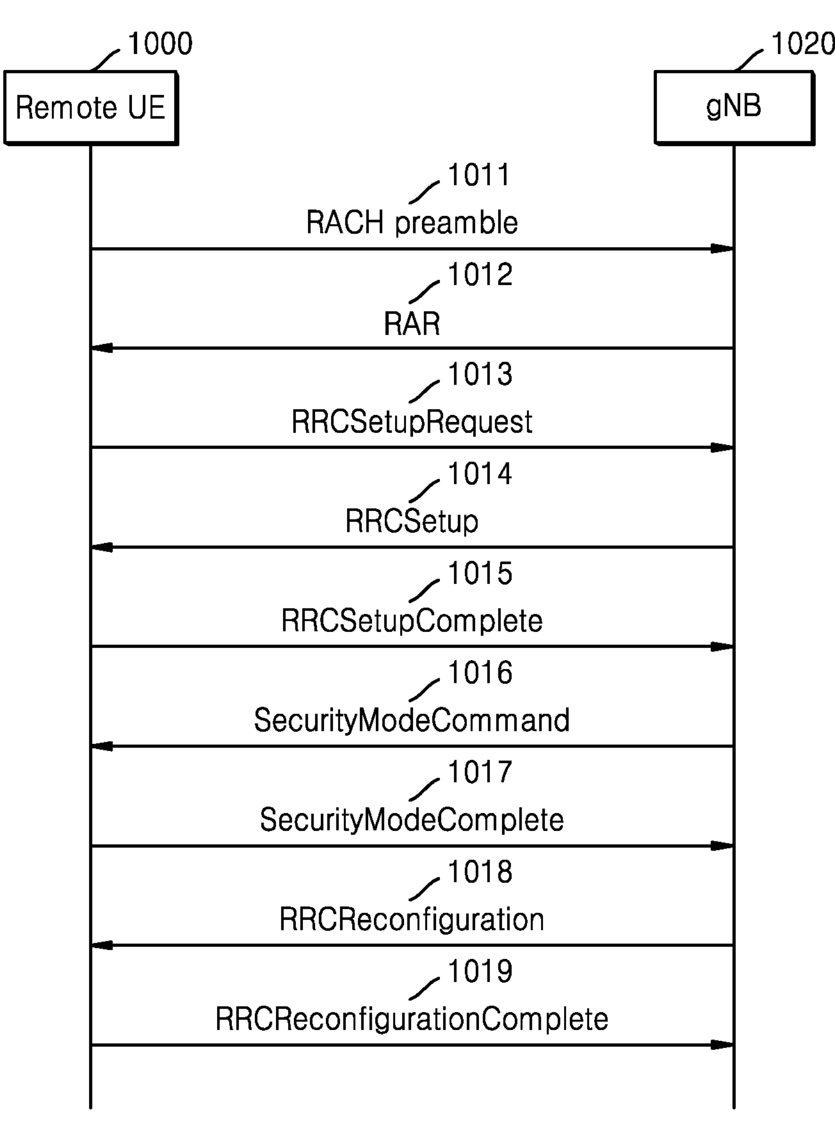
FIG. 10A is a diagram showing a signal flow in which a terminal processes RRC connection establishment through a direct link with a base station, according to an embodiment of the present disclosure.

FIG. 10A is a diagram showing a signal flow in which a remote UE processes RRC connection establishment through a direct link with a gNB, according to an embodiment of the present disclosure.

Referring to FIG. 10A, a remote UE 1000 may obtain synchronization with a gNB 1020, and transmit a random-access channel (RACH) preamble to the gNB 1020 by using an UL RACH resource in operation 1011.

In operation 1012, the remote UE 1000 may receive a random-access response (RAR) from the gNB 1020, by using a DL resource.

The remote UE 1000 may transmit an RRCSetupRequest message to the gNB 1020 in operation 1013, through an UL resource allocated to the remote UE 1000 as the gNB 1020 transmits the RAR.

The remote UE 1000 may receive an RRCSetup message from the gNB 1020 in operation 1014, by using a DL resource.

In response, the remote UE 1000 may transmit an RRCSetupComplete message to the gNB 1020 in operation 1015, by using an UL resource.

In operation 1016, the gNB 1020 may transmit SecurityModeCommand to the remote UE 1000 by using a DL resource.

In operation 1017, the remote UE 1000 may transmit a SecurityModeComplete message to the gNB 1020 by using an UL resource.

The remote UE 1000 may receive an RRCReconfiguration message from the gNB 1020 in operation 1018, by using a DL resource.

In response, the remote UE 1000 may transmit an RRCReconfigurationComplete message to the gNB 1020 in operation 1019, by using an UL resource.

Figure 10B:
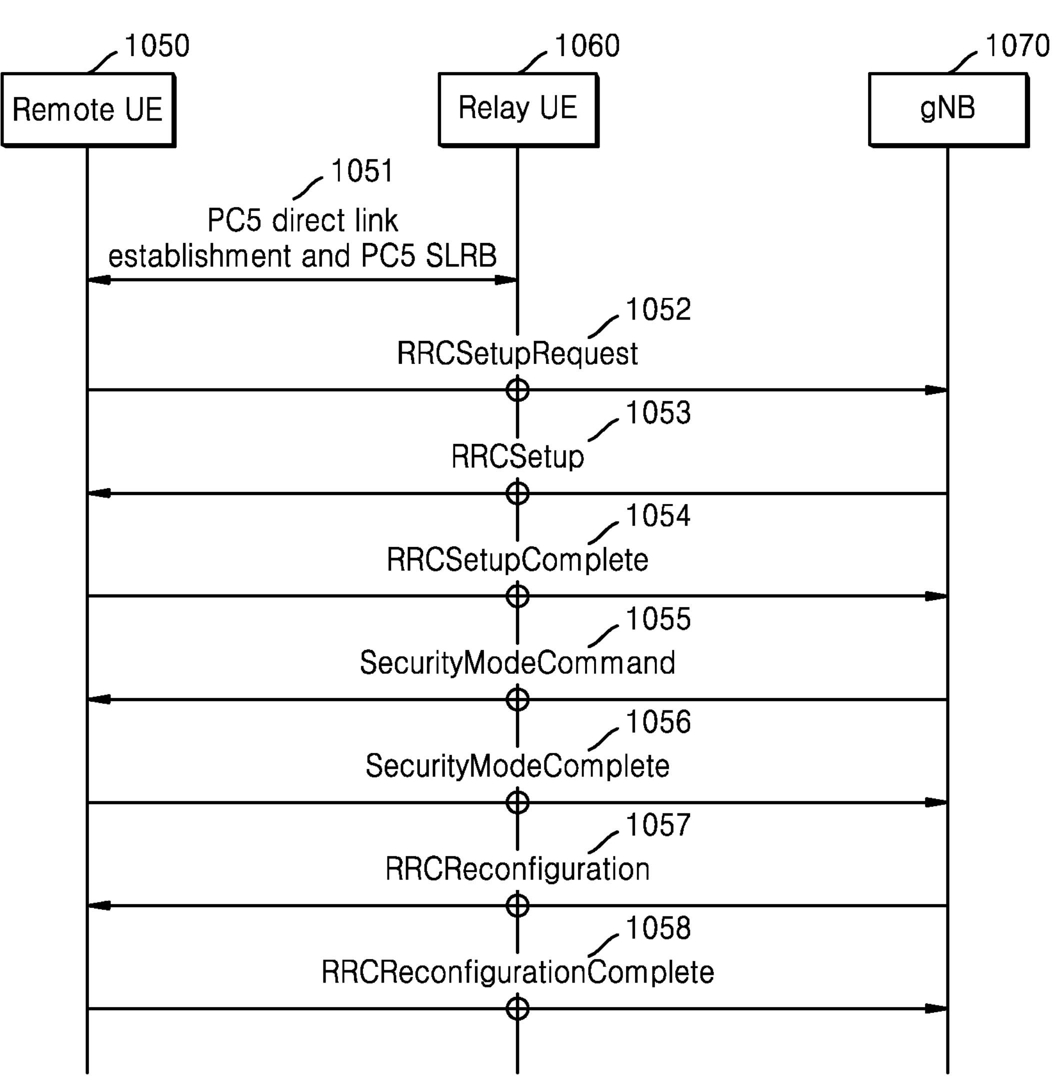
FIG. 10B is a diagram showing a signal flow in which a terminal processes RRC connection establishment with a base station through a sidelink relay, according to an embodiment of the present disclosure.

FIG. 10B is a diagram showing a signal flow in which a remote UE processes RRC connection establishment with a gNB through a relay UE, according to an embodiment of the present disclosure.

Referring to FIG. 10B, in the embodiment of FIG. 10B, a remote UE 1050 is unable to process an RRC connection establishment procedure with a gNB 1070 through a direct link as in the embodiment of FIG. 10A, and thus the remote UE 1050 may transmit/receive RRC signaling required for RRC connection establishment by using sidelink signaling with a relay UE 1060. In this regard, the remote UE 1050 and the relay UE 1060 may establish a sidelink direct link in operation 1051, and configure a sidelink radio bearer (indicated as PC5 SLRB) that is to transmit/receive RRC signaling required for RRC connection establishment with the gNB 1070. The PC5 SLRB may be configured in a same sidelink RLC mode as an RLC mode of RRC signaling with the gNB 1070, and when the RLC mode of the RRC signaling of the gNB 1070 is RLC TM, RLC UM unidirectional, RLC UM bidirectional, RLC AM unidirectional, and RLC AM bidirectional, one or more PC5 SLRBs (PC5 RLC TM, PC5 RLC UM unidirectional, PC5 RLC UM bidirectional, PC5 RLC AM unidirectional, and PC5 RLC AM bidirectional) may be configured, respectively.

In operations 1052 through 1058, the configured PC5 SLRB may be used to transmit an RRC connection establishment message between the remote UE 1050 and the gNB 1070 through the relay UE 1060. For example, the PC5 SLRB may correspond to a sidelink SLRB for transmitting/receiving the RRC connection establishment message between the remote UE 1050 and the gNB 1070 through the relay UE 1060.

Among Uu RRC messages exchanged when the remote UE 1050 performs an RRC connection establishment procedure with the gNB 1070, for RRCSetupRequest, RRCResumeRequest, RRCReestablishmentRequest, and RRCSystemInfoRequest messages corresponding to UL-CCCH, a RRCResumeRequest1 corresponding to UL-CCCH1, and RRCReject and RRCSetup messages corresponding to DL-CCCH, the gNB 1070 may configure the relay UE 1060 and the remote UE 1050 with PC5 SLRB configuration information for the remote UE 1050 to transmit/receive the RRC messages corresponding to UL-CCCH, UL-CCCH1, and DL-CCCH through the relay UE 1060. Alternatively, the remote UE 1050 and the relay UE 1060 may obtain the PC5 SLRB configuration information for transmitting/receiving the RRC messages corresponding to UL-CCCH, UL-CCCH1, DL-CCCH, the PC5 SLRB configuration information being pre-configured in a system.

When it is determined that the RRC message corresponding to DL-CCCH is received from the gNB 1070, the relay UE 1060 may map the RRC message to the PC5 SLRB corresponding to DL-CCCH and transmit the same to the remote UE 1050.

The remote UE 1050 may process the RRC message obtained through the PC5 SLRB corresponding to DL-CCCH. The remote UE 1050 may transmit the RRC message to the relay UE 1060 through the PC5 SLRB corresponding to UL-CCCH or UL-CCCH1, and such an RRC message is signaling to be transmitted to the gNB 1070.

The relay UE 1060 may map the RRC message obtained through the PC5 SLRB corresponding to UL-CCCH or UL-CCCH1 to a Uu SRB corresponding to UL-CCCH or UL-CCCH1, and transmit the same to the gNB 1070. Such operations are performed in a same manner when, among the RRC messages, RRCReconfiguration, RRCResume, RRCRelease, RRCReestablishment, SecurityModeCommand, DLInformationTransfer, UECapabilityEnquiry, CounterCheck, MobilityFromNRCommand, DLDedicatedMessageSegment, UEInformationRequest, DLInformationTransferMRDC, and LoggedMEasrementConfiguration messages corresponding to DL-DCCH are transmitted by the gNB 1070 to the remote UE 1050 through the relay UE 1060 and when RRCReconfigurationComplete, MeasurementReport, RRCSetupComplete, RRCReestablishmentComplete, RRCResumeComplete, SecurityModeComplete, SecurityModeFailure, ULInformationTransfer, LocationMeasurementIndication, UECapabilityInformation, CounterCheckResponse, UEAssistanceInformation, FailureInformation, ULInformation TransferMRDC, SCGFailureInformation, SCGFailureInformationEUTRA, ULDedicatedMessageSegment, DedicatedSIBRequest, MCGFailureInformation, UEInformationResponse, SidelinkUEInformationNR, ULInformationTransferIRAT messages corresponding to UL-DCCH are transmitted by the remote UE 1050 to the gNB 1070 through the relay UE 1060. At this time, the remote UE 1050 and the relay UE 1060 may process messages for DL-DCCH and messages for UL-DCCH by using a PC5 SLRB configuration configured for DL-DCCH and a PC5 SLRB configuration configured for UL-DCCH.

In a case where the RRC message corresponding to DL-CCCH, UL-CCCH, or UL-CCCH1 of the remote UE 1050 is transmitted while processing an RAP header in a relay adaptation layer of the gNB 1070 and relay UE 1060, corresponding identification information in the RAP header may not be yet configured in the remote UE 1050 (for example, regarding the RRCSetupRequest message initially transmitted by the remote UE, remote UE identification information for the RAP header may not be configured between the gNB 1070 and the relay UE 1060). In this case, the remote UE identification information may be omitted and only RLC channel information corresponding to the RRC message may be included in the RAP header, and the RRC message may be transmitted/received between the relay UE 1060 and the gNB 1070.

The PC5 SLRB may be configured as a sidelink signaling bearer or a sidelink data bearer. The PC5 SLRB (signaling bearer or data bearer) may be pre-configured (pre-configuration or default configuration) for the RRC connection establishment messages of the remote UE 1050 connected to the gNB 1070 through the relay UE 1060, and may be additionally configured or updated during the RRC connection establishment procedure (operations 1052 through 1058) performed by the remote UE 1050 and the gNB 1070.

In the embodiment of FIG. 10B, the remote UE 1050 does not perform the RRC connection establishment procedure through the direct link with the gNB 1070, and thus a Uu random access procedure (operations 1011 and 1012) of FIG. 10A is not required to be performed.

The remote UE 1050 transmits the RRCSetupRequest message to the gNB 1070 in operation 1052, and at this time, the RRCSetupRequest message may be transmitted to the gNB 1070 through a resource allocated from a sidelink transmission resource pool, instead of transmitting the RRCSetupRequest message through an UL resource transmitted from RAR of FIG. 10A.

In FIG. 10B, the remote UE 1050 may transmit the RRC connection establishment message through the resource allocated by the gNB 1070 from the sidelink transmission resource pool or through a resource directly selected by the remote UE. The RRCSetupRequest message of operation 1052 may be transmitted to the gNB 1070 by using a UL resource of the relay UE 1060.

In operation 1053, in response to the RRCSetupRequest message, the gNB 1070 may configure an RRCSetup message and transmit the same to the remote UE 1050 through the relay UE 1060. The relay UE 1060 may transmit the RRCSetup message to the remote UE 1050 by using a resource of the sidelink transmission resource pool, and the remote UE 1050 may receive the RRCSetup message by using a resource of a sidelink reception resource pool.

In operation 1054, the remote UE 1050 may transmit an RRCSetupComplete message to the relay UE 1060 by using a resource of the sidelink transmission resource pool, and the RRCSetupComplete message may be transmitted to the gNB 1070 by using an UL resource of the relay UE 1060.

Messages of following operations, i.e., messages for performing a security mode command procedure (operations 1055 and 1056) and an RRC reconfiguration procedure (operations 1057 and 1058) between the remote UE 1050 and the gNB 1070, may also be transmitted/received between the remote UE 1050 and the relay UE 1060 by using the sidelink transmission/reception resource pool, and transmitted/received between the relay UE 1060 and the gNB 1070 by using the UL/DL resource.

Next, operations of the remote UE 1050 of FIG. 10B will be described in detail.

TABLE 14

| |
|---|
| In operation 1052, the remote UE 1050 may perform following operations to transmit the RRCSetupRequest message to the gNB 1070 through the relay UE 1060. |
| If provided by upper layer, perform UAC (unified access control) procedure using Access Category and Access Identities provided by upper layer and the UAC info in SIB1 relayed by Relay UE. |
| Start timer T300 (according to another embodiment, when the RRC connection establishment procedure is performed through the relay UE, a separate timer may be set. For example, T300-indirect may be set considering a time consumed by the remote UE to transmit/receive the RRC connection establishment message with the gNB through the relay UE) |
| Initiate transmission of RRCSetupRequest (the remote UE uses a resource allocated from the sidelink transmission resource pool to transmit the RRCSetupRequest message, and uses a PC5 SLRB configuration for RRCSetupRequest transmission) |

In other words, following operations that are required when the remote UE performs the RRC connection establishment procedure with the gNB through the direct link may not be performed during the RRC connection establishment procedure with the gNB through the relay UE.

Apply default L1 parameter values

Apply default MAC cell group configuration

Apply CCCH configuration

Apply timeAlignmentTimerCommon in SIB1

TABLE 15

| |
|---|
| In operation 1053, the remote UE 1050 may perform following operations when the RRCSetup message is received from the gNB 1070 through the relay UE 1060. The remote UE may obtain the RRCSetup message by using the PC5 SLRB configured for a purpose of RRCSetup message reception by monitoring the sidelink reception resource pool to receive the RRCSetup message. The remote UE that establishes the RRC connection with the gNB 1070 through the relay UE 1060 may obtain Uu PDCP entity and Uu SDAP entity configuration information for its SRB/DRB. The remote UE may not obtain Uu MAC entity and Uu RLC entity configuration information for its SRB/DRB during this procedure. |
| 1> perform the radio bearer configuration procedure in accordance with the received radioBearerConfig; |
| 1> if stored, discard the cell reselection priority information provided by the cellReselectionPriorities or inherited from another RAT; |
| 1> stop timer T300 (or T300-indirect), T301 or T319 if running; |
| 1> if T390 is running: |
| 2> stop timer T390 for all access categories; |
| 2> perform the actions for T390 expiry or stop; |
| 1> if T302 is running: |
| 2> stop timer T302; |
| 2> perform the actions for T302 expiry or stop; |
| 1> stop timer T320, if running; |

In other words, following operations that are required when the remote UE performs the RRC connection establishment procedure with the gNB through the direct link may not be performed during the RRC connection establishment procedure with the gNB through the relay UE. Such operations are necessary to configure an MAC entity and an RLC entity between the remote UE and the gNB, and when the remote UE is connected to the gNB through the relay UE, it is not required for the remote UE to obtain a Uu MAC entity configuration and a Uu RLC entity configuration. Instead, the remote UE may obtain a PC5 MAC entity configuration and a PC5 RLC entity configuration with the relay UE.

perform the cell group configuration procedure in accordance with the received masterCellGroup

TABLE 16

| |
|---|
| Also in operation 1053, the remote UE 1050 may perform following operations when the RRCSetup message is received from the gNB 1070 through the relay UE 1060. |
| 1> if the RRCSetup is received in response to an RRCResumeRequest, RRCResumeRequest1 or RRCSetupRequest: |
| 2> if T331 is running: |
| 3> stop timer T331; |
| 3> perform the actions for T331 expiry or stop; |
| 2> enter RRC_CONNECTED; (the remote UE may transition to an RRC_CONNECTED state) |
| 2> stop the cell re-selection procedure; (The remote UE may continuously perform the cell reselection procedure while standing by for the RRCSetup message from the gNB while performing the RRC connection establishment |

TABLE 16-continued

| |
|---|
| procedure with the gNB through the relay UE. The cell reselection procedure may include an operation of discovering another gNB/cell for a direct link of the remote UE. Also, the remote UE may perform an operation of continuously monitoring a link state with the currently connected relay UE to determine whether it is required to select another relay UE or change to a direct link. The cell reselection procedure may be performed until the remote UE receives the RRCSetup message from the gNB and determines that it is possible to transition to the RRC_CONNECTED state. A procedure by which the remote UE determines a change to a direct link or determines to select another relay UE after the remote UE is transitioned to the RRC_CONNECTED state may be performed through a path switch procedure. |
| 1> consider the gNB to be serving gNB |
| 1> set the content of RRCSetupComplete message |
| 1> submit the RRCSetupComplete message to lower layers for transmission, upon which the procedure ends. (The remote UE uses a transmission resource allocated from the sidelink transmission resource pool to transmit the RRCSetupComplete message, and uses the PC5 SLRB configured for RRCSetupComplete transmission.) |

Here, in a case where the remote UE configures the RRCSetupComplete message and in a case where it is determined that an SIB1 message obtained directly from the gNB or through the relay UE includes indication information reporting "relay discovery measurement", the remote UE may include a relay UE measurement report to the RRCSetupComplete message when relay UE measurement has been performed and the remote UE has a relay UE measurement result.

Although not shown in FIG. 10B, the gNB 1070 may transmit an RRCReject message to the remote UE 1050 through the relay UE 1060 in response to the RRCSetupRequest transmitted by the remote UE 1050 in operation 1052. Following operations may be performed when the remote UE 1050 determines that the RRCReject message has been received from the gNB 1070 through the relay UE 1060.

TABLE 17

| |
|---|
| • When the remote UE determines that the RRCReject message is received from the gNB in response to the RRCSetupRequest message, |
| 1> The remote UE may stop running timers (e.g., T300/T300-indirect, and T302). |
| 1> When waitTimer is obtained through the RRCReject message, the remote UE may start the T302 timer by setting the T302 timer to a waitTimer value. |
| 1> The remote UE may notify its higher layer about RRC connection establishment procedure failure and end the RRC connection establishment procedure. |
| 1> The remote UE may determine that it is not required to establish RRC connection with the gNB through the relay UE and perform a procedure for releasing relay PC5 RRC connection with the relay UE. |

In Table 17, an embodiment, in which the remote UE triggers PC5 RRC connection release and PC5-S connection release with the relay UE to which the PC5 RRC connection is established, when the remote UE receives the RRCReject message from the gNB in response to the RRCSetupRequest message, has been described.

According to another embodiment, the gNB may determine RRCReject for the RRC connection procedure request (RRCSetupRequest) of the remote UE, and notify RRCReject information of the remote UE to the relay UE that relayed the RRCSetupRequest message of the remote UE. Upon determining RRCReject for the remote UE, the relay UE may notify its higher layer of the PC5 RRC connection and PC5-S connection release with the remote UE, and perform a procedure for releasing the PC5 RRC connection and PC5-S connection with the remote UE.

In the embodiment of Table 17 or in the embodiment in which the relay UE triggers the PC5 RRC connection and PC5-S connection release, the relay UE may delete context for relay regarding the remote UE that has been RRC rejected, i.e., the relay UE configuration information for the remote UE.

When the RRCReject message is received during the RRC connection establishment procedure through a direct link to the gNB, the remote UE may perform operations of "resetting MAC and releasing the default MAC cell group configuration", but when the RRCReject message is received during the RRC connection establishment procedure with the gNB through the relay UE, the remote UE may not perform the operations of "resetting MAC and releasing the default MAC cell group configuration". The operations of "resetting MAC and releasing the default MAC cell group configuration" are not performed because the remote UE does not perform an operation of obtaining the Uu MAC entity configuration when the RRC connection is established with the gNB through the relay UE and thus does not perform operations of resetting the Uu MAC entity and releasing the Uu MAC entity configuration.

Following operations may be performed when the remote UE is indicated by its higher layer to abort the RRC connection establishment procedure (this operation may occur when an NAS procedure is aborted), and it is determined that the remote UE has not yet transitioned to the RRC_CONNECTED state.

TABLE 18

| |
|---|
| 1> Stop timer T300 (or T300-indirect), if running (the remote UE may use the T300-indirect timer during the RRC connection establishment procedure with the gNB through the relay UE, instead of the T300 timer used during the RRC connection establishment procedure through the direct link with the gNB.)<br>Also, the remote UE may perform an operation of processing the PC5 connection with the relay UE because the RRC connection establishment procedure with the gNB, which was being performed through the relay UE, is aborted.<br>According to an embodiment, the remote UE and the relay UE may maintain the PC5 connection established for the RRC connection establishment procedure between the remote UE and the gNB. Here, a value of the NAS timer run during the NAS abortion procedure of the remote UE may be applied to the timer for determining whether to maintain the PC5 connection. The remote UE may search for another relay UE or continuously perform the Uu cell reselection procedure.<br>The remote UE and the relay UE may perform a keep alive procedure of PC5-S signaling to continuously monitor a PC5 link state between the remote UE and the relay UE. The remote UE may be instructed to resume the RRC connection establishment procedure with the gNB according to an indication of its higher layer, and at this time, when it is determined that the PC5 link state with the relay UE is still valid and the remote UE does not need to reselect another Uu cell or it is determined that the remote UE does not need to select another relay UE, the remote UE may resume the RRC connection establishment procedure with the gNB through the PC5 connection with the relay UE. When the remote UE is not instructed to resume the RRC connection establishment procedure with the gNB by its higher layer, when it is determined the remote UE needs to reselect another Uu cell, or when it is determined that the remote UE needs to select another relay UE (or when at least one of these cases occur), the remote UE may resume the RRC connection establishment procedure with the gNB through a new Uu cell, a new relay UE, or an existing relay UE.<br>According to another embodiment, the remote UE and the relay UE may release the PC5 connection established for the RRC connection establishment procedure between the remote UE and the gNB. The remote UE may search for another relay UE or continuously perform the Uu cell reselection procedure. |

When the remote UE is instructed to abort the RRC connection establishment procedure from the higher layer during the RRC connection establishment procedure through the direct link with the gNB and it is determined that the remote UE has not yet transitioned to the RRC_CONNECTED state, the remote UE may perform operations of "resetting MAC, releasing the MAC configuration, and re-establishing RLC for all RBs that are established", but when the remote UE is instructed to abort the RRC connection establishment procedure during the RRC connection establishment procedure with the gNB through the relay UE, the remote UE may not perform the operations of "resetting MAC, releasing the MAC configuration, and re-establishing RLC for all RBs that are established". When the RRC connection with the gNB through the relay UE is established, the remote UE does not perform the operations of obtaining the Uu MAC entity configuration and Uu RLC entity configuration, and thus does not perform the operations of resetting the Uu MAC entity, releasing the Uu MAC entity configuration, and re-establishing the Uu RLC entity.

Operations that may be performed when the remote UE 1050 obtains the RRCReconfiguration message transmitted by the gNB 1070 through the relay UE 1060, through the PC5 connection with the relay UE 1060, in operation 1057 of FIG. 10B, are as follows.

TABLE 19

| | |
|---|---|
| 1> | if the RRCReconfiguration includes the fullConfig:<br>2> perform the full configuration procedure (However, the remote UE does not perform an operation of applying a default L1 parameter, and does not perform an operation of applying a default MAC cell group configuration. That is, the remote UE does not need to perform operations of configuring Uu L1 (PHY), Uu MAC entity, and Uu RLC entity when establishing a connection with the gNB through the relay UE.) |
| 1> | if the RRCReconfiguration includes the masterKeyUpdate:<br>2> perform AS security key update procedure |
| 1> | if the RRCReconfiguration includes the sk-Counter:<br>2> perform security key update procedure |
| 1> | if the RRCReconfiguration message includes the radioBearerConfig:<br>2> perform the radio bearer configuration |
| 1> | if the RRCReconfiguration message includes the radioBearerConfig2:<br>2> perform the radio bearer configuration |
| 1> | if the RRCReconfiguration message includes the measConfig:<br>2> perform the measurement configuration procedure |
| 1> | if the RRCReconfiguration message includes the dedicatedNAS-MessageList:<br>2> forward each element of the dedicatedNAS-MessageList to upper layers in the same order as listed |
| 1> | if the RRCReconfiguration message includes the dedicatedSIB1-Delivery:<br>2> perform the action upon reception of SIB1 |
| 1> | if the RRCReconfiguration message includes the dedicatedSystemInformationDelivery:<br>2> perform the action upon reception of System Information |

TABLE 19-continued

| | |
|---|---|
| 1> | if the RRCReconfiguration message includes the dedicatedPosSysInfoDelivery: |
| | 2> perform the action upon reception of the contained posSIB(s) |
| 1> | if the RRCReconfiguration message includes the otherConfig: |
| | 2> perform the other configuration procedure |
| 1> | if the RRCReconfiguration message includes the needForGapsConfigNR: |
| | 2> if needForGapsConfigNR is set to setup: |
| | 3> consider itself to be configured to provide the measurement gap requirement information of NR target bands; |
| | 2> else: |
| | 3> consider itself not to be configured to provide the measurement gap requirement information of NR target bands; |
| 1> | if the RRCReconfiguration message includes the sl-ConfigDedicatedNR: |
| | 2> perform the sidelink dedicated configuration procedure |
| 1> | if the RRCReconfiguration message includes the sl-ConfigDedicatedEUTRA-Info: |
| | 2> perform related procedures for V2X sidelink communication in accordance with TS 36.331 |
| 1> | set the content of the RRCReconfigurationComplete message |
| 1> | submit the RRCReconfigurationComplete message to lower layers for transmission using PC5 SLRB corresponding to Uu SRB for RRCReconfigurationComplete (In other words, the remote UE transmits the RRCReconfigurationComplete message to the gNB through the PC5 connection with the relay UE, and at this time, the PC5 SLRB configuration configured for a purpose of transmitting the RRCReconfigurationComplete message is used and a transmission resource may be allocated from the sidelink transmission resource pool.) |

When the remote UE performs the RRC connection establishment procedure through the direct link with the gNB, the remote UE needs to perform operations of processing Uu L1 (PHY) configuration, Uu MAC entity configuration, and Uu RLC entity configuration parameters, and configuring corresponding entities.

perform the cell group configuration for the received masterCellGroup perform the cell group configuration for the SCG In other words, in the embodiment of FIG. 10B, the remote UE performs the RRC connection establishment procedure with the gNB through the connection with the relay UE, and thus instead of configuring Uu L1 (PHY), Uu MAC entity, and Uu RLC entity, sidelink L1 (PHY), sidelink MAC entity, and sidelink RLC entity may be configured.

Meanwhile, the remote UE may request the relay UE to transmit the SIB message transmitted by the gNB, and at this time, the remote UE may transmit, to the relay UE, an SIB information list requested by the remote UE. When it is determined that there is SIB information obtained through the RRCReconfiguration message from the gNB and the SIB information is not required to be received through the relay UE, the remote UE may request the relay UE for the SIB information list excluding the SIB information.

According to another embodiment of the present disclosure, in the embodiment of FIG. 10B, a sidelink transmission resource pool configured separately from a general sidelink transmission resource pool may be used for the remote UE and the relay UE to transmit the RRC connection establishment message of the remote UE. When the sidelink transmission resource pool is separately configured, the remote UE may select a resource from the sidelink transmission resource pool and transmit the RRCSetupRequest, RRCSetupComplete, SecurityModeComplete, RRCReconfigurationComplete messages to the relay UE to be transmitted to the gNB. When the sidelink transmission resource pool is separately configured, the relay UE may select the resource from the sidelink transmission resource pool and transmit, to the remote UE, the RRCSetup, SecurityModeCommand, and RRCReconfiguration messages transmitted by the gNB to the remote UE. The separately configured sidelink transmission resource pool may be used by the remote UE and the relay UE to transmit RRC messages (messages using an SRB) other than the RRC connection establishment procedure between the remote UE and the gNB. When the separate sidelink transmission resource pool is configured for the RRC connection establishment message of the remote UE, the remote UE may monitor the sidelink reception resource pool corresponding to the separate sidelink transmission resource pool to receive the RRC message transmitted from the gNB to the remote UE through the relay UE, and the relay UE may monitor the sidelink reception resource pool corresponding to the separate sidelink transmission resource pool to receive the RRC message transmitted from the remote UE to the gNB through the relay UE.

According to another embodiment of the present disclosure, the PC5 SLRB of FIG. 10B may be configured to transmit the RRC connection establishment message of the remote UE connected to the gNB through the relay UE, through unsecured PC5 connection on sidelink. Alternatively, the PC5 SLRB may be configured to transmit the RRC connection establishment message of the remote UE connected to the gNB through the relay UE, through secured PC5 connection on sidelink. Alternatively, the PC5 SLRB may be configured to transmit some messages through the unsecured PC5 connection and some messages through the secured PC5 connection during the RRC connection establishment procedure of the remote UE connected to the gNB through the relay UE. The message transmitted through the unsecured PC5 connection may correspond to a message transmitted before Uu security is configured through a security mode command procedure, and the message transmitted through the secured PC5 connection may correspond to a message transmitted after the Uu security is configured through the security mode command procedure.

Figure 11:
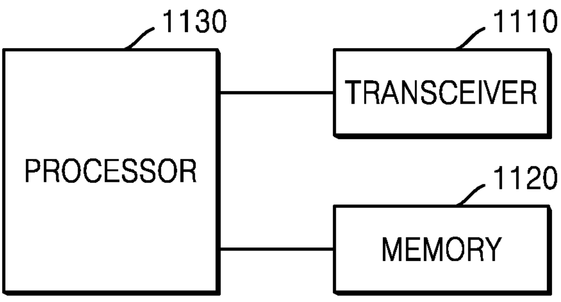
FIG. 11 is a diagram showing a configuration of a terminal, according to an embodiment of the present disclosure.

FIG. 11 is a diagram showing a configuration of a terminal, according to an embodiment of the present disclosure.

As illustrated in FIG. 11, the terminal of the present disclosure may include a transceiver 1110, a memory 1120, and a processor 1130. The processor 1130, the transceiver 1110, and the memory 1120 of the terminal may operate according to a communication method of the terminal described above. However, the components of the terminal are not limited thereto. For example, the terminal may include more or fewer components than those described above. Furthermore, the processor 1130, the transceiver 1110, and the memory 1120 may be implemented as one chip.

A receiver of the terminal and a transmitter of the terminal may be collectively referred to as the transceiver 1110, and the transceiver 1110 may transmit or receive a signal to or from a base station or network entity. The signal transmitted or received to or from the base station may include control information and data. In this regard, the transceiver 1110 may include a RF transmitter for up-converting and amplifying a frequency of the signal to be transmitted, and an RF receiver for low-noise-amplifying and down-converting a frequency of the received signal. However, this is only an embodiment of the transceiver 1110 and components of the transceiver 1110 are not limited to the RF transmitter and the RF receiver.

Also, the transceiver 1110 may include wired/wireless transceiver and may include various components for transmitting and receiving signals.

Also, the transceiver 1110 may receive signals through wires/wireless channels and output the signals to the processor 1130, and may transmit signals output from the processor 1130, through the wired/wireless channels.

Also, the transceiver 1110 may receive and output a communication signal to the processor and transmit a signal output from the processor to the network entity through a wired/wireless network.

The memory 1120 may store a program and data required for operations of the terminal. Also, the memory 1120 may store control information or data included in a signal obtained by the terminal. The memory 1120 may be a storage medium, such as ROM, RAM, a hard disk, a CD-ROM, and a DVD, or a combination of storage media.

The processor 1130 may control a series of processes to allow the terminal to operate according to the embodiments of the present disclosure described above. Also, the processor 1130 may include at least one processor. For example, the processor 1130 may include a communication processor (CP) for controlling communications and an application processor (AP) for controlling a higher layer such as an application program.

Figure 12:
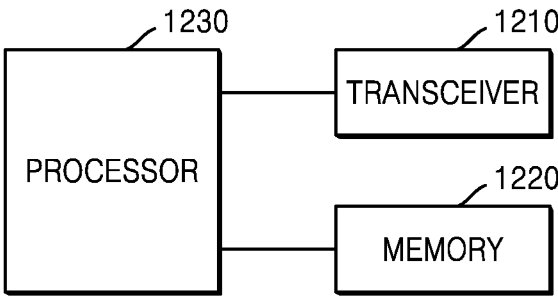
FIG. 12 is a diagram showing a configuration of the base station, according to an embodiment of the present disclosure.

FIG. 12 is a diagram showing a configuration of the base station, according to an embodiment of the present disclosure.

As illustrated in FIG. 12, the base station of the present disclosure may include a transceiver 1210, a memory 1220, and a processor 1230. The processor 1230, the transceiver 1210, and the memory 1220 of the base station may operate according to a communication method of the base station described above. However, the components of the base station are not limited thereto. For example, the base station may include more or fewer components than those described above. In addition, the processor 1230, the transceiver 1210, and the memory 1220 may be embodied in a form of one chip.

A receiver of the base station and a transmitter of the base station may be collectively referred to as the transceiver 1210, and the transceiver 1210 may transmit or receive a signal to or from a terminal or another base station. Here, the transmitted or received signal may include control information and data. In this regard, the transceiver 1210 may include a RF transmitter for up-converting and amplifying a frequency of the signal to be transmitted, and an RF receiver for low-noise-amplifying and down-converting a frequency of the received signal. However, this is only an embodiment of the transceiver 1210 and components of the transceiver 1210 are not limited to the RF transmitter and the RF receiver. The transceiver 1210 may include wired/wireless transceiver and may include various components for transmitting and receiving signals.

Also, the transceiver 1210 may receive signals through communication channels (for example, wireless channels) and output the signals to the processor 1230, and may transmit signals output from the processor 1230, through the communication channels.

Also, the transceiver 1210 may receive and output a communication signal to the processor and transmit a signal output from the processor to a terminal or a network entity through a wired/wireless network.

The memory 1220 may store a program and data required for operations of the base station. Also, the memory 1220 may store control information or data included in a signal obtained by the base station. The memory 1220 may include a storage medium such as a read only memory (ROM), a random-access memory (RAM), a hard disk, a compact disc ROM (CD-ROM), and a digital versatile disc (DVD), or a combination of the storage mediums.

The processor 1230 may control a series of processes to allow the base station to operate according to the embodiments of the present disclosure described above. Also, the processor 1230 may include at least one processor. The methods according to the embodiments of the present disclosure described in the claims or the detailed description of the present disclosure may be implemented in hardware, software, or a combination of hardware and software.

Figure 13:
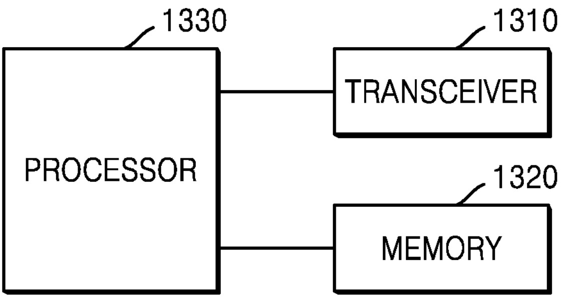
FIG. 13 is a diagram showing a configuration of a sidelink relay, according to an embodiment of the present disclosure.

FIG. 13 is a diagram showing a configuration of a sidelink relay, according to an embodiment of the present disclosure.

As illustrated in FIG. 13, the sidelink relay of the present disclosure may include a transceiver 1310, a memory 1320, and a processor 1330. The processor 1330, the transceiver 1310, and the memory 1320 of the sidelink relay may operate according to a communication method of the sidelink relay described above. However, the components of the sidelink relay are not limited thereto. For example, the sidelink relay may include more or fewer components than those described above. In addition, the processor 1330, the transceiver 1310, and the memory 1320 may be embodied in a form of one chip.

A receiver of the sidelink relay and a transmitter of the sidelink relay may be collectively referred to as the transceiver 1310, and the transceiver 1310 may transmit or receive a signal to or from a terminal or a base station. Here, the transmitted or received signal may include control information and data. In this regard, the transceiver 1310 may include a RF transmitter for up-converting and amplifying a frequency of the signal to be transmitted, and an RF receiver for low-noise-amplifying and down-converting a frequency of the received signal. However, this is only an embodiment of the transceiver 1310 and components of the transceiver 1310 are not limited to the RF transmitter and the RF receiver. The transceiver 1310 may include wired/wireless transceiver and may include various components for transmitting and receiving signals.

Also, the transceiver 1310 may receive signals through communication channels (for example, wireless channels) and output the signals to the processor 1330, and may transmit signals output from the processor 1330, through the communication channels.

Also, the transceiver 1310 may receive and output a communication signal to the processor and transmit a signal output from the processor to a terminal or a base station through a wired/wireless network.

The memory 1320 may store a program and data required for operations of the sidelink relay. Also, the memory 1320 may store control information or data included in a signal obtained by the sidelink relay. The memory 1320 may include a storage medium, such as read-only memory (ROM), random access memory (RAM), a hard disk, a CD-ROM, or a DVD, or a combination of storage media.

The processor 1330 may control a series of processes to allow the sidelink relay to operate according to the embodiments of the present disclosure described above. Also, the processor 1330 may include at least one processor. The methods according to the embodiments of the present disclosure described in the claims or the detailed description of the present disclosure may be implemented in hardware, software, or a combination of hardware and software.

According to an embodiment of the present disclosure, provided is a method, performed by a relay UE, of relaying communication between a remote UE and a base station, in a wireless communication system. The method includes: transmitting, to the base station, a message about sidelink UE information including first identifier information of the remote UE; receiving, from the base station, an RRC reconfiguration message including configuration information for relaying data of the remote UE and second identifier information, based on the message about the sidelink UE information; and transmitting the data of the remote UE to the base station, based on the RRC reconfiguration message.

According to an embodiment, the first identifier information may include layer-2 identifier (L2ID) of the remote UE.

According to an embodiment, the second identifier information may include an identifier of the remote UE to be used by an adaptation layer.

According to an embodiment, the remote UE may use at least one timer so as to access the base station through the relay UE.

According to an embodiment, the configuration information for relaying the data of the remote UE may include configuration information regarding a Uu RLC channel.

According to an embodiment, the configuration information for relaying the data of the remote UE may include configuration information regarding a PC5 RLC channel.

According to an embodiment, the method may further include transmitting the data of the remote UE to the base station, based on default configuration information.

According to an embodiment, the default configuration information may be pre-set before the RRC reconfiguration message is received.

According to an embodiment of the present disclosure, provided is a method performed by a base station in a wireless communication system. The method includes: receiving, from a relay UE relaying communication between a remote UE and the base station, a message about sidelink UE information including first identifier information of the remote UE; transmitting, to the relay UE, an RRC reconfiguration message including configuration information for relaying data of the remote UE and second identifier information, based on the message about the sidelink UE information; and receiving the data of the remote UE from the relay UE, based on the RRC reconfiguration message.

According to an embodiment, the first identifier information may include L2ID of the remote UE.

According to an embodiment, the second identifier information may include an identifier of the remote UE to be used by an adaptation layer.

According to an embodiment, the remote UE may use at least one timer so as to access the base station through the relay UE.

According to an embodiment, the configuration information for relaying the data of the remote UE may include configuration information regarding a Uu RLC channel.

According to an embodiment, the configuration information for relaying the data of the remote UE may include configuration information regarding a PC5 RLC channel.

According to an embodiment of the present disclosure, provided is a relay UE for relaying communication between a remote UE and a base station, in a wireless communication system. The relay UE includes: a transceiver; and at least one processor coupled to the transceiver, wherein the at least one processor is configured to: transmit, to the base station, a message about sidelink UE information including first identifier information of the remote UE; receive, from the base station, an RRC reconfiguration message including configuration information for relaying data of the remote UE and second identifier information, based on the message about the sidelink UE information; and transmit the data of the remote UE to the base station, based on the RRC reconfiguration message.

The methods according to the embodiments of the present disclosure described in the claims or the detailed description of the present disclosure may be implemented in hardware, software, or a combination of hardware and software.

When implemented in software, a computer-readable storage medium storing one or more programs (e.g., software modules) may be provided. The one or more programs stored in the computer-readable storage medium are configured for execution by one or more processors in an electronic device. The one or more programs include instructions directing the electronic device to execute the methods according to the embodiments of the present disclosure as described in the claims and the specification.

The programs (e.g., software modules or software) may be stored in random access memory (RAM), non-volatile memory including flash memory, read-only memory (ROM), electrically erasable programmable read-only memory (EEPROM), a magnetic disc storage device, a compact disc-ROM (CD-ROM), a digital versatile disc (DVD), another optical storage device, or a magnetic cassette. Alternatively, the programs may be stored in memory including a combination of some or all of the above-mentioned storage media. In addition, each memory device may be included by a plural number.

In addition, the programs may be stored in an attachable storage device accessible through any or a combination of communication networks such as the Internet, an intranet, a local area network (LAN), a wide LAN (WLAN), and a storage area network (SAN). Such a storage device may access the electronic device via an external port. Furthermore, an additional storage device on the communication network may access an apparatus that performs embodiments of the present disclosure.

In the afore-described embodiments of the present disclosure, elements included in the present disclosure are expressed in a singular or plural form according to the embodiments. However, the singular or plural form is appropriately selected for convenience of explanation and the present disclosure is not limited thereto. As such, an element expressed in a plural form may also be configured as a single element, and an element expressed in a singular form may also be configured as plural elements.

Meanwhile, specific embodiments have been described in the detailed description of the present disclosure, but various modifications may be possible without departing from the scope of the present disclosure. Therefore, the scope of the present disclosure should not be limited to the embodiments described above, but should be determined not only by the scope of the following claims, but also by the equivalents of the claims.

The invention claimed is:

1. A method performed by a user equipment (UE) in a wireless communication system, the method comprising:

transmitting, to a base station, a sidelink UE information message including information indicating that the UE is acting as a relay UE, information associated with an identifier (ID) for a remote UE and transmission (TX) resource request information for a sidelink communication;

receiving, from the base station, a radio resource control (RRC) reconfiguration message associated with a relay operation, the RRC reconfiguration message including identification information of the remote UE used in a sidelink relay adaptation protocol (RAP); and performing the relay operation, based on the RRC reconfiguration message, wherein the RRC reconfiguration message further includes information indicating a list of one or more Uu relay radio link control (RLC) channel IDs corresponding to one or more Uu relay RLC channels to be added or modified, and information indicating a list of one or more Uu relay RLC channel IDs corresponding to one or more Uu relay RLC channels to be released.

2. The method of claim 1, wherein the information associated with the ID for the remote UE includes a layer-2 identifier (L2ID) of the remote UE.

3. The method of claim 1, wherein the sidelink UE information message is associated with sidelink discovery related information.

4. The method of claim 1, wherein the RRC reconfiguration message includes configuration information associated with a PC5 RLC channel between the relay UE and the remote UE.

5. The method of claim 1, wherein the RRC reconfiguration message includes RAP configuration information.

6. The method of claim 1, wherein the sidelink UE information message is associated with a relay configuration request.

7. The method of claim 1, wherein the RRC reconfiguration message is associated with mapping information between a radio bearer of the remote UE and a Uu RLC channel.

8. A method performed by a base station in a wireless communication system, the method comprising:

receiving, from a user equipment (UE), a sidelink UE information message including information indicating that the UE is acting as a relay UE, information associated with an identifier (ID) for a remote UE and transmission (TX) resource request information for a sidelink communication;

transmitting, to the UE, a radio resource control (RRC) reconfiguration message associated with a relay operation, the RRC reconfiguration message including identification information of the remote UE used in a sidelink relay adaptation protocol (RAP); and receiving uplink data from the remote UE via the UE acting as the relay UE or transmitting downlink data to the remote UE via the UE acting as the relay UE, based on the relay operation associated with the RRC reconfiguration message, wherein the RRC reconfiguration message further includes information indicating a list of one or more Uu relay radio link control (RLC) channel IDs corresponding to one or more Uu relay RLC channels to be added or modified, and information indicating a list of one or more Uu relay RLC channel IDs corresponding to one or more Uu relay RLC channels to be released.

9. The method of claim 8, wherein the information associated with the ID for the remote UE includes a layer-2 identifier (L2ID) of the remote UE.

10. The method of claim 8, wherein the sidelink UE information message is associated with sidelink discovery related information.

11. The method of claim 8, wherein the RRC reconfiguration message includes configuration information associated with a PC5 RLC channel between the relay UE and the remote UE.

12. The method of claim 8, wherein the sidelink UE information message is associated with a relay configuration request.

13. The method of claim 8, wherein the RRC reconfiguration message is associated with mapping information between a radio bearer of the remote UE and a Uu RLC channel.

14. A user equipment (UE) in a wireless communication system, the UE comprising:

at least one transceiver;

at least one processor communicatively coupled to the at least one transceiver; and at least one memory, communicatively coupled to the at least one processor, storing instructions executable by the at least one processor to cause the UE to:

transmit, to a base station, a sidelink UE information message including information indicating that the UE is acting as a relay UE, information associated with an identifier (ID) for a remote UE and transmission (TX) resource request information for a sidelink communication;

receive, from the base station, a radio resource control (RRC) reconfiguration message associated with a relay operation, the RRC reconfiguration message including identification information of the remote UE used in a sidelink relay adaptation protocol (RAP); and perform the relay operation, based on the RRC reconfiguration message, wherein the RRC reconfiguration message further includes information indicating a list of one or more Uu relay radio link control (RLC) channel IDs corresponding to one or more Uu relay RLC channels to be added or modified, and information indicating a list of one or more Uu relay RLC channel IDs corresponding to one or more Uu relay RLC channels to be released.

15. A base station in a wireless communication system, the base station comprising:

at least one transceiver;

at least one processor communicatively coupled to the at least one transceiver: and at least one memory, communicatively coupled to the at least one processor, storing instructions executable by the at least one processor to cause the base station to;

receive, from a user equipment (UE), a sidelink UE information message including information indicating that the UE is acting as a relay UE, information associated with an identifier (ID) for a remote UE and transmission (TX) resource request information for a sidelink communication;

transmit, to the UE, a radio resource control (RRC) reconfiguration message associated with a relay operation, the RRC reconfiguration message including identification information of the remote UE used in a sidelink relay adaptation protocol (RAP); and receive uplink data from the remote UE via the UE acting as the relay UE or transmit downlink data to the remote UE via the UE acting as the relay UE, based on the relay operation associated with the RRC reconfiguration message, wherein the RRC reconfiguration message further includes information indicating a list of one or more Uu relay radio link control (RLC) channel IDs corresponding to one or more Uu relay RLC channels to be added or modified, and information indicating a list of one or more Uu relay RLC channel IDs corresponding to one or more Uu relay RLC channels to be released.

* * * * *